(12) United States Patent
Nakagawa et al.

(10) Patent No.: US 10,086,648 B2
(45) Date of Patent: *Oct. 2, 2018

(54) BEARING DEVICE FOR A WHEEL

(71) Applicant: NTN CORPORATION, Osaka (JP)

(72) Inventors: Tohru Nakagawa, Shizuoka (JP); Yuichi Asano, Shizuoka (JP); Masahiro Ozawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 282 days.

This patent is subject to a terminal disclaimer.

(21) Appl. No.: 14/989,311

(22) Filed: Jan. 6, 2016

(65) Prior Publication Data

US 2016/0136995 A1  May 19, 2016

Related U.S. Application Data

(63) Continuation of application No. 12/922,939, filed as application No. PCT/JP2009/055138 on Mar. 17, 2009, now Pat. No. 9,261,145.

(30) Foreign Application Priority Data

Apr. 10, 2008  (JP) ................................ 2008-102374
Apr. 16, 2008  (JP) ................................ 2008-106766
(Continued)

(51) Int. Cl.
*F16C 13/00* (2006.01)
*F16C 19/02* (2006.01)
(Continued)

(52) U.S. Cl.
CPC ...... *B60B 27/0005* (2013.01); *B60B 27/0015* (2013.01); *B60B 27/0026* (2013.01);
(Continued)

(58) Field of Classification Search
CPC .... F16C 19/186; F16C 35/0635; F16C 43/04; F16C 2226/52; F16C 2226/60;
(Continued)

(56) References Cited

U.S. PATENT DOCUMENTS 4,225,112 A    9/1980  Libke
4,807,492 A *  2/1989  Moroto ................... F16H 3/66
                                                  74/606 R
(Continued)

FOREIGN PATENT DOCUMENTS

JP    55-57765    4/1980
JP    59-140911   8/1984
(Continued)

OTHER PUBLICATIONS

International Search Report dated Jun. 23, 2009 in International (PCT) Application No. PCT/JP2009/055138.
(Continued)

*Primary Examiner* — Adam D Rogers
(74) *Attorney, Agent, or Firm* — Wenderoth, Lind & Ponack, L.L.P.

(57) ABSTRACT

A bearing device for a wheel has a stem shaft of an outer joint member of a constant-velocity universal joint fit and inserted in a hole of a hub wheel, the stem shaft and hub wheel being coupled through an intermediation of a recess-projection fitting structure. Projections extending in an axial direction are provided on one of the stem shaft and an inner diameter surface of the hole of the hub wheel. The projections are press-fit into another of the stem shaft and the inner diameter surface of the hole along the axial direction. Recesses that adhere to and fit the projections are formed in the other. An end on an inboard side of the hub wheel is
(Continued)

caulked to an outer diameter side to form a caulking section and preload is applied to a roller bearing by the caulking section.

5 Claims, 37 Drawing Sheets

(30) Foreign Application Priority Data

Apr. 16, 2008 (JP) .................................. 2008-106776
Jul. 24, 2008 (JP) .................................. 2008-191070

(51) Int. Cl.
| | | |
|---|---|---|
| F16D 1/06 | (2006.01) | |
| B60B 27/00 | (2006.01) | |
| F16C 19/18 | (2006.01) | |
| F16D 1/072 | (2006.01) | |
| F16D 3/2237 | (2011.01) | |
| F16C 35/063 | (2006.01) | |
| B60B 35/18 | (2006.01) | |
| F16C 43/04 | (2006.01) | |
| F16D 3/223 | (2011.01) | |

(52) U.S. Cl.
CPC ...... *B60B 27/0042* (2013.01); *B60B 27/0078* (2013.01); *B60B 27/0084* (2013.01); *B60B 27/0094* (2013.01); *B60B 35/18* (2013.01); *F16C 19/186* (2013.01); *F16C 35/0635* (2013.01); *F16C 43/04* (2013.01); *F16D 1/072* (2013.01); *F16D 3/2237* (2013.01); *F16C 2226/60* (2013.01); *F16C 2326/02* (2013.01); *F16D 2003/22326* (2013.01); *F16D 2300/12* (2013.01)

(58) Field of Classification Search
CPC .... F16C 2326/02; F16D 1/072; F16D 3/2237; F16D 2003/22326; F16D 2300/12; B60B 27/0005; B60B 27/0015; B60B 27/0042; B60B 27/0078; B60B 27/0084; B60B 27/0094; B60B 35/18
See application file for complete search history.

(56) References Cited

U.S. PATENT DOCUMENTS

| | | | |
|---|---|---|---|
| 5,853,227 | A | 12/1998 | Schmidt, III |
| 6,550,975 | B2 | 4/2003 | Inoue et al. |
| 6,682,225 | B2 | 1/2004 | Sahashi et al. |
| 7,255,482 | B2 | 8/2007 | Yamamoto |
| 7,753,801 | B2 * | 7/2010 | Umekida .......... B60L 327/0005 |
| | | | 464/175 |
| 7,758,432 | B2 | 7/2010 | Arrieta et al. |
| 7,811,176 | B2 * | 10/2010 | Cermak ................ B60L 327/00 |
| | | | 403/359.5 |
| 8,128,504 | B2 | 3/2012 | Fukumura et al. |
| 8,356,943 | B2 | 1/2013 | Ozawa et al. |
| 8,360,655 | B2 | 1/2013 | Ozawa et al. |
| 8,382,378 | B2 | 2/2013 | Fukumura et al. |
| 8,393,798 | B2 | 3/2013 | Nakagawa et al. |
| 8,480,306 | B2 | 7/2013 | Fukumura et al. |
| 8,506,202 | B2 | 8/2013 | Nakagawa et al. |
| 8,540,582 | B2 | 9/2013 | Ozawa et al. |
| 8,556,737 | B2 | 10/2013 | Yamauchi et al. |
| 8,591,118 | B2 | 11/2013 | Ishijima et al. |
| 8,708,570 | B2 | 4/2014 | Umekida et al. |
| 8,757,887 | B2 | 6/2014 | Torii et al. |
| 8,801,294 | B2 | 8/2014 | Nakagawa et al. |
| 8,944,694 | B2 | 2/2015 | Fukumura et al. |
| 9,308,777 | B2 * | 4/2016 | Nakagawa .......... B60B 27/0005 |
| 9,393,836 | B2 * | 7/2016 | Mochinaga .......... F16C 33/586 |
| 9,505,266 | B2 * | 11/2016 | Yamauchi ........... B60B 27/0026 |
| 9,636,945 | B2 * | 5/2017 | Mochinaga ............... F16D 1/06 |
| 9,656,517 | B2 * | 5/2017 | Mochinaga ....... B60L 327/0026 |
| 9,829,048 | B2 * | 11/2017 | Mochinaga ............. F16D 1/072 |
| 2002/0195291 | A1 | 12/2002 | Nonogaki |
| 2004/0120622 | A1 | 6/2004 | Tajima et al. |
| 2007/0264077 | A1 * | 11/2007 | Kitahata ................... F16D 3/06 |
| | | | 403/359.1 |
| 2010/0215302 | A1 | 8/2010 | Torii et al. |
| 2010/0226604 | A1 | 9/2010 | Nakagawa et al. |
| 2012/0281941 | A1 | 11/2012 | Umekida et al. |
| 2013/0172088 | A1 | 7/2013 | Umekida et al. |
| 2014/0361606 | A1 | 12/2014 | Mochinaga et al. |
| 2016/0159145 | A1 * | 6/2016 | Nagata .................... F16D 1/072 |
| | | | 29/898.07 |

FOREIGN PATENT DOCUMENTS

| | | |
|---|---|---|
| JP | 62-251522 | 11/1987 |
| JP | 07-167116 | 7/1995 |
| JP | 07-259392 | 10/1995 |
| JP | 2001-113412 | 4/2001 |
| JP | 2001-225606 | 8/2001 |
| JP | 2001-339904 | 12/2001 |
| JP | 2003-4060 | 1/2003 |
| JP | 2003-211985 | 7/2003 |
| JP | 2004-052787 | 2/2004 |
| JP | 2004-90839 | 3/2004 |
| JP | 2004-340311 | 12/2004 |
| JP | 2005-193757 | 7/2005 |
| JP | 2006-312460 | 11/2006 |
| JP | 2007-55322 | 3/2007 |
| JP | 2007-062732 | 3/2007 |
| JP | 2007-276780 | 10/2007 |
| JP | 2007-321903 | 12/2007 |
| JP | 2007-331457 | 12/2007 |
| JP | 2008-2578 | 1/2008 |
| JP | 2008-162359 | 7/2008 |
| WO | 2007/145019 | 12/2007 |

OTHER PUBLICATIONS

International Preliminary Report on Patentability and Written Opinion of the International Searching Authority dated Dec. 9, 2010 in International (PCT) Application No. PCT/JP2009/055138.
Japanese Office Action dated Jan. 11, 2013 in corresponding Japanese Patent Application No. 2008-106776 with partial English translation.
Japanese Office Action dated Apr. 15, 2013 in corresponding Japanese Patent Application No. 2008-191070 with partial English translation.
Japanese Office Action dated Jun. 6, 2013 in corresponding Japanese Patent Application No. 2008-102374 with partial English translation.
Japanese Office Action dated Nov. 21, 2013 in corresponding Japanese Application No. 2013-049726, with partial English translation.
Japanese Office Action dated Nov. 22, 2013 in corresponding Japanese Application No. 2013-049728, with partial English translation.
Machine Translation of JP 2007-276780 obtained on Aug. 5, 2013.
Machine translation of JP 2005-193757 obtained on Mar. 18, 2015.

* cited by examiner

BEARING DEVICE FOR A WHEEL

TECHNICAL FIELD

The present invention relates to a bearing device for a wheel for supporting wheels to freely rotate relative to a vehicle body in a vehicle such as an automobile.

BACKGROUND ART

The bearing device for a wheel has evolved from a structure called first generation in which roller bearings in double rows are independently used to second generation in which a vehicle body attachment flange is integrally provided in an outer member. Further, third generation in which one inner raceway surface of the roller bearings in double rows is integrally formed with an outer circumference of a hub wheel integrally having a wheel attachment flange has been developed and fourth generation in which a constant-velocity universal joint is integrated with the hub wheel and the other inner raceway surface of the roller bearings in double rows is integrally formed with an outer circumference of an outer joint member configuring the constant-velocity universal joint has been developed.

For example, the bearing device for a wheel called third generation is described in Patent Document 1. The bearing device for a wheel called third generation includes, as illustrated in FIG. 39, a hub wheel 152 having a flange 151 extending in an outer diameter direction, a constant-velocity universal joint 154 having an outer joint member 153 fixed to this hub wheel 152, and an outer member 155 disposed on an outer circumferential side of the hub wheel 152.

The constant-velocity universal joint 154 includes the outer joint member 153, an inner joint member 158 disposed in a cup-shaped section 157 of this outer joint member 153, a ball 159 disposed between this inner joint member 158 and the outer joint member 153, and a retainer 160 that retains this ball 159. A spline section 161 is formed on an inner circumferential surface of a center hole of the inner joint member 158. An end spline section of a shaft (not shown) is inserted into this center hole, whereby the spline section 161 on the inner joint member 158 side and the spline section on the shaft side are engaged.

The hub wheel 152 has a cylindrical shaft section 163 and the flange 151. A short-cylindrical pilot section 165, on which a wheel and a brake rotor (not shown) are mounted, is protrudingly provided on an outer end surface 164 (end surface on an out board side) of the flange 151. The pilot section 165 includes a large-diameter first section 165a and a small-diameter second section 165b. The brake rotor is externally fit in the first section 165a and the wheel is externally fit in the second section 165b.

A notch section 166 is provided in an outer circumferential surface at an end on the cup-shaped section 157 side of the shaft section 163. An inner ring 167 is fit in this notch section 166. A first inner raceway surface 168 is provided near a flange on an outer circumferential surface of the shaft section 163 of the hub wheel 152. A second inner raceway surface 169 is provided on an outer circumferential surface of the inner ring 167. A bolt inserting hole 162 is provided in the flange 151 of the hub wheel 152. A hub bolt for fixing the wheel and the brake rotor to this flange 151 is inserted into this bolt inserting hole 162.

In the outer member 155, outer raceway surfaces 170 and 171 in two rows are provided on an inner circumference thereof and the flange (vehicle body attachment flange) 151 is provided on an outer circumference thereof. The first outer raceway surface 170 of the outer member 155 and the first inner raceway surface 168 of the hub wheel 152 are opposed to each other. The second outer raceway surface 171 of the outer member 155 and the raceway surface 169 of the inner ring 167 are opposed to each other. Rolling elements 172 are interposed between the second outer raceway surface 171 and the raceway surface 169.

A stem shaft 173 of the outer joint member 153 is inserted into the shaft section 163 of the hub wheel 152. In the shaft section 173, a screw section 174 is formed at an end of a reverse cup-shaped section thereof. A spline section 175 is formed between this screw section 174 and the cup-shaped section 157. A spline section 176 is formed on an inner circumferential surface (inner diameter surface) of the shaft section 163 of the hub wheel 152. When this stem shaft 173 is inserted into the shaft section 163 of the hub wheel 152, the spline section 175 on the stem shaft 173 side and the spline section 176 on the hub wheel 152 side are engaged.

A nut member 177 is screwed onto the screw section 174 of the stem shaft 173 projecting from the shaft section 163. The hub wheel 152 and the outer joint member 153 are connected. An inner end surface (rear surface) 178 of the nut member 177 and an outer end surface 179 of the shaft section 163 come into contact with each other and an end surface 180 on a shaft section side of the cup-shaped section 157 and an outer end surface 181 of the inner ring 181 come into contact with each other. In other words, when the nut member 177 is tightened, the hub wheel 152 is nipped by the nut member 177 and the cup-shaped section 157 through an intermediation of the inner ring 167.

[Patent Document 1] JP 2004-340311 A

DISCLOSURE OF THE INVENTION

Problems to be Solved by the Invention

Conventionally, as described above, the spline section 175 on the stem shaft 173 side and the spline section 176 on the hub wheel 152 side are engaged. Therefore, because it is necessary to apply spline machining to both the stem shaft 173 side and the hub wheel 152 side, cost increases. When the stem shaft 173 is press-fit into the hub wheel 152, recesses and projections of the spline section 175 on the stem shaft 173 side and the spline section 176 on the hub wheel 152 side need to be aligned. If the stem shaft 173 is press-fit into the hub wheel 152 by aligning tooth surfaces thereof, recessed and projected teeth are likely to be damaged (torn). If the stem shaft 173 is press-fit into the hub wheel 152 by aligning the spline sections to a large diameter of the recessed and projected teeth rather than aligning the tooth surfaces, a backlash in a circumferential direction tends to occur. If there is the backlash in the circumferential direction in this way, transferability of rotation torque is low and noise tends to occur. Therefore, when the stem shaft 173 is press-fit into the hub wheel 152 by the spline fitting as in the prior art, it is difficult to solve both the damages to the recessed and projected teeth and the backlash in the circumferential direction.

Further, it is necessary for the nut member 177 to be screwed on the screw section 174 of the stem shaft 173 projecting from the shaft section 163. Thus, the assembly work involves screw fastening operation, resulting in a rather poor workability. Further, the number of components is large, resulting in a rather poor component controllability.

Even if adhesion of a male spline and a female spline is improved in the spline fitting to prevent the backlash in the circumferential direction from occurring, if driving torque acts, it is likely that relative displacement occurs in the male spline and the female spline. If such relative displacement occurs, fretting wear occurs. The splines are likely to cause abrasion because of dust of the wear. Consequently, it is likely that a backlash occurs in a spline fitting region or stable torque transmission cannot be performed.

In view of the above-mentioned problems, it is an object of the present invention to provide a bearing device for a wheel that can realize suppression of a backlash in a circumferential direction and is excellent in workability of connection of a hub wheel and an outer joint member of a constant-velocity joint member, can perform stable torque transmission over a long period of time and is excellent in maintainability because separation of the hub wheel and the outer joint member of the constant-velocity universal joint is possible, and can perform stable torque transmission over a long period of time.

Means for Solving the Problems

A first bearing device for a wheel according to the present invention includes an outer member having an inner circumference in which outer raceway surfaces in double rows are formed; an inner member that has, on an outer circumference thereof, inner raceway surfaces in double rows opposed to the outer raceway surfaces and includes an inner ring and a hub wheel provided with flanges for attachment to a wheel; and rolling elements in double rows interposed between the outer raceway surfaces of the outer member and the inner raceway surfaces of the inner member, a stem section of an outer joint member of a constant-velocity universal joint being fit and coupled to an inner diameter of the hub wheel, in which: projections extending in an axial direction are provided in one of a stem shaft of the outer joint member and an inner diameter surface of a hole of the hub wheel, the projections are press-fit into another along the axial direction, and recesses that adhere to and fit on the projections are formed on the another by this press fitting to configure the recess-projection fitting structure in which entire fitting contact regions of the projections and the recesses adhere to each other; and an end on an inboard side of the hub wheel is caulked to an outer diameter side to form a caulking section, an inner ring of a roller bearing externally fit in the hub wheel is fixed by this caulking section, preload is applied to the roller bearing, and the caulking section and a back surface of a mouth section of the outer joint member of the constant-velocity universal joint opposed to this caulking section are brought into contact with each other.

With the bearing device for a wheel according to the present invention, the bearing device for a wheel includes the recess-projection fitting structure for integrating the hub wheel and the stem shaft of the outer joint member of the constant-velocity universal joint fit and inserted into the hole of the hub wheel. Therefore, a bolt and the like are unnecessary in coupling the stem shaft and the hub wheel. In the recess-projection fitting structure, entire fitting contact regions of projections and recesses are in close contact with each other. Therefore, in this fitting structure, a gap in which a backlash occurs is not formed in a diameter direction and a circumferential direction.

Because the end of the hub wheel is caulked and preload is applied to the roller bearing, it is unnecessary to apply preload with the mouth section of the outer joint member.

The caulking section of the hub wheel and the back surface of the mouth section of the outer joint member of the constant-velocity universal joint opposed to this caulking section are brought into contact with each other. Therefore, bending rigidity in a stem shaft direction is improved. This bending rigidity is caused by secondary moment generated during a joint high actuation angle and axial load input from a tire side during turning.

It is preferable to provide a shaft slip-off preventing structure for regulating slip-off of the stem shaft from the hub wheel between the stem shaft of the outer joint member of the constant-velocity universal joint and the inner diameter surface of the hub wheel. It is possible to prevent the outer joint member of the constant-velocity universal joint from slipping off from the hub wheel in the axial direction by providing the shaft slip-off preventing structure.

The shaft slip-off preventing structure is a hook structure formed by plastically deforming a cylindrical section, which is provided at a shaft end of the stem shaft, outward in a diameter direction with swinging and caulking by a swinging caulking jig. Therefore, it is possible to reduce caulking load during caulking compared with expansion of a diameter by pushing in the caulking jig in the axial direction without swinging the caulking jig.

The recess-projection fitting structure allows separation by application of drawing force in the axial direction. That is, if drawing force in the axial direction is applied to the stem shaft of the outer joint member, it is possible to remove the outer joint member from the hole of the hub wheel. After the stem shaft of the outer joint member is drawn out from the hole of the hub wheel, if the stem shaft of the outer joint member is press-fit into the hole of the hub wheel again, it is possible to configure the recess-projection fitting structure in which the entire fitting contact regions of the projections and the recesses are in close contact with each other.

The hub wheel and the stem shaft of the outer joint member can be fixed through an intermediation of a bolt coupling means provided on a device axis and having a screw hole and a bolt member screwed in this screw hole. Consequently, because the hub wheel and the stem shaft of the outer joint member are fixed through an intermediation of the bolt coupling means, slip-off in the axial direction of the stem shaft of the outer joint member from the hub wheel is regulated.

The bolt coupling means includes a shaft press-fitting guide structure section of the outer joint member that guides the bolt member during re-press fitting after the separation.

The bolt member has a screw section and a non-screw section, and the shaft press-fitting guide structure section has a bolt inserting hole through which the non-screw section of the bolt member is inserted. When a diameter difference between a hole diameter of the bolt inserting hole and a shaft diameter of the non-screw section of the bolt member is represented as $\Delta d5$ and a diameter difference between a stem shaft outer diameter of the outer joint member in the recess-projection fitting structure and a hub wheel inner diameter in the recess-projection fitting structure is represented as $\Delta d6$, a relation between the diameter differences can be $0 < \Delta d5 < \Delta d6$.

In other words, the diameter difference between the hole diameter of the bolt inserting hole and the shaft diameter of the non-screw section of the bolt member is set smaller than the diameter difference between the stem shaft outer diameter of the outer joint member and the hub wheel inner diameter in the recess-projection fitting structure. The bolt inserting hole functions as a guide when the stem shaft of the outer joint member is press-fit.

It is preferable to provide an inner wall for partitioning an inside of the hole of the hub wheel in the hole, and provide the bolt inserting hole in this inner wall. Rigidity of the shaft press-fitting guide structure section is improved by this inner wall.

A seal material may be interposed at least one of between the caulking section of the hub wheel and an opposed surface of the outer joint member opposed to the caulking section and between a bearing surface of the bolt member of the bolt coupling means and a receiving surface for receiving this bearing surface.

It is preferable to set contact surface pressure between the caulking section of the hub wheel and the back surface of the mouth section is set to be equal to or lower than 100 MPa. When this contact surface pressure exceeds 100 MPa, noise is likely to be caused. In other words, when torque load is large, a difference occurs in twisting amounts of the outer joint member of the constant-velocity universal joint and the hub wheel. Sudden slip occurs in the contact section of the outer joint member of the constant-velocity universal joint and the hub wheel because of this difference, and noise occurs. On the other hand, when the contact surface pressure is equal to or lower than 100 MPa, it is possible to prevent sudden slip from occurring and suppress occurrence of noise.

The projections of the recess-projection fitting structure are provided in the stem shaft of the outer joint member of the constant-velocity universal joint, at least hardness of ends in the axial direction of the projections is set higher than that of an inner diameter section of the hole of the hub wheel, and the stem shaft is press-fit into the hole of the hub wheel from an axial direction end side of the projections. Thus, recesses that adhere to and fit in the projections are formed on the inner diameter surface of the hole of the hub wheel by the projections, and the recess-projection fitting structure may be configured. Further, the projections of the recess-projection fitting structure are provided on the inner diameter surface of the hole of the hub wheel, at least hardness of ends in the axial direction of the projections is set higher than that of an outer diameter section of the stem shaft of the outer joint member of the constant-velocity universal joint, and the projections on a hub wheel side are press-fit into the stem shaft of the outer joint member from an axial direction end side of the projections. Thus, recesses that adhere to and fit in the projections are formed on an outer diameter surface of the stem shaft of the outer joint member by the projections, and the recess-projection fitting structure may be configured.

Projecting direction intermediate regions of the projections are arranged on a recess forming surface before the formation of the recesses. When the projections are provided in the stem shaft of the outer joint member, a maximum diameter dimension of a circle connecting vertexes of the plural projections is set larger than an inner diameter dimension of the hub wheel shaft hole in which the recesses are formed. A diameter dimension of a circle connecting bottoms among the projections is set smaller than an inner diameter dimension of the shaft fitting hole of the hub wheel. On the other hand, an outer diameter dimension of the stem shaft of the outer joint member is set larger than a minimum diameter dimension of a circle connecting vertexes of the plural projections provided in the hole of the hub wheel, and set smaller than the diameter dimension of the circle connecting the bottoms among the projections of the hub wheel hole.

It is preferable to set a circumferential direction thicknesses of the projecting direction intermediate regions of the projections smaller than a circumferential direction dimension in positions corresponding to the intermediate regions among the projections adjacent to one another in the circumferential direction. By setting the circumferential direction thicknesses in this way, it is possible to set a sum of the circumferential direction thicknesses of the projecting direction intermediate regions of the projections smaller than a sum of circumferential direction thicknesses in positions corresponding to the intermediate regions in the projections on the other side that fit in among the projections adjacent to one another in the circumferential direction.

It is preferable to arrange the recess-projection fitting structure while avoiding a position right below the raceway surface of the roller bearing. In other words, if the shaft section is press-fit into the hole of the hub wheel, the hub wheel expands. Hoop stress is generated on the raceway surface of the roller bearing by this expansion. The hoop stress means force for expanding a diameter in the outer diameter direction. Therefore, when the hoop stress is generated on the bearing raceway surface, there is a fear that the hoop stress reduces rolling fatigue life and causes a crack. Therefor, it is possible to suppress generation of the hoop stress on the bearing raceway surface by arranging the recess-projection fitting structure while avoiding a position right below the raceway surface of the roller bearing.

It is preferable to provide a pocket section that stores an extruded portion caused by the recess formation by the press fitting. It is possible to provide the pocket section that stores the extruded portion caused by the recess formation by the press fitting and provide the pocket section on the inner diameter surface of the hole of the hub wheel. The extruded portion is equivalent to a volume of a material in the recesses in which the recess fitting regions of the projection are fit in. The extruded portion includes the material extruded from the recesses to be formed, the material cut for forming the recesses, or the material extruded and cut. It is preferable to provide the pocket section for storing the extruded portion on a press fitting start end side of the projections of the stem shaft and provide a collar section for centering with the hole of the hub wheel on an axial direction opposite projection side of this pocket section.

Effect of the Invention

The bearing device for a wheel according to the present invention includes the recess-projection fitting structure for integrating the hub wheel and the stem shaft of the outer joint member of the constant-velocity universal joint fit and inserted into the hole of the hub wheel. Therefore, it is possible to eliminate a backlash in the circumferential direction of the recess-projection fitting structure section.

The caulking section and the back surface of the mouth section of the outer joint member are brought into contact with each other, whereby bending rigidity in the stem shaft direction is improved, the stem shaft becomes robust against bending, and a high-quality product excellent in durability is obtained. Moreover, positioning during press fitting can be realized by this contact. Consequently, dimension accuracy of this bearing device for a wheel is stabilized, it is possible to secure stable length as axial direction length of the recess-projection fitting structure disposed along the axial direction and realize improvement of torque transmission performance. Further, a seal structure can be configured by this contact. It is possible to prevent intrusion of foreign matters into the recess-projection fitting structure from the caulking section side of this hub wheel. The recess-projection fitting structure can maintain a stable fit state over a long period of time.

Because the end of the hub wheel is caulked and preload is applied to the roller bearing, it is unnecessary to apply preload with the mouth section of the outer joint member. Therefore, it is possible to press-fit the stem shaft of the outer joint member without taking into account preload and realize improvement of connectability (assemblability) of the hub wheel and the outer joint member.

With the shaft slip-off preventing structure, it is possible to effectively prevent the stem shaft of the outer joint member from slipping off in the axial direction from the hole of the hub wheel. Consequently, it is possible to maintain a stable connected state and realize improvement of a quality of the bearing device for a wheel. Therefore, nut fastening work is unnecessary when the stem shaft and the hub wheel are coupled. Therefore, it is possible to easily perform assembly work, realize a reduction in cost in the assembly work, and realize a reduction in weight.

It is possible to remove the outer joint member from the hole of the hub wheel by applying drawing force in the axial direction to the stem shaft of the outer joint member. Therefore, it is possible to realize improvement of workability (maintainability) of repairing and inspection of components. Moreover, by press-fitting the stem shaft of the outer joint member into the hole of the hub wheel again after repairing and inspection of the components, it is possible to configure the recess-projection fitting structure in which the entire fitting contact regions of the projections and the recesses are in close contact with each other. Therefore, it is possible to configure the bearing device for a wheel, which can perform stable torque transmission, again.

In the bearing device for a wheel in which the hub wheel and the constant-velocity universal joint are fixed through an intermediation of the bolt coupling means, slip-off in the axial direction of the stem shaft of the outer joint member from the hub wheel is regulated. It is possible to maintain a stable connected state.

Because the shaft slip-off preventing structure is a hook structure formed by plastically deforming the cylindrical section outward in the diameter direction, screw fastening in the prior art can be omitted. Therefore, it is unnecessary to form the screw section projecting from the hole of the hub wheel in the shaft section. It is possible to realize a reduction in weight, omit screw fastening work, and realize improvement of assembly workability. Moreover, caulking load during caulking may be relatively small. It is possible to increase the thickness of the caulking section and surely bring the inner diameter surface of the hub wheel and the outer diameter surface of the caulking section into contact with each other. Consequently, it is possible to provide a more robust slip-off preventing mechanism (structure). Further, because such a robust slip-off preventing mechanism (structure) is provided, bending rigidity of the shaft section is improved and the shaft section becomes robust against bending. If the caulking load during caulking can be reduced, it is possible to prevent deformation of a region that receives load (a load receiving section of the outer joint member of the constant-velocity universal joint, for example, a step surface provided on the outer diameter surface of the outer joint member, an opening side end surface of the outer joint member, etc.).

Because the diameter difference between the hole diameter of the bolt inserting hole and the shaft diameter of the non-screw section of the bolt member is set smaller than the diameter difference between the stem shaft outer diameter of the outer joint member and the hub wheel inner diameter in the recess-projection fitting structure, the bolt inserting hole functions as a guide when the stem shaft of the outer joint member is press-fit. It is possible to perform more stable re-press fitting.

The rigidity of the shaft press-fit guide structure section is improved and press fitting of the stem shaft of the outer joint member is more stabilized by the inner wall of the hole of the hub wheel.

If a seal material is interposed between the caulking section of the hub wheel and the opposed surface of the outer joint member opposed to the caulking section, it is possible to prevent intrusion of rainwater, foreign matters, and the like into the recess-projection fitting structure from a space between the caulking section and the opposed surface. If a seal material is interposed between a bearing surface of the bolt shaft of the bolt coupling means and a receiving surface that receives the bearing surface, it is possible to prevent intrusion of rainwater, foreign matters, and the like into the recess-projection fitting structure from a space between the bearing surface and the receiving surface.

If contact surface pressure between the caulking section of the hub wheel and the back surface of the mouth section is equal to or lower than 100 MPa, it is possible to prevent sudden slip from occurring and suppress occurrence of noise. Consequently, it is possible to configure a silent bearing device for a wheel.

The projections of the recess-processing fitting structure are provided in the stem shaft of the outer joint member of the constant-velocity universal joint, the hardness of the axial direction ends of the projections is set higher than that of the inner diameter section of the hole of the hub wheel, and the stem shaft is press-fit in the hole of the hub wheel from the axial direction end side. As a result, it is possible to increase the hardness on the stem shaft side and improve the rigidity of the stem shaft. The projections of the recess-projection fitting structure are provided on the inner diameter surface of the hole of the hub wheel, the hardness of the axial direction ends of the projections is set higher than that of the outer diameter section of the stem shaft of the outer joint member of the constant-velocity universal joint, and the projections on the hub wheel side are press-fit in the stem shaft of the outer joint member from the axial direction end side thereof. As a result, it is unnecessary to perform hardness treatment (heat treatment) on the stem shaft side. Therefore, the outer joint member of the constant-velocity joint is excellent in productivity.

By setting the circumferential direction thickness of the projecting direction intermediate region of the projections smaller than a dimension in positions corresponding to the intermediate regions among the projections adjacent to one another in the circumferential direction, it is possible to increase the circumferential direction thickness of the projecting direction intermediate regions of the projections on the side in which the recesses are formed (projections among the formed recesses). Therefore, it is possible to increase a shearing area of the projections on the opposite side (projections having low hardness among the recesses because the recesses are formed) and secure torsion strength. Moreover, because tooth thickness of the projections on the high hardness side is small, it is possible to reduce press-fitting load and realize improvement of press-fitting properties.

Generation of hoop stress on the bearing raceway surface is suppressed by arranging the recess-projection fitting structure while avoiding a position right below the raceway surface of the roller bearing. Consequently, it is possible to prevent occurrence of a deficiency of the bearing such as a reduction in rolling fatigue life, occurrence of a crack, and stress corrosion crack.

By providing the pocket section for storing the extruded portion caused by recess formation by the press fitting, it is possible to hold (maintain) the extruded portion in this pocket. The extruded portion does not enter the inside of the vehicle and the like on the outside of the device. In other words, it is possible to keep the extruded portion stored in the pocket section, it is unnecessary to perform removal processing for the extruded portion, and it is possible to realize a reduction in assembly work man-hour and realize improvement of assembly workability and cost reduction.

By providing the collar section for centering with the hole of the hub wheel on the opposite projection side in the axial direction of the pocket section, ejection of the extruded portion in the pocket section to the collar section side is eliminated. The extruded portion is more stably stored. Moreover, because the collar section is used for centering, it is possible to press-fit the stem shaft into the hub wheel while preventing decentering. Therefore, it is possible to highly accurately connect the outer joint member and the hub wheel and perform stable torque transmission.

DESCRIPTION OF SYMBOLS

Detailed Description of the Invention

Figure 1:
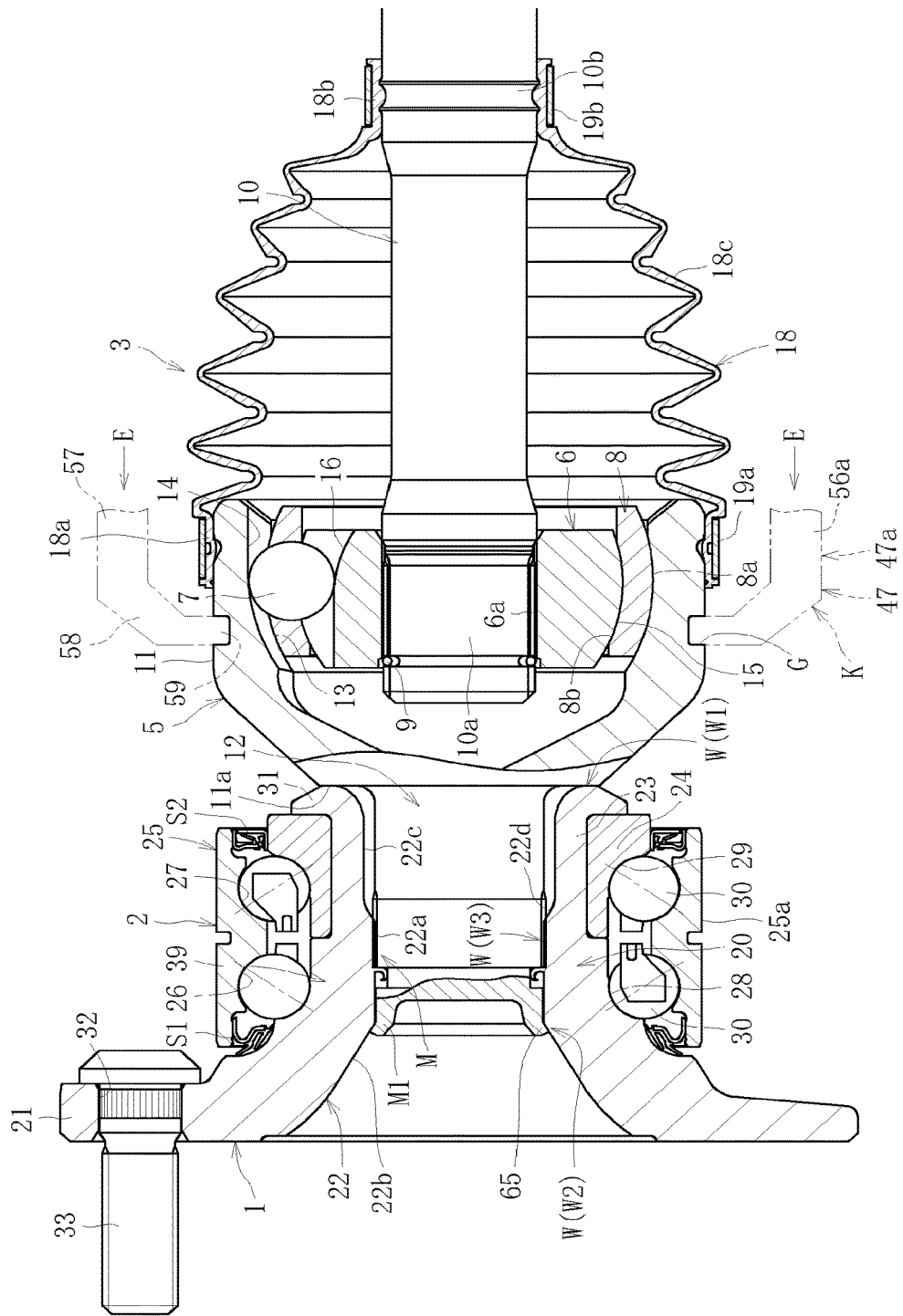
FIG. 1 is an enlarged sectional view of a bearing device for a wheel illustrating a first embodiment of the present invention.

Embodiments of the present invention are described below with reference to FIGS. 1 to 41. A bearing device for a wheel according to a first embodiment is illustrated in FIG. 1. In this bearing device for a wheel, a hub wheel 1, roller bearings 2 in double rows, and a constant-velocity universal joint 3 are integrated and the hub wheel 1 and a stem shaft 12 of an outer joint member of the constant-velocity universal joint 3 fit and inserted into a hole 22 of the hub wheel 1 are coupled through an intermediation of a recess-projection fitting structure M.

The constant-velocity universal joint 3 mainly includes an outer ring 5 as an outer joint member, an inner ring 6 as an inner joint member arranged on the inner side of the outer ring 5, plural balls 7 provided between the outer ring 5 and the inner ring 6 to transmit torque, and a cage 8 provided between the outer ring 5 and the inner ring 6 and adapted to retain the balls 7. An end section 10a of a shaft 10 is press-fitted into a shaft hole inner diameter 6a of the inner ring 6 to effect spline fitting, whereby connection with the shaft 10 is effected so as to allow torque transmission. A stop ring 9 for preventing shaft slipping-off is fit in the end section 10a of the shaft 10.

The outer ring 5 includes a mouth section 11 and a stem section (shaft section) 12, and the mouth section 11 is formed in a cup-like shape open at its one end. In an inner spherical surface 13 thereof, there are formed plural axially extending guiding grooves (track grooves) 14 at equal circumferential intervals. The inner ring 6 has in an outer spherical surface 15 thereof plural axially extending guiding grooves (track grooves) 16 formed at equal circumferential intervals.

The track grooves 14 of the outer ring 5 and the track grooves 16 of the inner ring 6 are paired with each other, and one ball 7 as a torque transmission element (torque transmission member) is incorporated into a track formed by each pair of track grooves 14, 16 so as to be capable of rolling. The balls 7 are provided between the track grooves 14 of the outer ring 5 and the track grooves 16 of the inner ring 6 to transmit torque. The cage 8 is slidably provided between the outer ring 5 and the inner ring 6, with an outer spherical surface thereof coming in contact with the inner spherical surface 13 of the outer ring 5 and an inner spherical surface thereof coming in contact with the outer spherical surface 15 of the inner ring 6. While in this example the constant-velocity universal joint is of the undercut free type, in which each track grooves 14, 16 has a linear straight section provided to a groove bottom. It is also possible to adopt a constant-velocity universal joint of some other type such as the zepper type in which the linear straight section is not provided to the bottom.

Further, the opening of the mouth section 11 is stopped by a boot 18. The boot 18 includes a large diameter section 18a, a small diameter section 18b, and a bellows section 18c connecting the large diameter section 18a and the small diameter section 18b. The large diameter section 18a is fitted onto the opening of the mouth section 11, and is fastened in this state by a boot band 19a. Further, the small diameter section 18b is fitted onto a boot attachment section 10b of the shaft 10, and is fastened in this state by a boot band 19b.

Figure 5:
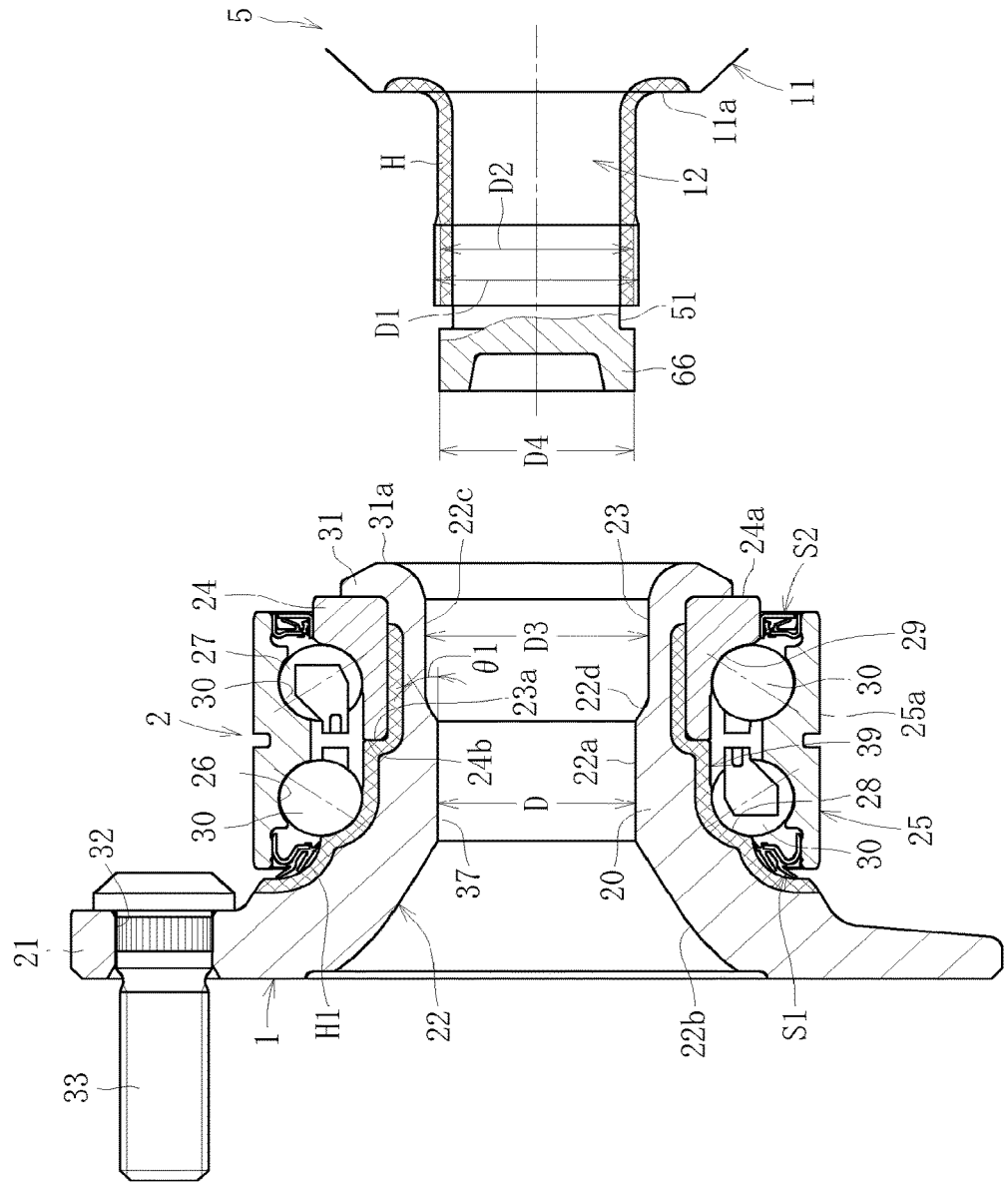
FIG. 5 is a sectional view before assembly of the bearing device for a wheel.

The hub wheel 1 includes, as illustrated in FIG. 1 and FIG. 5, a cylindrical section 20, and a flange 21 provided at the out board side end section of the cylindrical section 20. A hole 22 of the cylindrical section 20 includes a shaft section fitting hole 22a, a tapered hole 22b on the out board side, and a large diameter section 22c on the in-board side. Between the shaft section fitting hole 22a and the large diameter section 22c, there is provided a taper section (tapered hole) 22d. This taper section 22d is reduced in diameter along a press-fitting direction in coupling the hub wheel 1 and the stem shaft 12 of the outer ring 5. A tilt angle θ1 of the taper section 22d is set to, for example, 15° to 75°. The outboard side is an outer side of the vehicle in a state in which the bearing device is attached to the vehicle and the inboard side is an inner side of the vehicle in the state in which the bearing device is attached to the vehicle.

The roller bearing 2 includes an inner ring 24 fit in a step section 23 provided on the inboard side of the cylinder section 20 of the hub wheel 1 and an outer member 25 externally fit from the cylinder section 20 to the inner ring 24 of the hub wheel 1. In the outer member 25, outer raceway surfaces (outer races) 26 and 27 in two rows are provided on an inner circumference thereof. The first outer raceway surface 26 and a first inner raceway surface (inner race) 28 provided on an outer circumference of the shaft section of the hub wheel 1 are opposed to each other. The second outer raceway surface 27 and a second inner raceway surface (inner race) 29 provided on an outer circumferential surface of the inner ring 24 are opposed to each other. Balls as rolling elements 30 are interposed between the first outer raceway surface 26 and the first inner raceway surface 28 and between the second outer raceway surface 27 and the second inner raceway surface 29. Therefore, in this bearing device for a wheel, the hub wheel 1 and the inner ring 24 configure an inner member 39 of the roller bearing 2. Seal members S1 and S2 are inserted in both openings of the outer member 25.

A knuckle 34 (see FIG. 26, etc.) extending from a suspension system for a vehicle body not shown in the figure is attached to the outer ring as the outer member 25. An entire outer surface of the outer member 25 is formed as a cylindrical surface. This cylindrical surface is set as a press-fitting surface 25a in which the knuckle 34 is press-fit. Consequently, the outer member 25 can be press-fit into a cylindrical inner diameter surface of the knuckle. In this case, it is desirable to set to regulate, with a tightening margin between the knuckle press-fitting surface 25a and the knuckle inner diameter surface, relative shift in an axial direction and a circumferential direction of the knuckle 34 and the outer member 25. For example, when mating surface pressure×mating area between the outer member 25 and the knuckle 34 is mating load, a value obtained by dividing this mating load with equivalent radial load of this bearing for a wheel is set as a creep occurrence limit coefficient. A design specification for the outer member 25, i.e., a fitting margin between the outer member 25 and the knuckle is set by taking into account this creep occurrence limit coefficient in advance.

Figure 26:
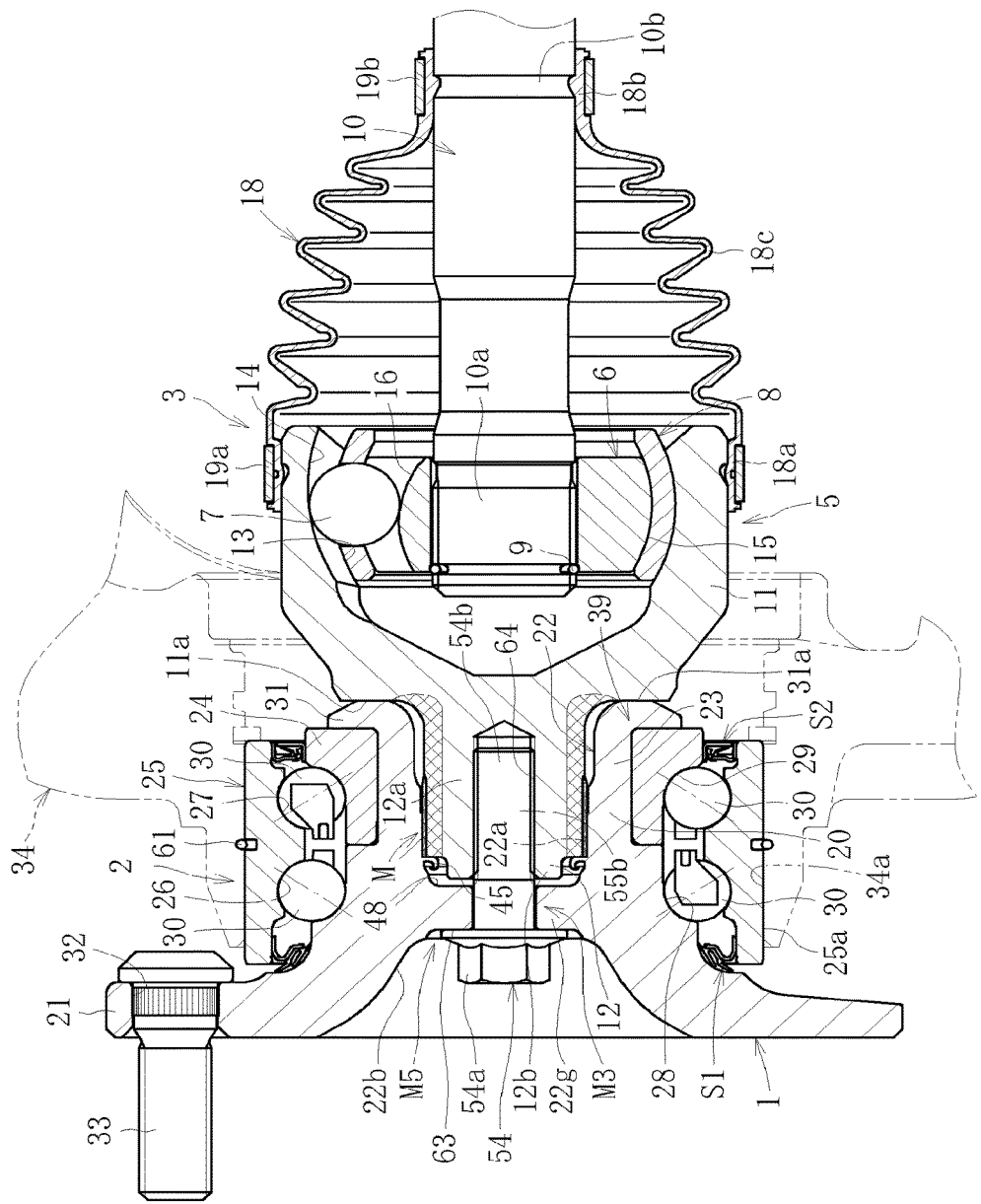
FIG. 26 is a main part sectional view of a bearing device for a wheel illustrating a ninth embodiment of the present invention.

Therefore, it is possible to prevent slip-off in the axial direction and creep in the circumferential direction of the outer member 25 with the tightening margin between the knuckle press-fitting surface 25a of the outer member 25 and the knuckle inner diameter surface of the knuckle 34. The creep means that the bearing slightly moves in the circumferential direction because of insufficiency of the mating margin, machining accuracy failure of the fitting surface, or the like and the mating surface changes to a mirror surface and, in some case, the fitting surface involves score, and seizure or adhesion occurs. As illustrated in FIG. 26 and the like, it is preferable to provide circumferential direction grooves in the knuckle press-fitting surface 25a of the outer member 25 and an inner diameter surface 34a of the knuckle 34, respectively, and a lock ring 61 for slip-off prevention is inserted between those circumferential direction grooves.

In this case, the end on the inboard side of the hub wheel 1 is caulked and the inner ring 24 is pressed to the outboard side by the caulking section 31, whereby preload is applied to this bearing 2. Consequently, the inner ring 24 can be fastened to the hub wheel 1. An end surface 24a on the inboard side of the inner ring 24 is pressed to the outboard side along the axial direction by the caulking section 31. An end surface 24b on the outboard side of the inner ring 24 comes into contact or press-contact with the end surface 23a of the step section 23. A bolt inserting hole 32 is provided in the flange 21 of the hub wheel 1. A hub bolt 33 for fixing a wheel and a brake rotor to this flange 21 are inserted into this bolt inserting hole 32.

Figure 2A:
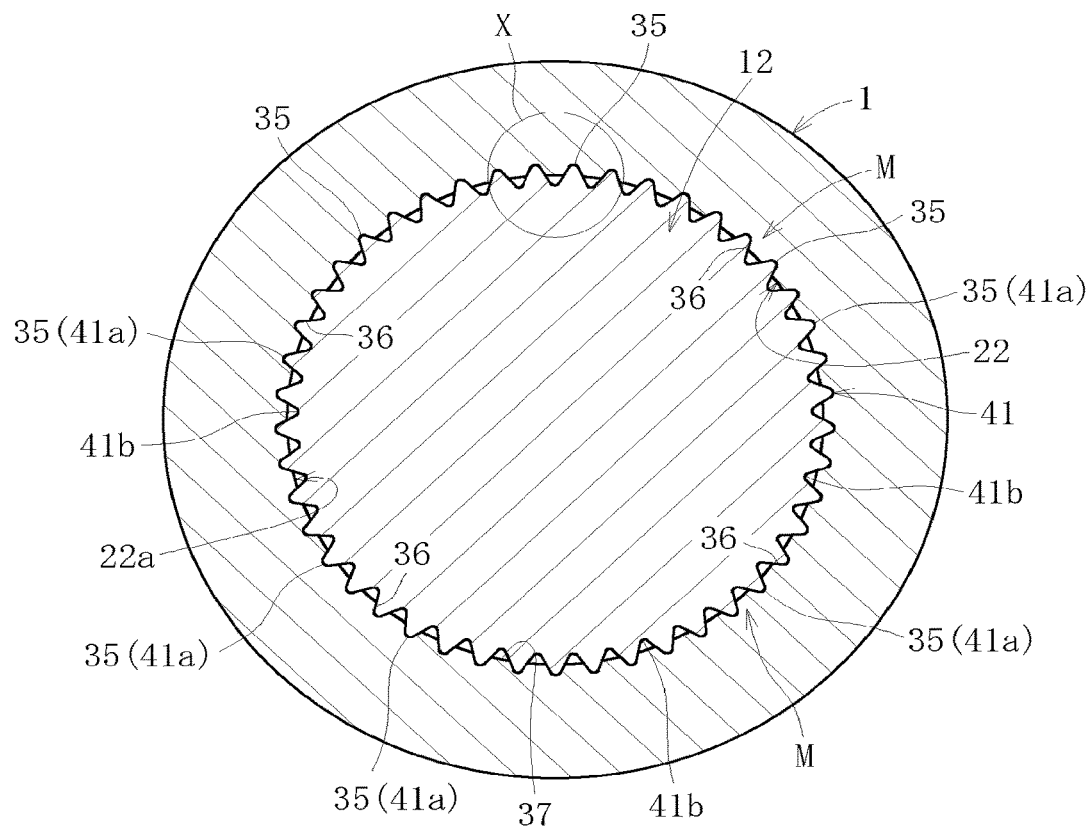
FIG. 2A is an enlarged sectional view of a recess-projection fitting structure of the bearing device for a wheel.

As illustrated in FIG. 2, the recess-projection fitting structure M is formed, for example, of axially extending projections 35 provided to the stem shaft 12, and recesses 36 formed in the inner diameter surface of the hole section 22 of the hub wheel 1 (inner diameter surface 37 of shaft section fitting hole 22a in this case). The entire regions of the fitting contact regions 38 of the projections 35 and the recesses 36 of the hub wheel 1 fit in the projections 35 are held in close contact. Plural projections 35 are arranged at a predetermined circumferential pitch on the outer peripheral surface of the opposite mouse side of the stem shaft 12, and plural recesses 36 to be fit in the projections 35 are formed circumferentially in the inner diameter surface 37 of the shaft section fitting hole 22a of the hole 22 of the hub wheel 1. That is, over the circumferential entire periphery, the projections 35 and the recesses 36 fit-engaged thereto are tightly fit in each other.

In this case, the respective projections 35 are formed in a triangular shape (ridge shape) having a vertex of a projected R shape in section. Fitting contact regions (recess fitting regions) 38 of the projections 35 are ranges A illustrated in FIG. 2B and ranges from halfway sections of the ridges in section to the tops of the ridges. A gap 40 is formed further on an inner diameter side than an inner diameter surface 37 of the hub wheel 1 between the projections 35 adjacent to each other in the circumferential direction.

In this way, the hub wheel 1 and the stem shaft 12 of the outer ring 5 of the constant-velocity universal joint 3 can be connected through an intermediation of the recess-projection fitting structure M. In connecting the hub wheel 1 and the stem shaft 12, because the end on the inboard side of the hub wheel 1 is caulked and preload is applied to the roller bearing 2 by the caulking section 31 as described above, it is unnecessary to apply preload to the inner ring 24 in the mouth section 11 of the outer ring 5. However, in the present invention, the end of the hub wheel 1 (in this case, an outer end surface 31a of the caulking section 31) and an opposed surface of the outer ring 5 opposed to the end of the hub wheel 1 (back surface 11a of the mouth section 11) are brought into contact with each other. Contact surface pressure in this case is set to be equal to or smaller than 100 MPa.

Incidentally, the shaft slip-off preventing structure M1 is provided between the end of the stem shaft 12 of the outer ring 5 and the inner diameter surface 37 of the hub wheel 1. This shaft slip-off preventing structure M1 includes an expanded-diameter caulking section (tapered locking piece) 65 that extends from the end of the stem shaft 12 of the outer ring 5 to the outboard side and locks to a tapered hole 22b. In other words, the expanded-diameter caulking section 65 includes a ring-like member that increases in diameter from the inboard side to the outboard side. At least a part of an outer circumferential surface 65a thereof comes into press-contact or contact with the tapered hole 22b.

In this bearing device for a wheel, foreign-matter intrusion preventing means W for preventing intrusion of foreign matters into the recess-projection fitting structure M are respectively provided further on the inboard side (the inner side of the vehicle in the state in which the bearing device is attached to be vehicle) than the recess-projection fitting structure M and further on the outboard side (the outer side of the vehicle in the state in which the bearing device is attached to the vehicle) than the recess-projection fitting structure M.

The out board side foreign-matter intrusion prevention means W2 can be formed of a seal material (not shown) provided between the tapered locking piece 65 described above constituting an engagement section and the inner diameter surface of the tapered hole 22b. In this case, a seal material is applied to the tapered locking piece 65. That is, there is applied a seal material (seal agent) selected from among various resins curable after the application and capable of exerting sealing property between the tapered locking piece 65 and the inner diameter surface of the tapered hole 22b. Note that, as this seal material, there is selected one that does not deteriorate in the atmosphere in which this bearing device for a wheel is used.

The foreign-matter intrusion preventing means W1 on the inboard side can be configured by bringing the outer end surface 31a of the caulking section 31 of the hub wheel 1 and the back surface 11a of the mouth section 11 into contact with each other. A seal material (seal agent) may be applied to at least one of the outer end surface 31a and the back surface 11a.

It is also possible to provide a seal material in the fitting contact region 38 between the projections 35 and the recesses 36, and in a gap 40, thereby forming a foreign-matter intrusion prevention means W (W3). In this case, there is applied to the surfaces of the projections 35 a seal material (seal agent) selected from among various resins curable after the application and capable of exerting sealing property in the fitting contact region 38.

When this bearing device for a wheel is assembled, as described later, the recesses 36 are formed by the projections 35 by press-fitting the stem shaft 12 of the outer ring 5 into the hub wheel 1. When the stem shaft 12 is press-fit into the hub wheel 1, a material is extruded from the recesses 36 formed by the projections 35 and an extruded portion 45 (see FIG. 3) is formed. The extruded portion 45 is equivalent to a volume of the material of the recesses 36 in which recess fitting regions of the projections 35 are fit in. The extruded portion 45 includes the material extruded from the recesses 36 to be formed, the material cut for forming the recesses 36, or the material extruded and cut. Therefore, in the bearing device for a wheel illustrated in FIG. 1 and the like, a pocket section 50 for storing the extruded portion 45 is provided to the stem shaft 12.

The pocket section 50 is formed by providing a circumferential direction groove 51 at a shaft edge of a spline 41 of the stem shaft 12. The expanded-diameter caulking section (tapered locking piece) 65 configuring the shaft slip-off preventing structure M1 is formed further on an opposite spline side than the circumferential direction groove 51.

A method of fitting the recess-projection fitting structure M is described. In this case, as illustrated in FIG. 5, thermosetting treatment is applied to an outer diameter section of the stem shaft 12 of the outer ring 5 of the constant-velocity universal joint 3. The spline 41 including projections 41a and recesses 41b along the axial direction is formed in this hardened layer H. Therefore, the projections 41a of the spline 41 are hardened and changes to the projections 35 of the recess-projection fitting structure M. A range of the hardened layer H in this embodiment is, as indicated by a cross hatching section, from an outer edge of the spline 41 to a part of a bottom wall of the mouth section 11 of the outer ring 5. As this thermosetting treatment, various kinds of heat treatment such as induction hardening and carburizing and quenching can be adopted. The induction hardening is a hardening method employing the principle of inserting a section necessary for hardening into a coil through which a high-frequency current flows, generating Joule heat with an electromagnetic induction action, and heating a conductive substance. The carburizing and quenching is a method of causing carbon to intrude/spread from the surface of a low carbon material and performing hardening after that. A hardened layer H1 by the induction hardening is formed on the outer diameter side of the hub wheel 1 and the inner diameter side of the hub wheel is left in an unhardened state. A range of the hardened layer H1 in this embodiment is, as indicated by a cross hatching section, from a base section of the flange 21 to near the caulking section of the step section 23 in which the inner ring 24 fits.

If the induction hardening is performed, the surface can be hard and hardness of a material in the inside can be kept. Therefore, the inner diameter side of the hub wheel 1 can be maintained in the unhardened state. The inner diameter surface 37 side of the hole 22 of the hub wheel 1 is an unhardened section not subjected to the thermosetting treatment (in an unhardened state). A hardness difference between the hardened layer H of the stem shaft 12 of the outer ring 5 and the unhardened section of the hub wheel 1 is set to be equal to or larger than 20 points in HRC. Specifically, the hardness of the hardened layer H is set to about 50 HRC to 65 HRC and the hardness of the unhardened section is set to about 10 HRC to 30 HRC.

Figure 4:
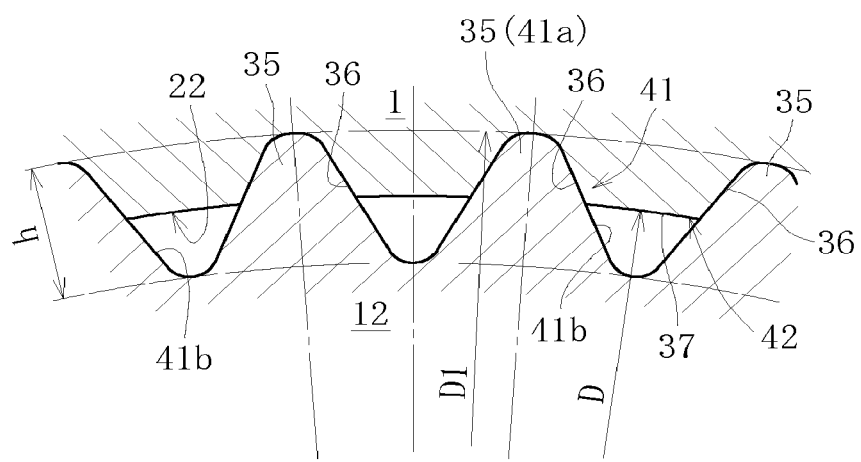
FIG. 4 is a main part enlarged sectional view of the recess-projection fitting structure of the bearing device for a wheel.

In this case, a projecting direction intermediate region of the projections 35 corresponds to a position of a recess forming surface before recess formation (in this case, the inner diameter surface 37 of the hole 22 of the hub wheel 1). That is, as illustrated in FIG. 4, an inner diameter dimension D of the inner diameter surface 37 of the hole 22 is set smaller than a maximum outer diameter of the projections 35, i.e., a maximum diameter dimension (circumscribed circle) D1 of a circle connecting vertexes of the projections 35 as the projections 41a of the spline 41 and is set larger than an outer diameter dimension of a shaft outer diameter surface among the projections, i.e., a maximum diameter dimension D2 (see FIG. 5) of a circle connecting bottoms of the recesses 41b of the spline 41. In other words, the dimensions are set in a relation of D2<D<D1.

The spline 41 can be formed by various machining methods such as component rolling, cutting, pressing, and drawing, which are publicly known and used conventional means. As the thermosetting treatment, various kinds of heat treatment such as induction hardening and carburizing and quenching can be adopted.

As illustrated in FIG. 5, before the stem shaft 12 of the outer ring 5 is press-fit into the hole 22 of the hub wheel 1, a cylindrical section 66 for configuring the expanded-diameter caulking section 65 is projected from an outer circumferential edge of the end surface 12a of the stem shaft 12 along the axial direction. An outer diameter D4 of the cylindrical section 66 is set smaller than an inner diameter dimension D of a fitting hole 22a of the hole 22. As described later, this cylindrical section 66 functions as a guide section for centering during press fitting of the hub wheel 1 of the stem shaft 12 into the hole 22. Further, an inner diameter D3 of a large diameter section 22c of the hub wheel 1 is set larger than the maximum diameter dimension (circumscribed circle diameter) D1. If the outer diameter D4 of the cylindrical section 66 is the same as or larger than a hole diameter of the fitting hole 22a, the cylindrical section 66 itself is press-fit into the fitting hole 22a. When the cylindrical section 66 is press-fit, if the cylindrical section 66 is decentered, the projections 35 of the recess-projection fitting structure M are press-fit in this state. The shaft section 12 and the hub wheel 1 are connected in a state in which the axis of the stem shaft 12 and the axis of the hub wheel 1 are not aligned. Further, if the outer diameter D4 of the cylindrical section 66 is too smaller than the hole diameter of the fitting hole 22a, the cylindrical section 66 does not function as the guide section for centering. Therefore, it is preferable to set a very small gap between the outer diameter surface of the cylindrical section 66 and the inner diameter surface of the fitting hole 22a of the hole 22 to about 0.01 mm to 0.2 mm.

The stem shaft 12 of the outer ring 5 is inserted (press-fit) into the hub rig 1 in a state in which the axis of the hub wheel 1 and the axis of the outer ring 5 of the constant-velocity universal joint are aligned. A seal material is applied to the surface of the projection 35 in advance. When the stem shaft 12 is inserted, because the taper section 22d the decreases in diameter along a press-fitting direction is formed in the hole 22 of the hub wheel 1, this taper section 22d can form a guide at the start of press fitting. The diameter dimension D of the inner diameter surface 37 of the hole 22, the maximum diameter dimension D1 of the projections 35, and the outer diameter dimension (diameter dimension) D2 of the recess bottoms of the spline 41 are in the relation described above. Moreover, the hardness of the projections 35 is larger than the hardness of the inner diameter surface 37 of the hole 22 by 20 points or more. Therefore, if the shaft 10 is press-fit into the hole 22 of the inner ring 6, the projections 35 bite in the inner diameter surface 37. The projections 35 form the recesses 36, in which the projections 35 fit, along the axial direction.

Figure 3:
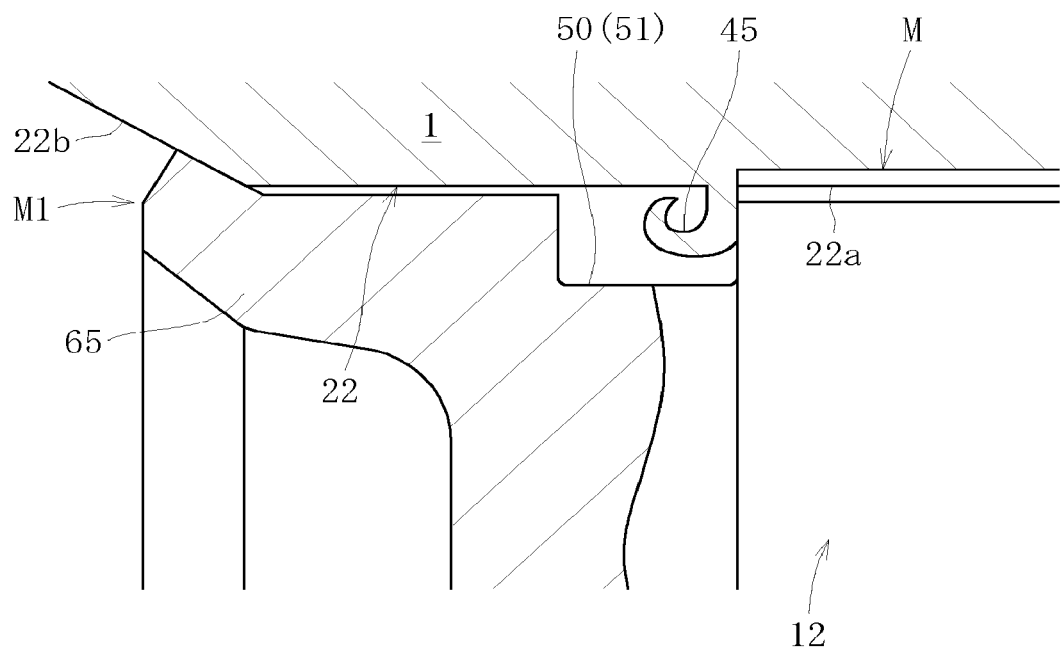
FIG. 3 is a main part enlarged sectional view of the bearing device for a wheel.

Because the shaft 10 is press-fit in the hole 22 in this away, as illustrated in FIG. 3, the extruded portion 45 to be formed is stored in the pocket section 50 while curling. In other words, a part of the material scraped off or extruded from the inner diameter surface of the hole 22 enters the pocket section 50.

According to the press fitting, as illustrated in FIG. 2, the entire fitting contact regions 38 of the projections 35 at the end of the stem shaft 12 and the recesses 36 fit therein adhere to each other. In other words, a shape of the projections 35 is transferred onto a recess formation surface on the opposite side (in this case, the inner diameter surface 37 of the hole 22). When the shape is transferred, because the projections 35 bite in the inner diameter surface 37 of the hole 22, the hole 22 is slightly expanded in diameter and allows movement in the axial direction of the projections 35. If the movement in the axial direction stops, the hole 22 decreases in diameter to return to the original diameter. In other words, the hub wheel 1 is elastically deformed in the diameter direction when the projections 35 are press-fit, and preload equivalent to this elastic deformation is applied to a tooth surface of the projections 35 (surface of the recess fitting region). Therefore, it is possible to surely form the recess-projection fitting structure M in which the entire recess fitting regions of the projections 35 adhere to the recesses 36 corresponding thereto.

That is, a female spline 42 adhering to the spline (male spline) 41 on the stem shaft 12 side is formed on the inner diameter surface of the hole 22 of the hub wheel 1 by the male spline 41. Further, a space between the fitting contact regions 38 of the projections 35 and the recesses 36 are sealed by the seal material applied to the surface of the projections 35.

The recess-projection fitting structure M is configured as described above. The recess-projection fitting structure M in this case is arranged avoiding positions right below the raceway surfaces 26, 27, 28, and 29 of the roller bearing 2. Positions avoiding the positions right below the raceway surfaces 26, 27, 28, and 29 are positions not corresponding to ball contacting positions of the raceway surfaces 26, 27, 28, and 29 in the diameter direction.

In this recess-projection fitting structure M, as illustrated in FIG. 4, when a diameter difference (D1−D) between the maximum diameter dimension D1 of the stem shaft 12 and the inner diameter dimension D of the fitting hole 22a of the hole 22 of the hub wheel 1 is represented as Δd, the height of the projections 35 provided on the outer diameter surface of the stem shaft 12 is represented as h, and a ratio of the diameter difference and the height is represented as Δd/2h, a relation among the diameter difference, the height, and the ratio is 0.3<Δd/2h<0.86. Consequently, the projecting direction intermediate regions (height direction intermediate regions) of the projections 35 are surely arranged on the recess formation surface before recess formation. Therefore, the projections 35 bite in the recess formation surface during press fitting and the recesses 36 can be surely formed.

When the stem shaft 12 of the outer ring 5 is press-fit in the hole 22 of the hub wheel 1, a step surface G is provided on the outer diameter surface of the mouth section 11 of the outer ring 5 as illustrated in FIG. 1 and the like. A press-fitting jig K only has to be engaged with this step surface G to apply press-fitting load (axial direction load) from this press-fitting jig K to the step surface G. Note that the step surface G can be formed by a circumferential direction groove provided on the outer diameter surface of the mouth section 11.

The press-fitting jig K can be formed by a ring-like member 47 made of, for example, a split mold. In other words, the ring-like member 47 includes plural (at least two) segments 47a and is formed in a ring shape by combining the segments 47a. The ring-like member 47 formed by combining the segments 47a in the ring shape includes a main body annular section 57, a taper section 58 connected to this main body annular section 57, and an inner collar section 59 projecting from this taper section 58 to the inner diameter side.

Therefore, the inner collar section 59 of the press-fitting jig K is set in contact with the step surface G formed by the circumferential direction groove. In this state, load (pressing force) in an arrow E direction (axial direction) of FIG. 1 is applied to the press-fitting jig 55. Consequently, this load can be applied to the outer ring 5 through an intermediation of an inner collar section 53 engaged with the step surface G. The stem shaft 12 of the outer ring 5 can be pressed-fit into the hole 22 of the hub wheel 1. To apply the axial direction load to the press-fitting jig K, various axial direction reciprocating mechanisms such as a press mechanism, a cylinder mechanism, and a ball screw mechanism can be used. The step surface G can be formed by recesses disposed at a predetermined pitch along the circumferential direction rather than being formed by the circumferential direction groove. Further, the step surface G may be formed by projected streaks or projections rather than the groove or the recesses.

Figure 8:
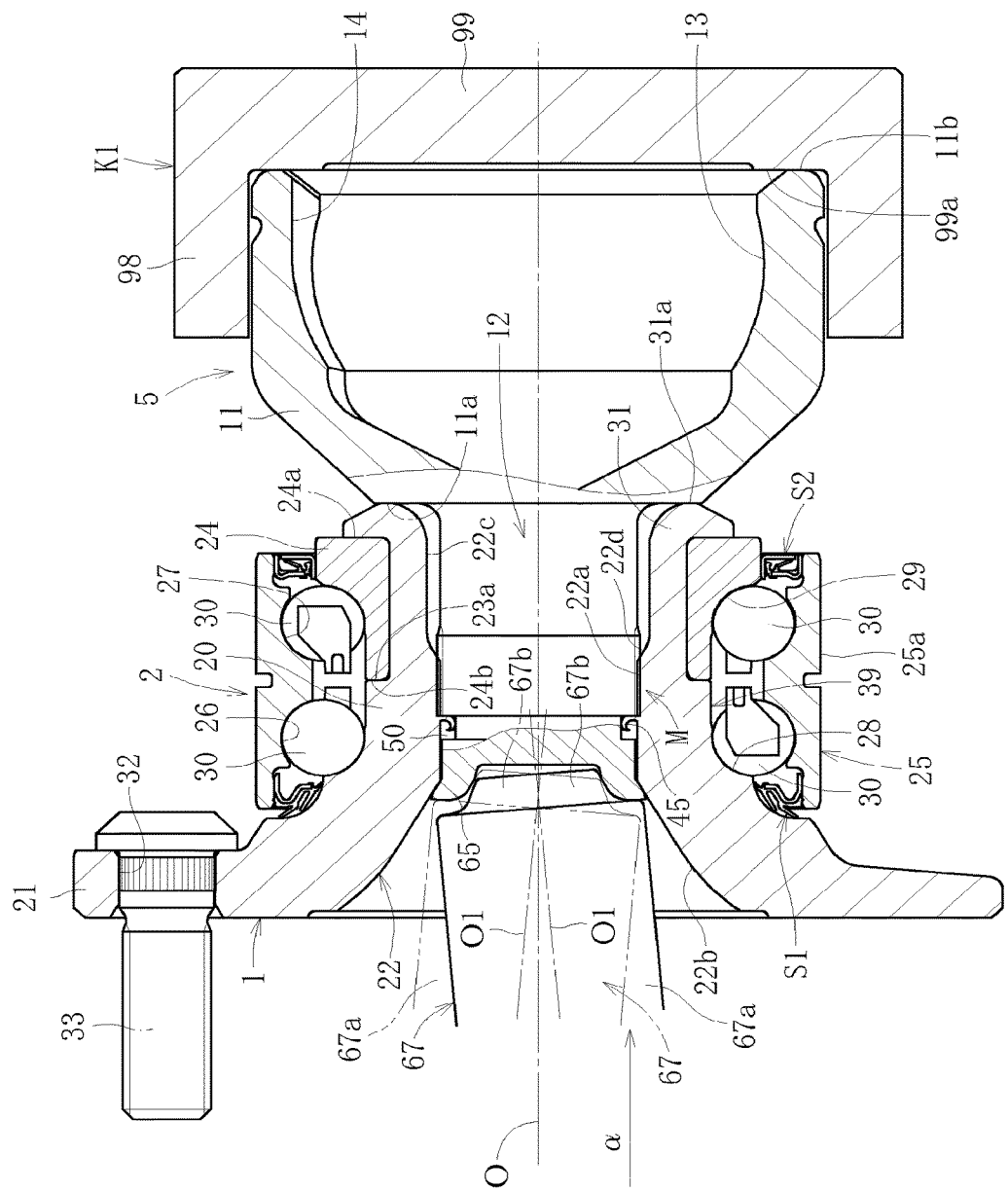
FIG. 8 is a sectional view illustrating the process for assembling the bearing device for a wheel using the jig.
Figure 9:
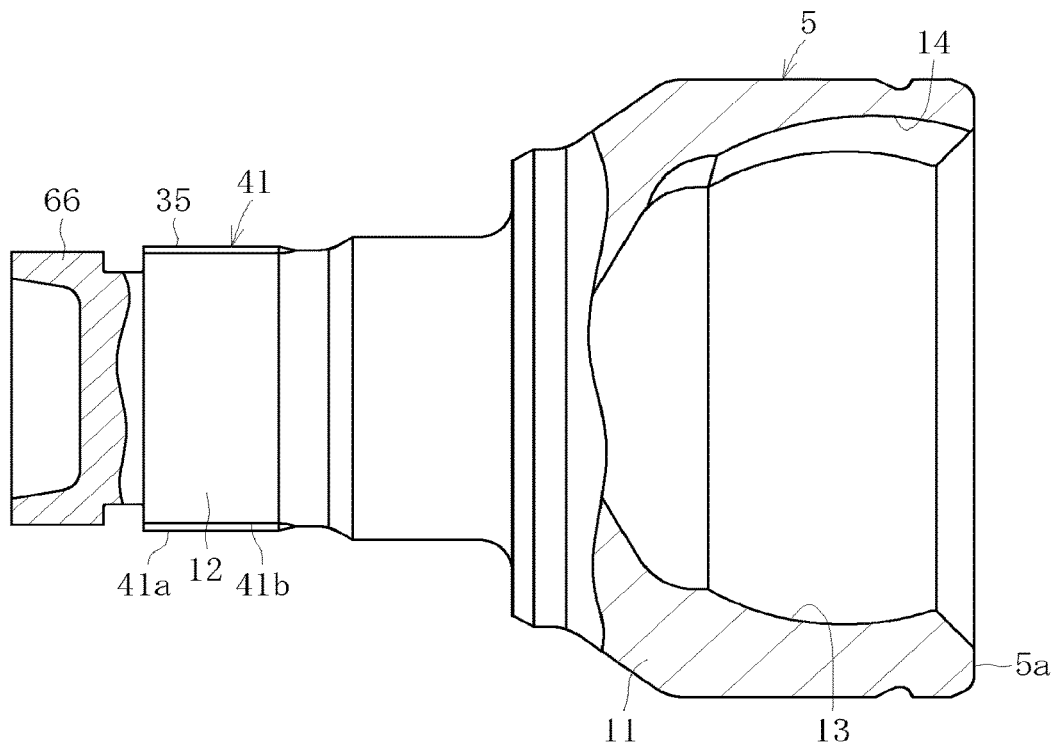
FIG. 9 is a sectional view illustrating a method of press-fitting a single outer ring into a hub wheel.
Figure 10:
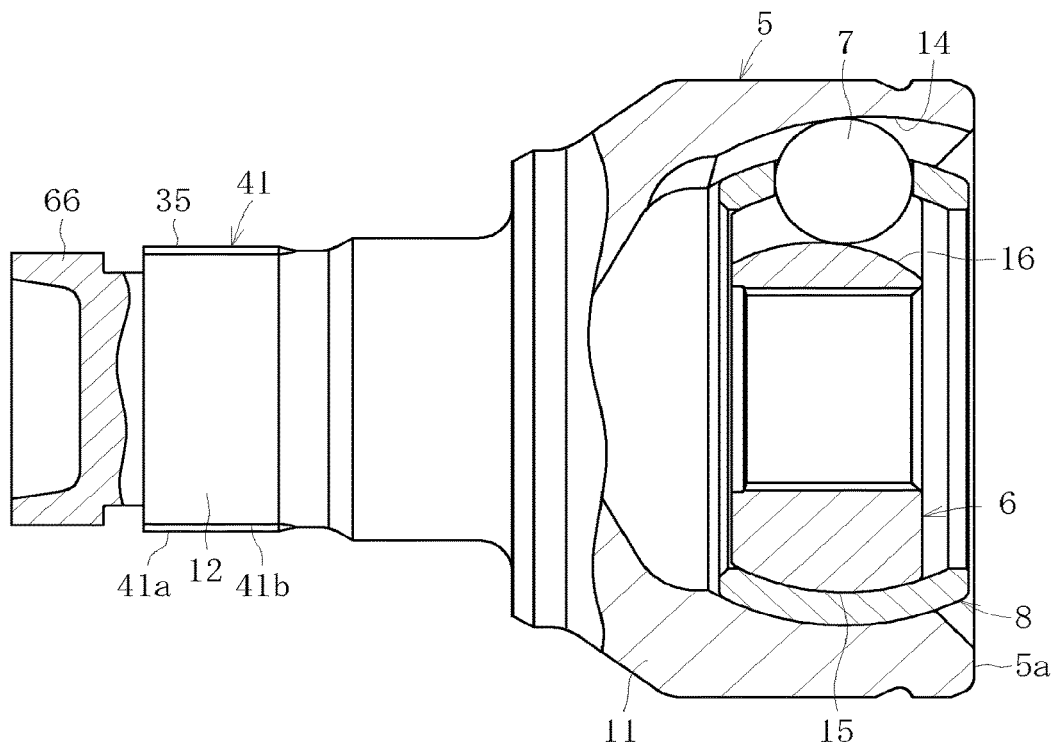
FIG. 10 is a sectional view illustrating a method of press-fitting an outer ring, an inner ring, a ball, and a cage into the hub wheel in an assembled state.

When the stem shaft 12 is press-fit into the hole 22 of the hub wheel 1 in a state of the outer ring 5 alone of the constant-velocity universal joint 3 illustrated in FIG. 9 or a state in which the outer ring 5, the inner ring 6, the ball 7, and the cage 8 are assembled as illustrated in FIG. 10 rather than a state of a drive shaft assembly, a method of applying press-fitting load to an end surface 5a on the inboard side of the outer ring 5 may be adopted. The stem shaft 12 can be press-fit without providing the step surface G on the outer diameter surface of the outer ring 5. In other words, the jig K1 illustrated in FIG. 8 can be used. The jig K1 can be formed by a bottomed short cylindrical member. In other words, the jig K1 includes a main body section 98 made of a cylindrical member and a bottom wall 99 that blocks the opening on the inboard side of this main body section 98. In FIGS. 9 and 10, a Rzeppa constant-velocity universal joint in which groove bottoms of the track grooves 14 and 16 are formed by arc sections is illustrated in FIGS. 9 and 10. Even when the stem shaft 12 is press-fit by the outer ring 5 alone or the like in this way, the constant-velocity universal joint may be other constant-velocity universal joints such as an undercut free type in which the groove bottoms of the track grooves 14 and 16 have linear straight sections.

Figure 6:
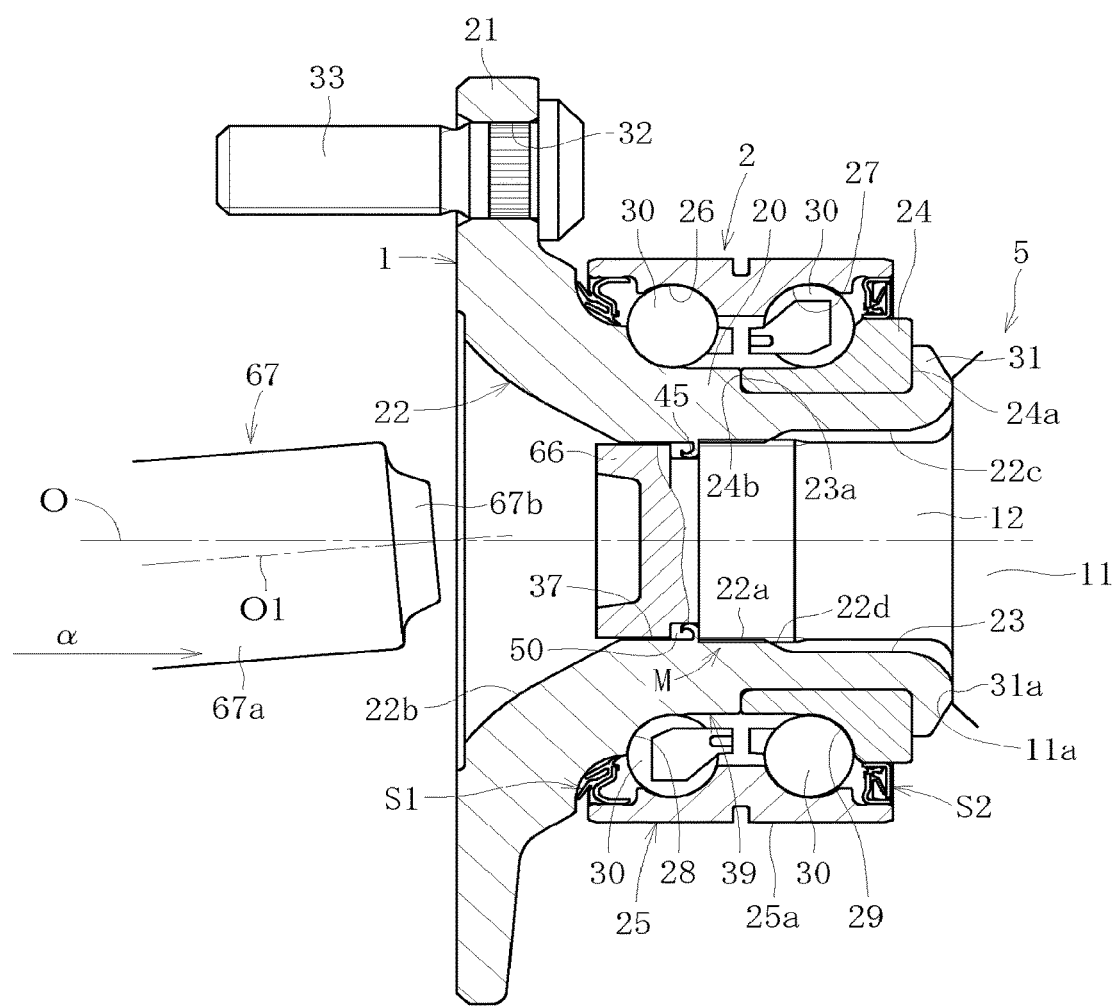
FIG. 6 is a sectional view illustrating a process for assembling the bearing device for a wheel using a jig.

In a state in which the stem shaft 12 of the outer ring 5 is press-fit in the hole 22 of the hub wheel 1, and the stem shaft 12 of the outer ring 5 and the hub wheel 1 are integrated through an intermediation of the recess-projection fitting structure M, as illustrated in FIG. 6, the cylindrical section 66 projects from the fitting hole 22a to the tapered hole 22b side.

Figure 7:
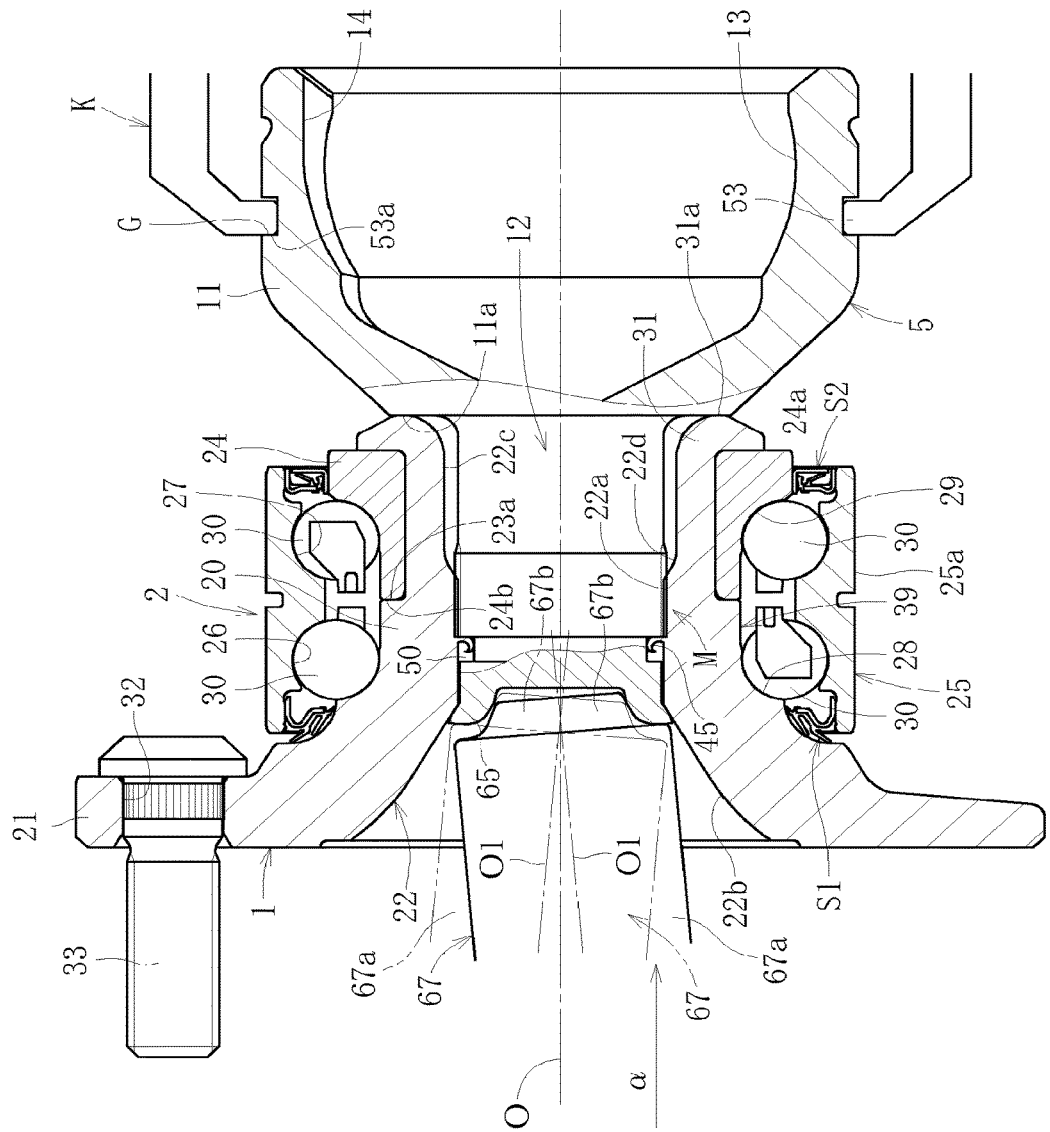
FIG. 7 is a sectional view illustrating the process for assembling the bearing device for a wheel using the jig.

Therefore, this cylindrical section 66 is expanded in diameter by using a jig 67 illustrated in FIGS. 6 to 8. The caulking jig 67 includes a columnar main body section 67a and a distal end swelling section 67b provided on a distal end surface of this main body section 67a. In this case, the distal end swelling section 67b can be loosely fit in the cylindrical section 66. An outer circumferential surface of the distal end swelling section 67b is formed as a gentle radius section on a main body section side thereof.

In this case, the distal end swelling section 67b of the caulking jig 67 is fit in the cylindrical section 66. As illustrated in FIGS. 7 and 8 and the like, the caulking jig 67 is swung while being pressed in an arrow α direction. The swinging is to swing the caulking jig 67 with a device axis O as a rotation axis, and with an intersection of a jig axis O1 and the device axis O as a fulcrum such that the jig axis O1 tilts relative to the device axis O. Consequently, a circumferential wall surface of the distal end swelling section 67b presses an inner diameter surface of the cylindrical section 66 to an outer diameter side. Therefore, the cylindrical section 66 is plastically deformed outward in the diameter direction and the expanded-diameter caulking section (tapered locking piece) 65 illustrated in FIG. 1 is formed. The shaft slip-off preventing structure M1 is formed in a hook structure in which the cylindrical section 66 provided at the shaft end of the stem shaft 12 is plastically deformed outward in the diameter direction by the swinging caulking by the swinging caulking jig 67.

In this case, in order to support the outer ring 5 of the constant-velocity universal joint 3, for example, the jig K illustrated in FIG. 7 and the jig K1 illustrated in FIG. 8 can be used. The jig K can receive axial direction load by the swinging caulking through an intermediation of the inner collar section 53 engaged with the step surface G. In the jig K1, a main body section 98 is fit in the opening side of the mouth section 11 of the outer ring 5 and an inner surface 99a of a bottom wall 99 is brought into contact with the opening end 11b of the mouth section 11. In this way, the jib K1 can receive the axial direction load by the swinging caulking.

Certain degree of load is applied during press fitting (when the stem shaft 12 is press-fit into the hub wheel 1) to strike the back surface 11a of the outer ring 5 of the constant-velocity universal joint 3 against the caulking section 31. After the load is removed, contact surface pressure of a striking section of the back surface 11a (end surface 31a of caulking section 31) is reduced by spring-back of the outer ring 5 of the constant-velocity universal joint 3. When the cylindrical section 66 is caulked, load is applied in the axial direction. After the caulking, the contact surface pressure of the striking section of the back surface 11a (end surface 31a of caulking section 31) can be reduced by spring-back of the stem shaft 12. Therefore, this contact surface pressure can be set to be equal to or lower than 100 MPa.

In the present invention, it is possible to surely form the recess-projection fitting structure M in which the entire fitting contact regions 38 of the projections 35 of the stem shaft 12 and the recesses 36 of the hub wheel 1 adhere to each other. Moreover, it is unnecessary to form spline sections and the like in a member in which the recesses 36 are formed. The bearing device for a wheel is excellent in productivity. Further, phase alignment of the splines is unnecessary. It is possible to realize improvement of assemblability, prevent damage to the tooth surfaces during press fitting, and maintain a stable fit state.

In the recess-projection fitting structure M, because the entire fitting contact regions 38 of the projections 35 and the recesses 36 adhere to each other, a gap in which a backlash occurs is not formed in the diameter direction and the circumferential direction. Therefore, the entire fitting regions contribute to torque transmission, stable torque transmission is possible, and noise is not caused.

Because the shaft slip-off preventing structure M1 is a hook structure in which the cylindrical section is plastically deformed outward in the diameter direction, screw fastening as in the conventional art can be omitted. Therefore, it is unnecessary to form a screw section projecting from the hole 22 of the hub wheel 1 in the stem shaft 12. It is possible to realize a reduction in weight, omit screw fastening work, and realize improvement of assembly workability.

With this shaft slip-off preventing structure M1, it is possible to effectively prevent the stem shaft 12 of the outer joint member from slipping off in the axial direction from the hole 22 of the hub wheel 1. Consequently, it is possible to maintain a stable connected state and realize improvement of a quality of the bearing device for a wheel. Moreover, caulking load during caulking may be relatively small. It is possible to increase the thickness of this caulking section 65 and bring the caulking section 65 into press-contact with the hub wheel inner diameter surface through an intermediation of large press-contact force. Consequently, it is possible to provide a firmer slip-off preventing mechanism (structure). Further, because such a firm slip-off preventing mechanism (structure) M1 is provided, bending rigidity of the stem shaft 12 is improved and the stem shaft 12 is robust against bending. If the caulking load during caulking can be reduced, it is possible to prevent deformation of a region that receives load (load receiving section of the outer joint member of the constant-velocity universal joint 3, e.g., a step surface provided on the outer diameter surface of the outer joint member and an opening side end surface of the outer joint member).

The caulking section 31 and the back surface 11a of the mouth section 11 of the outer ring 5 are set in contact with each other, whereby bending rigidity in the axial direction is improved, the shaft becomes robust against bending, and a high-quality product excellent in durability is obtained. Moreover, positioning during press fitting can be realized by this contact. Consequently, dimension accuracy of this bearing device for a wheel is stabilized, it is possible to secure stable length as axial direction length of the recess-projection fitting structure M disposed along the axial direction and to realize improvement of torque transmission performance. Further, a seal structure can be configured by this contact. It is possible to prevent intrusion of foreign matters into the recess-projection fitting structure M from this caulking section 31 side. The recess-projection fitting structure M can maintain a stable fit state over a long period of time.

Because the end of the hub wheel 1 is caulked and preload is applied to the roller bearing 2, it is unnecessary to apply preload with the mouth section 11 of the outer ring 5. Therefore, it is possible to press-fit the stem shaft 12 of the outer ring 5 without taking into account preload and realize improvement of connectability (assemblability) of the hub wheel 1 and the outer ring 5.

When the contact surface pressure between the caulking section 31 of the hub wheel 1 and the back surface 11a of the mouth section 11 exceeds 100 MPa, noise is likely to be caused. When torque load is large, a difference occurs in torsion amounts of the outer ring 5 of the constant-velocity universal joint 3 and the hub wheel 1. Sudden slip occurs in the contact section of the outer ring 5 of the constant-velocity universal joint 3 and the hub wheel 1 because of this difference and noise occurs. On the other hand, when the contact surface pressure is equal to or lower than 100 MPa as in the present invention, it is possible to prevent sudden slip from occurring and suppress occurrence of noise. Consequently, it is possible to configure a silent bearing device for a wheel. Even if the contact surface pressure is equal to or lower than 100 MPa, it is preferable to set the contact surface pressure to be equal to or higher than surface pressure with which a seal structure can be configured.

By providing the pocket section 50 for storing the extruded portion 45 caused by recess formation by the press fitting, it is possible to hold (maintain) the extruded portion 45 in this pocket section 50. The extruded portion 45 does not enter the inside of the vehicle and the like on the outside of the device. In other words, the extruded portion 45 can be kept stored in the pocket section 50. It is unnecessary to perform removal processing for the extruded portion 45. It is possible to realize a reduction in assembly work man-hour and realize improvement of assembly workability and cost reduction.

By providing the collar section 52 for centering with the hole 22 of the hub wheel 1 on an opposite projection side in the axial direction of the pocket section 50, ejection of the extruded portion 45 in the pocket section 50 to the guide section side is eliminated. The extruded portion 45 is more stably stored. Moreover, because the guide section is used for centering, it is possible to press-fit the stem shaft 12 into the hub wheel 1 while preventing decentering. Therefore, it is possible to highly accurately connect the outer joint member and the hub wheel 1 and perform stable torque transmission.

Further, by arranging the projecting direction intermediate regions of the projections 35 on the recess formation surface before recess formation, the projections 35 bite in the recess formation surface during press fitting and the recesses 36 can be surely formed. In other words, it is possible to sufficiently secure a press-fitting margin for the opposite side of the projections 35. Consequently, moldability of the recess-projection fitting structure M is stabilized, no fluctuation in press-fitting load occurs, and stable torsion strength can be obtained.

Because the guide section for centering, i.e., the cylindrical section 66 is provided in the stem shaft 12, the stem shaft 12 can be press-fit into the hub wheel 1 without causing decentering to thereby stably perform formation of the recesses 36 by the projections 35. Therefore, it is possible to highly accurately configure the recess-projection fitting structure M. Further, because the taper section 22d can configure a guide at the start of press fitting, it is possible to press fit the stem shaft 12 of the outer ring 5 into the hole 22 of the hub wheel 1 without causing decentering to thereby perform stable torque transmission.

In the embodiment illustrated in FIG. 1 and the like, the projections 35 of the recess-projection fitting structure M is provided in the stem shaft 12 of the outer ring 5, the hardness in the axial direction end of the projections 35 is set higher than that of the hole inner diameter section of the hub wheel 1, and the stem shaft 12 is press-fit into the hole 22 of the hub wheel 1. Therefore, it is possible to increase the hardness on the shaft side and improve rigidity of the shaft.

Generation of hoop stress on the bearing raceway surface is suppressed by arranging the recess-projection fitting structure M avoiding a position right below the raceway surface of the roller bearing 2. Consequently, it is possible to prevent occurrence of deficiencies of the bearing such as a reduction in rolling fatigue life, occurrence of a crack, and stress corrosion crack.

As in this embodiment, teeth with a module equal to or smaller than 0.5 are used in the spline 41 formed in the stem shaft 12. Therefore, it is possible to realize improvement of moldability of this spline 41 and realize a reduction in press-fitting load. Because the projections 35 can be formed by a spline normally formed in the shaft of this kind, it is easy to form the projections 35 at low cost.

The outer circumferential surface 25a of the outer member 25 of the bearing 2 is fit and built in the knuckle 34 on the vehicle body side. The fitting and building-in means that the outer member 25 is completed to be built in the knuckle 34 by fitting the outer member 25 in the knuckle 34. The outer member 25 can be built in the knuckle 34 by press-fitting, for example, the outer circumferential surface 25a of the cylindrical surface shape of the outer member 25 into the cylindrical inner circumferential surface 34a of the knuckle 34.

When a diameter difference between the outer diameter dimension D1 of the stem shaft 12 and the inner diameter dimension D of the fitting hole 22 of the hub wheel 1 is represented as $\Delta d$, the height of the projection is represented as h, and a ratio of the diameter difference and the height is represented as $\Delta d/2h$, a relation among the diameter difference, the height, and the ratio is $0.3<\Delta d/2h<0.86$. Therefore, it is possible to sufficiently secure a press-fitting margin of the projections 35. In other words, when $\Delta d/2h$ is equal to or smaller than 0.3, torsion strength falls. If $\Delta d/2h$ exceeds 0.86, the entire projections 35 bite in the opposite side because of very small decentering and press-fit tilt during press fitting, moldability of the recess-projection fitting structure M is deteriorated, and press-fitting load suddenly increases. When moldability of the recess-projection fitting structure M is deteriorated, because not only torsion strength falls but also an expansion amount of the hub wheel outer diameter increases, there is a problem in that, for example, the function of the bearing 2 inserted in the hub wheel 1 is affected and rotation life is reduced. On the other hand, by setting $\Delta d/2h$ to 0.3 to 0.86, moldability of the recess-projection fitting structure M is stabilized, fluctuation in press-fitting load is eliminated, and stable torsion strength can be obtained.

Because the taper section 22d can form a guide at the start of press fitting, it is possible to press-fit the stem shaft 12 of the outer ring 5 into the hole 22 of the hub wheel 1 without causing decentering and perform stable torque transmission. Further, because the outer diameter D4 of the cylindrical section 66 is set smaller than the inner diameter dimension D of the fitting hole 22a of the hole 22, the cylindrical section 66 functions as a centering member. Therefore, it is possible to press-fit the stem shaft into the hub wheel while preventing decentering and perform more stable press fitting.

The stem shaft 12 of the outer ring 5 can be effectively prevented from slipping off from the hole 22 of the hub wheel 1 (in particular, slipping off in the axial direction to the shaft side) by the shaft slip-off preventing structure M1. Consequently, it is possible to maintain a stable connection state and realize improvement of a quality of the bearing device for a wheel. Because the shaft slip-off preventing structure M1 is the tapered locking piece 65, screw fastening in the past can be omitted. Therefore, it is unnecessary to form a screw section projecting to the stem shaft 12 from the hole 22 of the hub wheel 1. It is possible to realize a reduction in weight, omit screw fastening work, and improve assembly workability. Moreover, in the tapered locking piece 65, because a part of the stem shaft 12 of the outer ring 5 only has to be expanded, it is possible to easily perform formation of the shaft slip-off preventing structure M1. In the movement of the stem shaft 12 of the outer ring 5 in the reverse joint direction, pressing force in a direction for further press-fitting the stem shaft 12 is necessary. Therefore, positional shift in the reverse joint direction of the stem shaft 12 of the outer ring 5 extremely hardly occurs. Even if the stem shaft 12 shifts in this direction, because the bottom of the mouth section 11 of the outer ring comes into contact with the caulking section 31 of the hub wheel 1, the stem shaft 12 of the outer ring 5 does not slip off from the hub wheel 1.

Note that, because the projections 35 can be formed by a spline normally formed in a shaft of this type, it is possible to easily form the projections 35 at low cost.

When the recesses 36 are formed by press-fitting the stem shaft 12 into the hub wheel 1, work hardening occurs on the recesses 36 side. The work hardening means that, when plastic deformation (plastic working) is applied to an object, resistance against deformation increases as a degree of deformation increases and the object becomes harder than a material not subjected to deformation. Therefore, according to plastic deformation during press fitting, the inner diameter surface 37 of the hub wheel 1 on the recesses 36 side hardens. It is possible to realize improvement of rotation torque transmission performance.

The inner diameter side of the hub wheel 11 is relatively soft. Therefore, it is possible to realize improvement of fittability (adhesiveness) in fitting the projections 35 of the outer diameter surface of the stem shaft 12 of the outer ring 5 in the recesses 36 of the hole inner diameter surface of the hub wheel 1. It is possible to accurately suppress a backlash from occurring in the diameter direction and the circumferential direction.

The end expanded-diameter caulking section (tapered locking piece) 65 that engages with the inner diameter surface of the hub wheel 1 (in this case, the inner diameter surface of the tapered hole 22b) through an intermediation of the seal material (seal member configuring the foreign-matter intrusion preventing means W2) is provided further on the outboard side than the recess-projection fitting structure M. Therefore, it is possible to prevent intrusion of foreign matters from a side further on the outboard side than the recess-projection fitting structure M.

Further on the inboard side than the recess-projection fitting structure M, the seal structure (foreign-matter intrusion preventing means W1) can be configured by contact of the outer end surface 31a of the caulking section 31 and the back surface 11a of the mouth section 11 of the outer ring 5. It is possible to prevent intrusion of foreign matters from the inboard side with this seal structure.

In this way, as in the embodiment, the foreign-matter intrusion preventing means W1 and W2 are provided further on the inboard side than the recess-projection fitting structure M and further on the outboard side than the recess-projection fitting structure M. Intrusion of foreign matters from both end sides in the axial direction of the recess-projection fitting structure M is prevented. Therefore, it is possible to stably prevent deterioration in adhesiveness over a long period of time.

Further, the foreign-matter intrusion preventing means W3 formed by interposing the seal material is provided between the fitting contact regions 38 of the projections 35 and the recesses 36. Therefore, it is possible to prevent intrusion of foreign matters between the fitting contact regions 38 and reliability of foreign-matter intrusion prevention is improved.

During press fitting, axial direction pressing force can be applied to the outer ring 5 through an intermediation of the step surface G on the outer diameter surface of the outer ring 5 of the constant-velocity universal joint 3. In other words, an axial direction pressing force applying region can be secured and the vicinity of the stem shaft of the outer ring 5 as the press-fitting shaft can be pressed. Therefore, it is possible to perform stable press fitting.

A recessed groove may be provided on the outer diameter surface of the outer ring 5 of the constant-velocity universal joint 3 to form a diameter direction end surface of this recessed groove as the step surface G. Alternatively, a protrusion may be provided on the outer diameter surface of the outer ring 5 to form a diameter direction end surface of this protrusion as the step surface G. In those cases, reliability of securing of the axial direction pressing force applying regions is improved. As a result, it is possible to perform more stable press-fitting work.

When the stem shaft 12 is press-fit in a state in which a boot and a shaft are not attached rather than the drive shaft assembly state, if press-fitting load is applied to the end surface 5a on the inboard side of the outer ring 5 to perform press-fitting work, it is unnecessary to provide the step surface G on the outer diameter surface of the outer ring 5. It is possible to press fit the stem shaft 12 at low cost.

Figure 11:
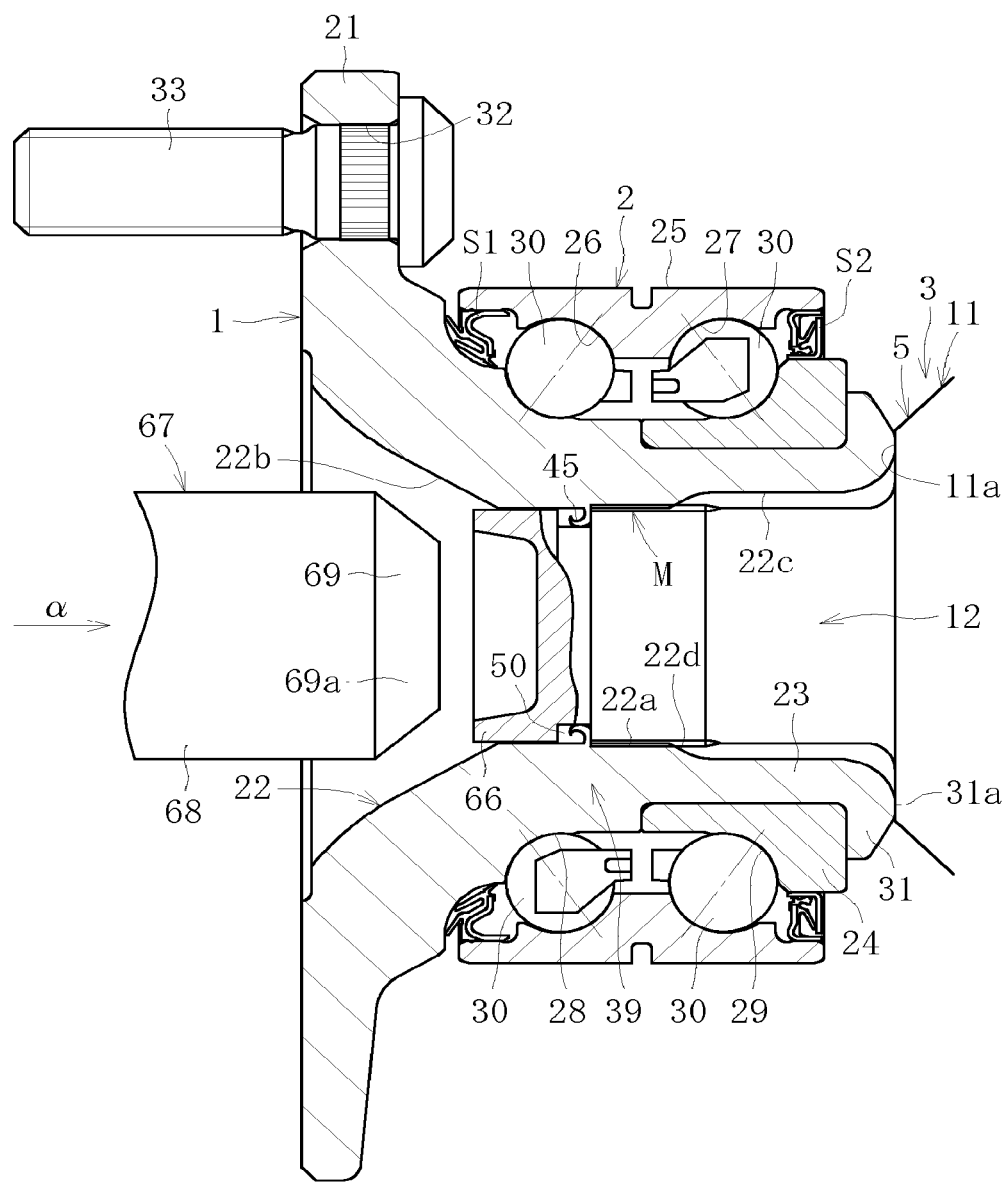
FIG. 11 is a sectional view illustrating a process of assembling the bearing device for a wheel using another jig.

When the cylindrical section 66 is expanded in diameter, the jig 67 illustrated in FIG. 11 may be used. This jig 67 includes a columnar main body section 68 and a truncated cone section 69 connected to a distal end of this main body section 68. In the truncated cone section 69 of the jig 67, a tilt angle of a tilting surface 69a thereof is set substantially the same as a tilt angle of the tapered hole 22b and an outer diameter of a distal end of the truncated cone section 69 is set to a dimension same as or slightly smaller than the inner diameter of the cylindrical section 66. The truncated cone section 69 of the jig 67 is fit in through an intermediation of the tapered hole 22b to apply load in the arrow α direction, whereby diameter expanding force in an arrow β direction in which this cylindrical section 66 increases in diameter is applied to the inner diameter side of the cylindrical section 66 illustrated in FIG. 6. When the truncated cone 69 of the jig 67 is fit in, at least a part of the cylindrical section 66 is pressed to the inner diameter surface side of the tapered hole 22b and is in press-contact or contact with the inner diameter surface of the tapered hole 22b through an intermediation of the seal material configuring the foreign-matter intrusion preventing means W2. Therefore, the shaft slip-off preventing structure M1 can be configured. When load in the arrow α direction of the jig 67 is applied, this bearing device for a wheel needs to be fixed not to move in the arrow α direction. However, a part of the hub wheel 1, the constant-velocity universal joint 3, and the like only has to be received by a fixed member. The inner diameter surface of the cylindrical section 66 may be formed in a tapered shape increasing in diameter to the shaft end side. If the inner diameter surface of the cylindrical section 66 is formed into such a shape, it is possible to mold the inner diameter surface with forging. This leads to a reduction in cost.

Further, in order to reduce load in the arrow α direction of the jig 67, a notch may be cut in the cylindrical section 66 or a conical surface of the truncated cone section 69 of the jig 67 may be partially arranged in a circumferential direction. When the notch is cut in the cylindrical section 66, it is easy to expand the cylindrical section 66 in diameter. When the conical surface of the truncated cone section 69 of the jig 67 is partially arranged in the circumferential direction, a region where the cylindrical section 66 is expanded in diameter is apart on the circumference. Therefore, it is possible to reduce push-in load of the jig 67.

Figure 13:
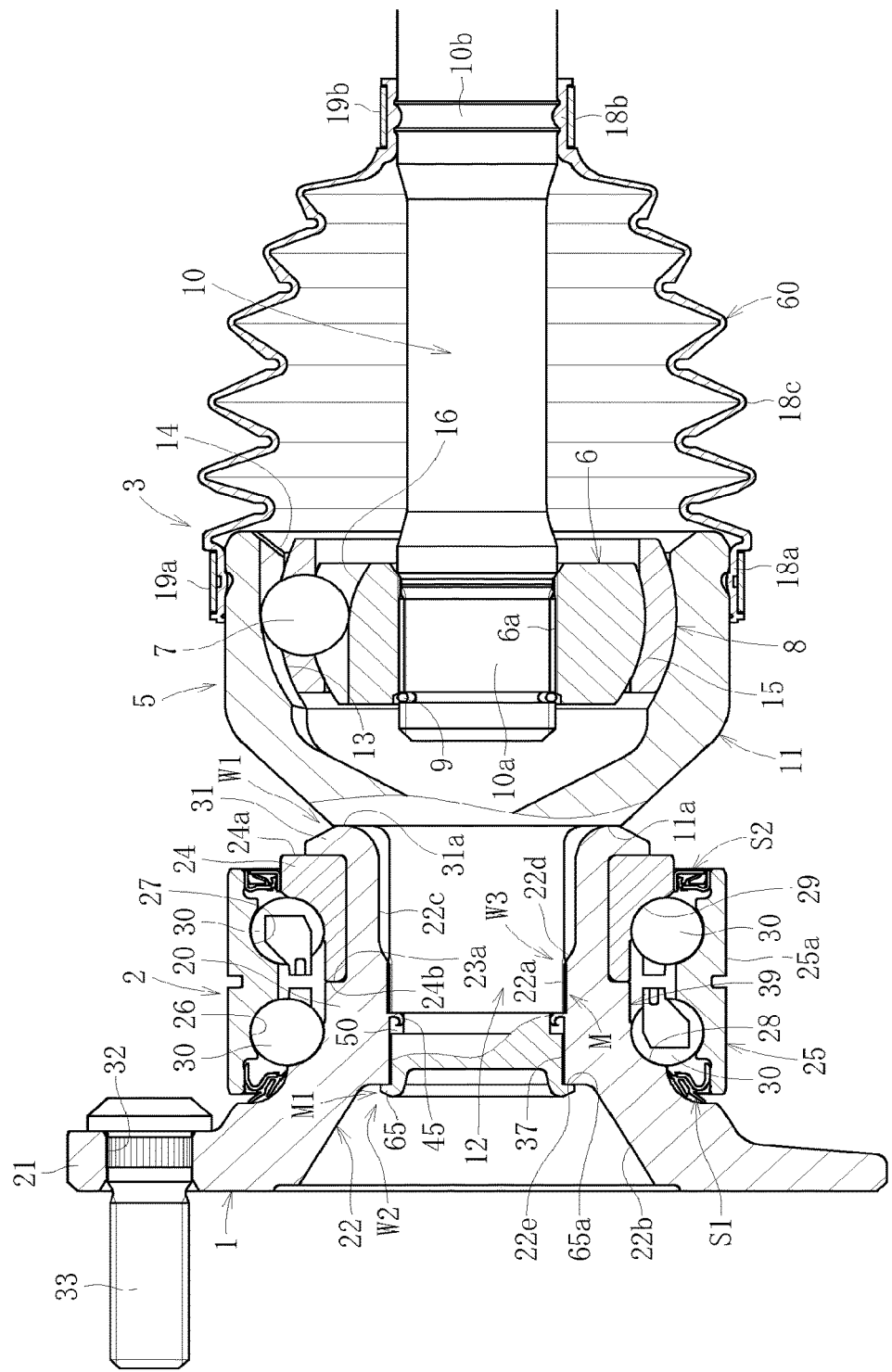
FIG. 13 is a longitudinal sectional view of a bearing device for a wheel illustrating a second embodiment of the present invention.

Next, FIG. 13 illustrates a second embodiment. In this case, in the hole 22 of the hub wheel 1, a stepped surface 22e extending in the diameter direction is provided between the tapered hole 22b and the shaft fitting hole 22a. The expanded-diameter caulking section 65 engages with this stepped surface 22e.

That is, the expanded-diameter caulking section 65 plastically deformed outward in the diameter direction by swinging caulking by the swinging caulking jig 67 is molded. That is, the expanded-diameter caulking section 65 in this case is folded to bend at a substantially right angle with respect to the axis of the device. The end surface on the inboard side thereof comes into contact or press-contact with the stepped surface 22e.

Figure 12:
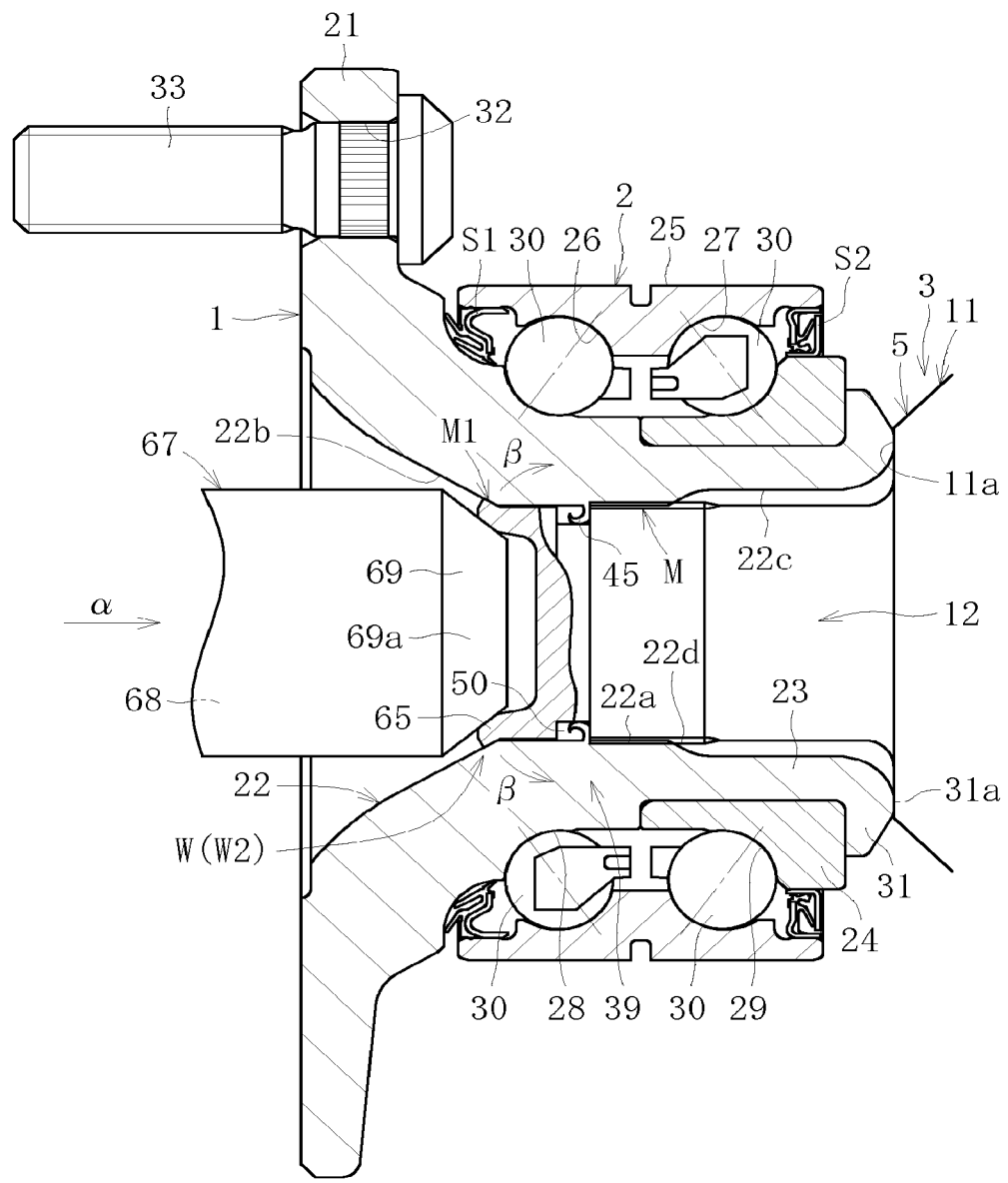
FIG. 12 is a sectional view illustrating the process of assembling the bearing device for a wheel using another jig.

Other components of the bearing device for a wheel illustrated in FIG. 12 are the same as those of the bearing device for a wheel illustrated in FIG. 1. Therefore, the components same as those illustrated in FIG. 1 are denoted by the same reference symbols and description of the components is omitted. Therefore, the bearing device for a wheel illustrated in FIG. 13 also realizes operations and effects same as those of the bearing device for a wheel illustrated in FIG. 1.

Figure 14:
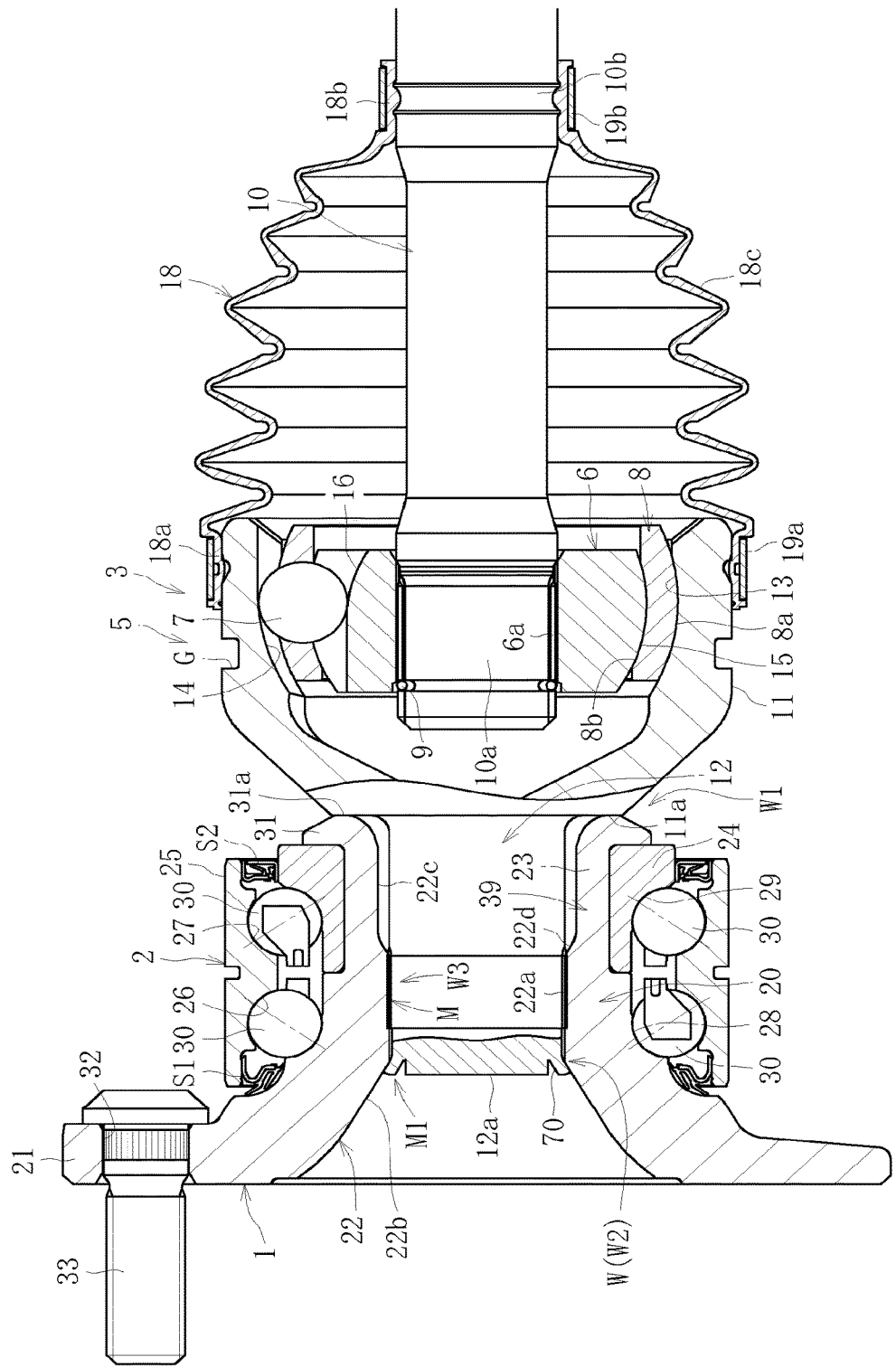
FIG. 14 is a longitudinal sectional view of a bearing device for a wheel illustrating a third embodiment of the present invention.

FIG. 14 illustrates a third embodiment. The shaft slip-off preventing structure M1 of this bearing device for a wheel is configured by providing a tapered locking piece 70 that projects to the outer diameter direction in a part of the stem shaft 12 rather than forming the cylindrical section 66 illustrated in FIG. 4 in advance.

Figure 15:
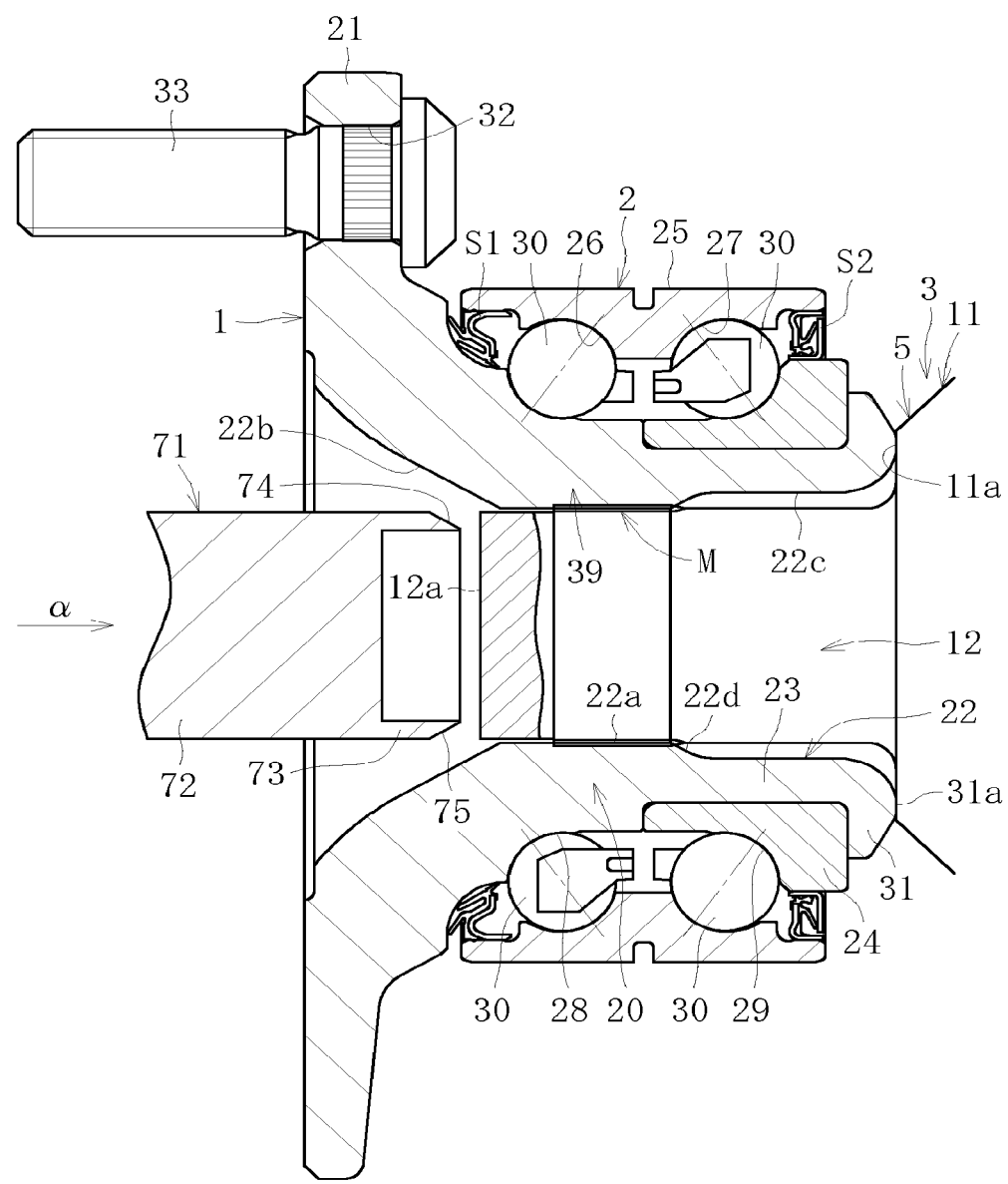
FIG. 15 is a sectional view illustrating a method of assembling the bearing device for a wheel illustrated in FIG. 14.
Figure 16:
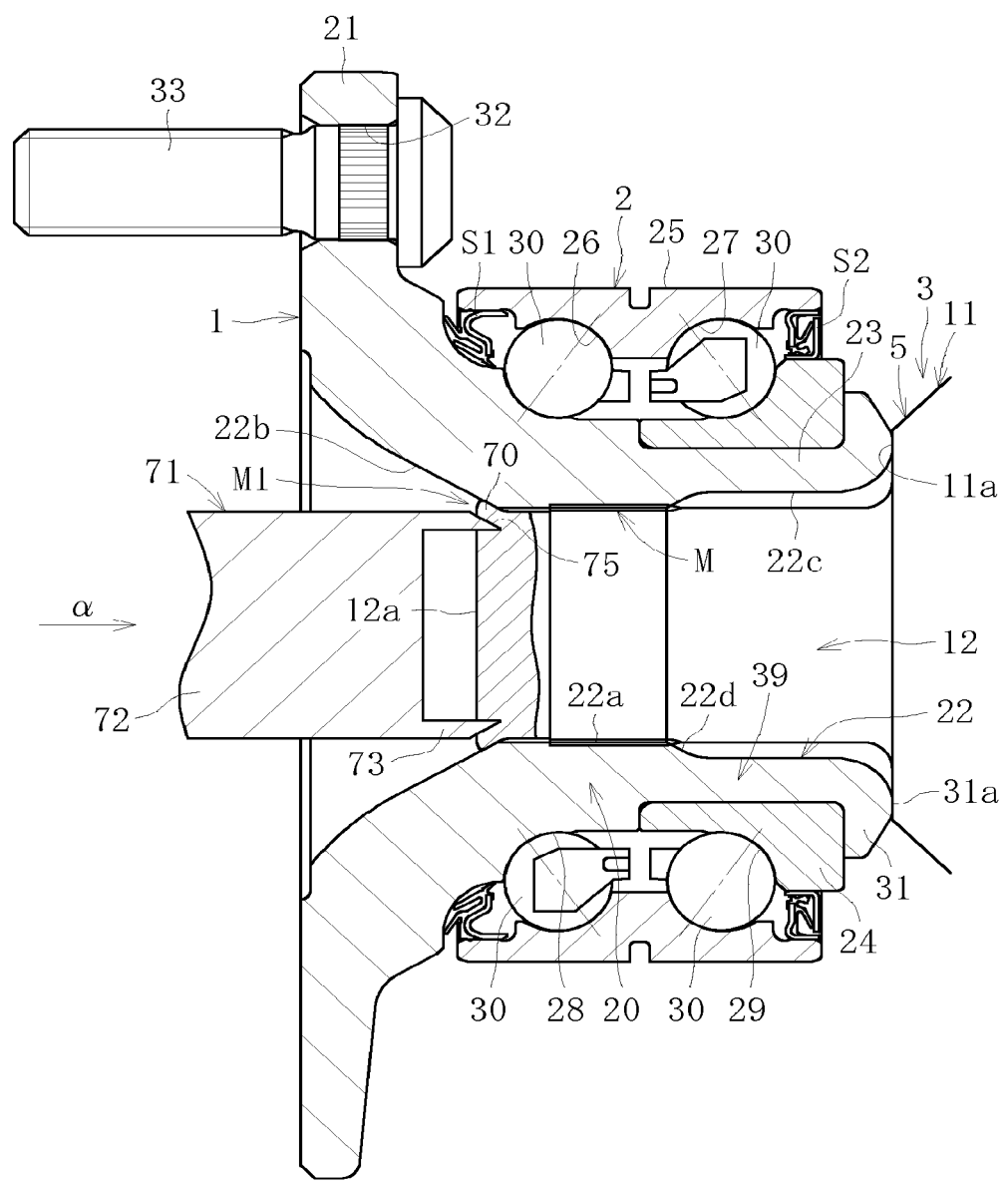
FIG. 16 is a sectional view illustrating the method of assembling the bearing device for a wheel illustrated in FIG. 14.

In this case, a jig 71 illustrated in FIG. 15 is used. The jig 71 includes a columnar main body section 72 and a short cylindrical section 73 connected to a distal end of this main body section 72. A notch 74 is provided at a distal end of an outer circumferential surface of the short cylindrical section 73. Therefore, a distal end wedge section 75 is formed in the jig 71. As illustrated in FIG. 16, if the distal end wedge section 75 is driven (load in the arrow α direction is applied), a sectional shape of this distal end wedge section 75 is a tilting surface, and the outer diameter side of the end of the stem shaft 12 is expanded in diameter by the notch 74 forming this tilting surface.

Consequently, at least a part of this tapered locking piece 70 comes into press-contact or contact with the inner diameter surface of the tapered hole 22b. Therefore, like the tapered locking piece 65 illustrated in FIG. 1 and the like, such a tapered locking piece 70 can effectively prevent the stem shaft 12 of the outer ring 5 from slipping off in the axial direction from the hole 22 of the hub wheel 1. Consequently, it is possible to maintain a stable connected state and realize improvement of a quality of the bearing device for a wheel. An inner diameter surface of the distal end wedge section 75 may be formed in a tapered shape.

Figure 17:
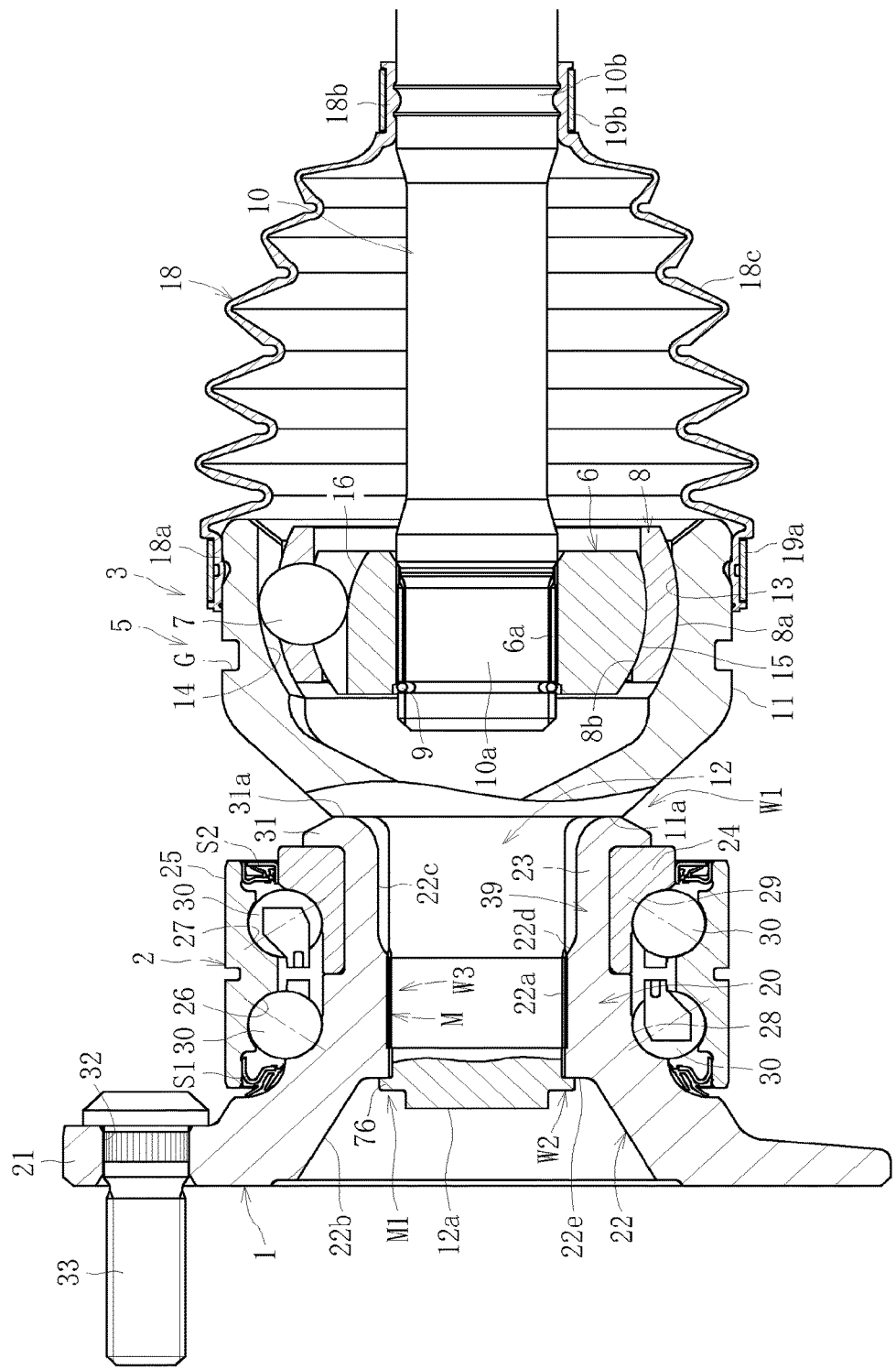
FIG. 17 is a longitudinal sectional view of a bearing device for a wheel illustrating a fourth embodiment of the present invention.

FIG. 17 illustrates a fourth embodiment. The shaft slip-off preventing structure M1 of this bearing device for a wheel is configured by an outer collar-like locking piece 76 formed by caulking a part of the stem shaft 12 to project in the outer diameter direction. In this case, in the hole 22 of the hub wheel 1, the stepped surface 22e is provided between the fitting hole 22a and the tapered hole 22b. The outer collar-like locking piece 76 locks to this stepped surface 22e.

Figure 18:
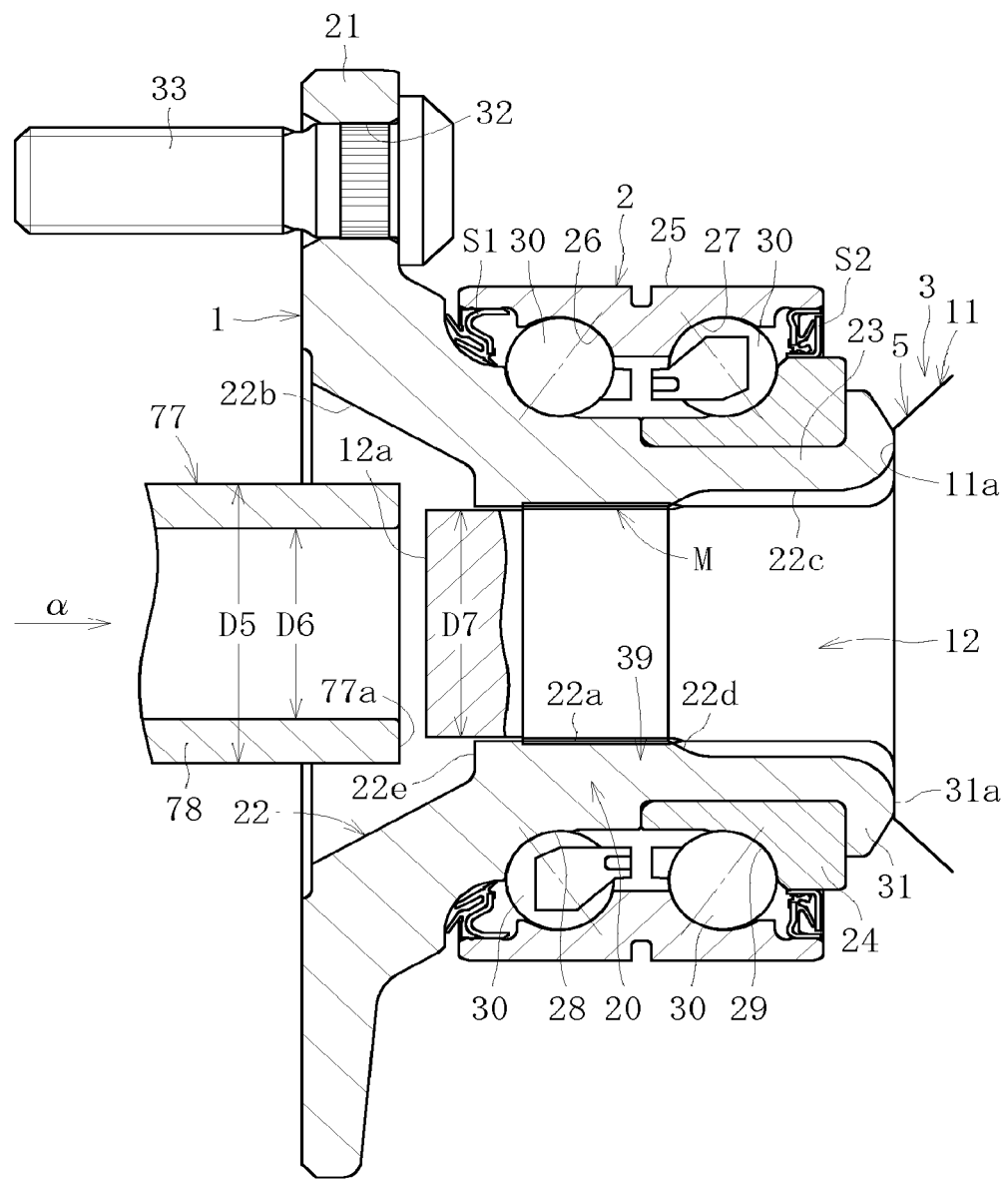
FIG. 18 is a sectional view illustrating a method of assembling the bearing device for a wheel illustrated in FIG. 17.
Figure 19:
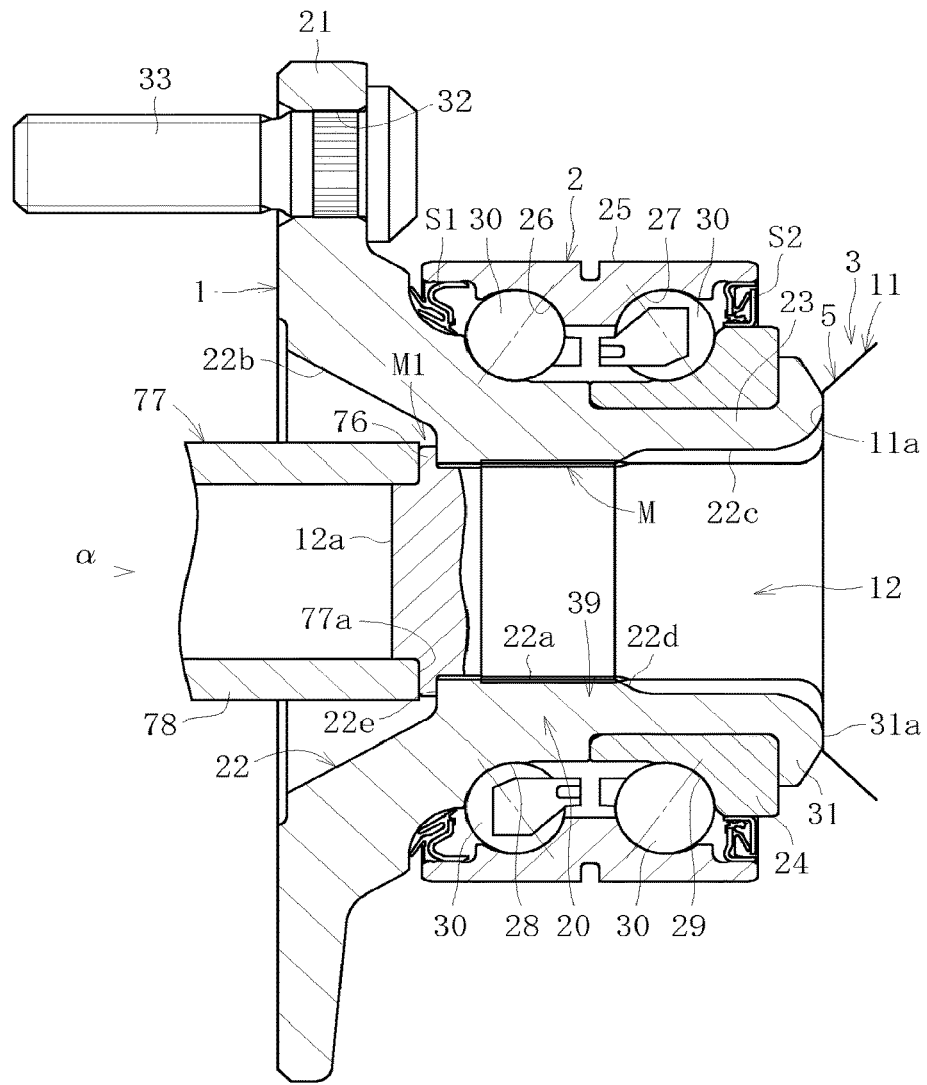
FIG. 19 is a sectional view illustrating the method of assembling the bearing device for a wheel illustrated in FIG. 17.

In this shaft slip-off preventing structure M1, a jig 77 illustrated in FIG. 18 is used. This jig 77 includes a cylindrical member 78. An outer diameter D5 of the cylindrical member 78 is set larger than an outer diameter D7 of the end of the stem shaft 12 and an inner diameter D6 of the cylindrical member 78 is set smaller than the outer diameter D7 of the end of the stem shaft 12.

Therefore, if axes of this jig 77 and the stem shaft 12 of the outer ring 5 are aligned and load is applied in the arrow α direction to the end surface 12a of the stem shaft 12 by an end surface 77a of the jig 77 in this state in which the axes are aligned, as illustrated in FIG. 13, an outer circumferential side of the end surface 12a of the stem shaft 12 is crushed and the outer collar-like locking piece 76 can be formed.

Because the above-mentioned outer collar-like locking piece 76 engages with the stepped surface 22e, like the tapered locking piece 65 illustrated in FIG. 1 and the like, the outer collar-like locking piece 76 can effectively prevent the stem shaft 12 of the outer ring 5 from slipping off in the axial direction from the hole 22 of the hub wheel 1. Consequently, it is possible to maintain a stable connected state and realize improvement of a quality of the bearing device for a wheel.

Figure 20A:
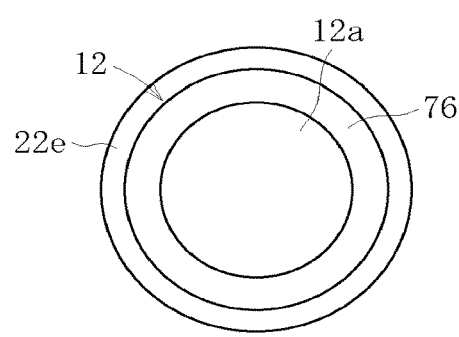
FIG. 20A is an end surface view of an outer collar-like locking section over an entire circumference, illustrating an end surface of a stem shaft of an outer ring of the bearing device for a wheel illustrated in FIG. 17.
Figure 20B:
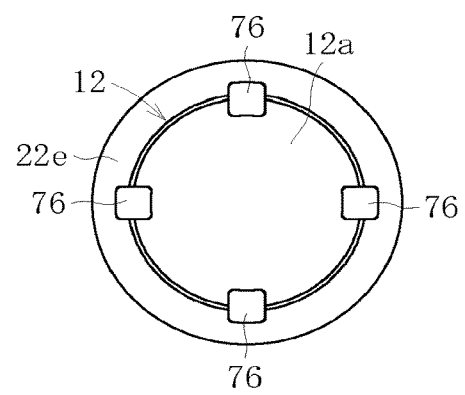
FIG. 20B is an end surface view of outer collar-like locking sections disposed at a predetermined pitch along a circumferential direction, illustrating the end surface of the stem shaft of the outer ring of the bearing device for a wheel illustrated in FIG. 17.

If the jig 77 illustrated in FIG. 18 is used, as illustrated in FIG. 20A, the outer collar-like locking piece 76 is formed along a circumferential direction. Therefore, if pressing sections are disposed at a predetermined pitch (e.g., 90° pitch) along the circumferential direction as a jig, as illustrated in FIG. 20B, plural outer collar-like locking pieces 76 are arranged at the predetermined pitch along the circumferential direction. Even if the plural outer collar-like locking piece 76 are arranged at the predetermined pitch along the circumferential direction as illustrated in FIG. 20B, because the outer collar-like locking pieces 76 locks to the stepped surface 22e, it is possible to effectively prevent the stem shaft 12 of the outer ring 5 from slipping off in the axial direction from the hole 22 of the hub wheel 1.

Figure 21:
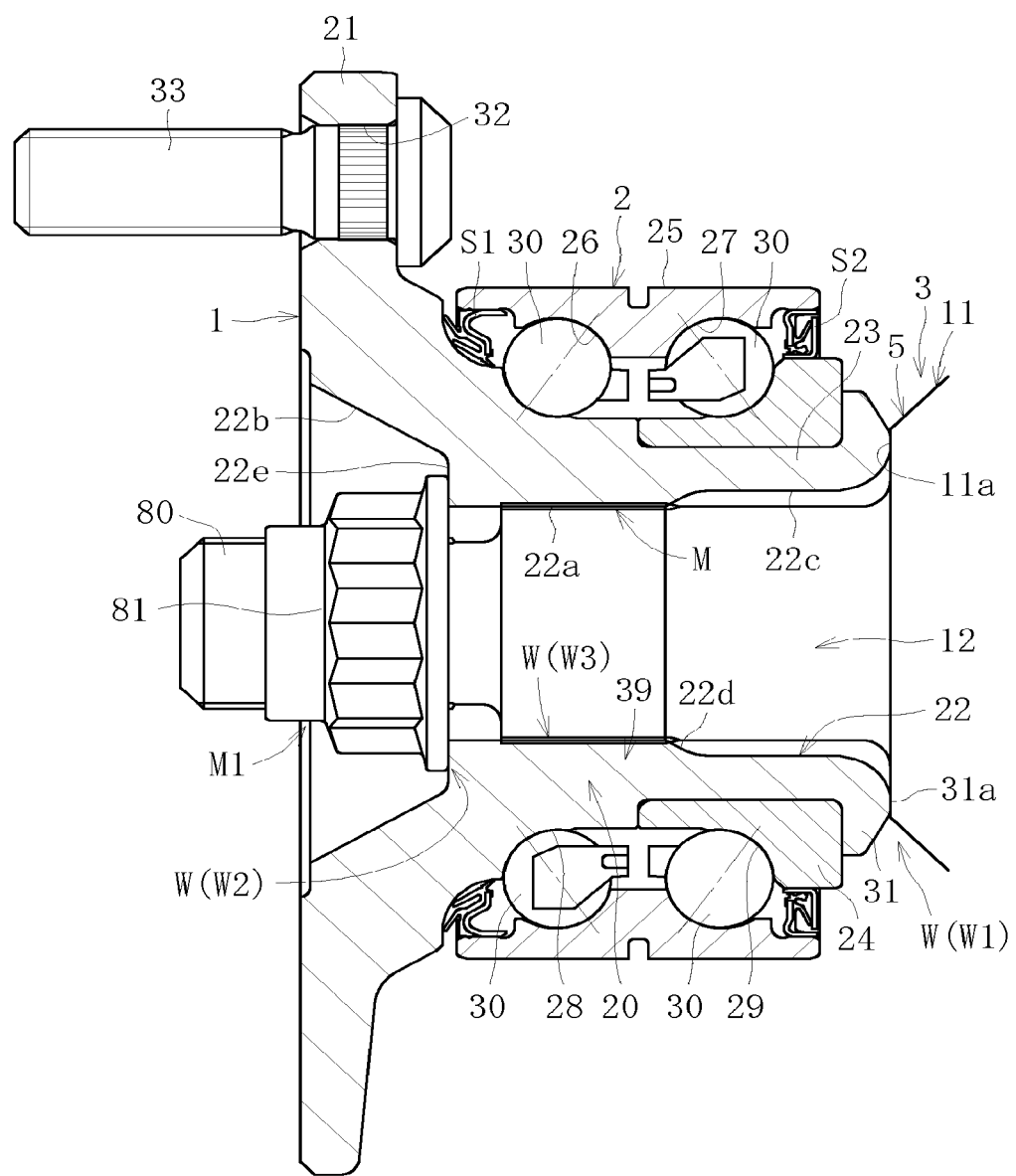
FIG. 21 is a longitudinal sectional view of a bearing device for a wheel illustrating a fifth embodiment of the present invention.
Figure 22:
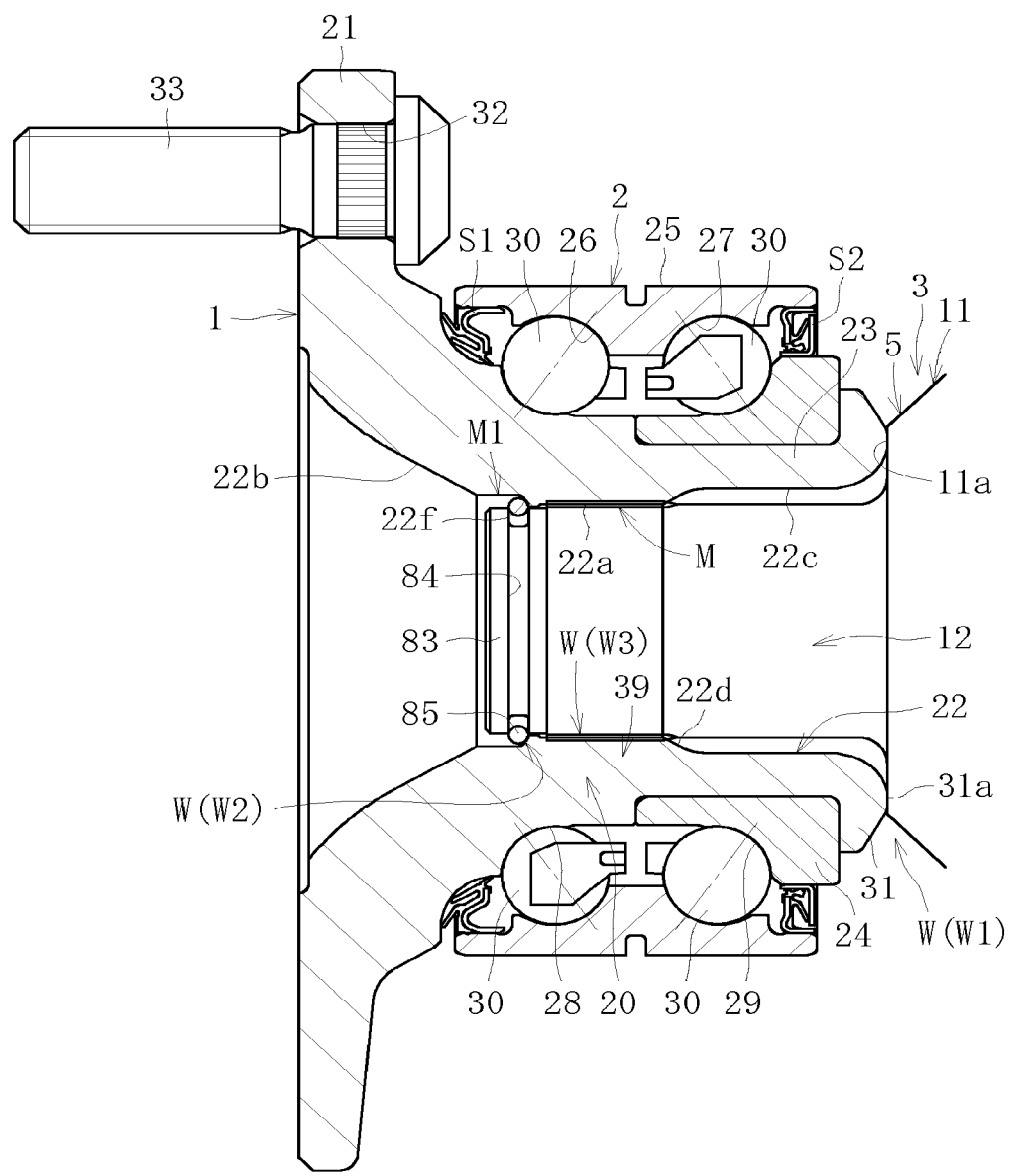
FIG. 22 is a main part sectional view of a bearing device for a wheel illustrating a sixth embodiment of the present invention.
Figure 23:
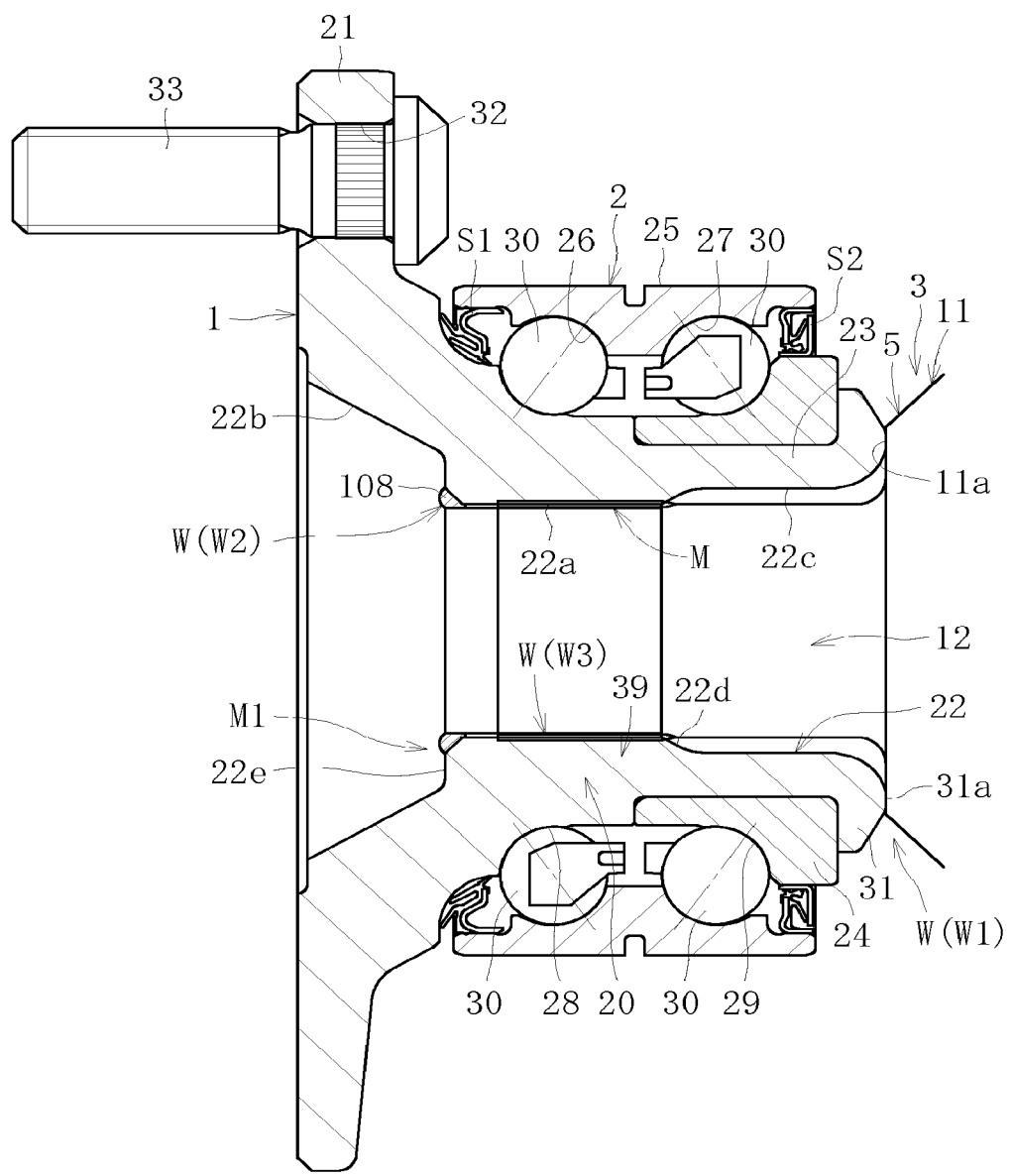
FIG. 23 is a main part sectional view of a bearing device for a wheel illustrating a seventh embodiment of the present invention.

As the shaft slip-off preventing structure M1, bolt and nut coupling may be used as illustrated in FIG. 21 of a fifth embodiment, a lock ring may be used as illustrated in FIG. 22 of a sixth embodiment, or coupling means such as welding may be used as illustrated in FIG. 23 of a seventh embodiment.

In FIG. 21, a screw shaft section 80 is connected to the stem shaft 12 and a nut member 81 is screwed on this screw shaft section 80. The nut member 81 is brought into contact with the stepped surface 22e of the hole 22. Consequently, the stem shaft 12 is regulated from slipping off from the hole 22 of the hub wheel 1 to the shaft side.

In FIG. 22, a shaft extending section 83 is provided further on the outboard side than the spline 41. A circumferential direction groove 84 is provided in this shaft extending section 83 and a lock ring 85 is fit in this circumferential direction groove 84. In the hole 22 of the hub wheel 1 of the stem shaft 12, a step section 22f to which the lock ring 85 locks is provided between the fitting hole 22a and the tapered hole 22b. Consequently, the lock ring 85 locks to the step section 22f to regulate the stem shaft 12 from slipping off from the hole 22 of the hub wheel 1 to the shaft side.

In FIG. 23, an end outer circumferential surface of the stem shaft 12 and an opening edge on the step surface 22e side of the fitting hole 22a are joined by welding. Consequently, the stem shaft 12 is regulated from slipping off from the hole 22 of the hub wheel 1 to the shaft side. In this case, a welding region 108 may be disposed over the entire circumference or may be disposed at a predetermined pitch along the circumferential direction.

In the bearing device for a wheels illustrated in FIGS. 13, 14, 17, 21, 22, 23, and the like, the foreign-matter intrusion preventing means W1, W2, and W3 can be configured. In FIG. 13, the foreign-matter intrusion preventing means W2 can be formed by interposing the seal material between the expanded-diameter caulking section 65 and the stepped surface 22e. In FIG. 14, the foreign-matter intrusion preventing means W2 can be formed by interposing the seal material between the tapered locking piece 70 and the inner diameter surface of the tapered hole 22b. In FIG. 17, the foreign-matter intrusion preventing means W2 can be formed by interposing the seal material between the outer collar-like locking piece 76 and the stepped surface 22e. In FIG. 22, the foreign-matter instruction preventing means W2 can be formed by the fit lock ring 85. In FIG. 23, the foreign-matter intrusion preventing means W2 can be formed by the welding region 108 over the entire circumference. The foreign-matter intrusion preventing means W1 and W3 are the same as those in the bearing device for a wheel illustrated in FIG. 1

Further on the inboard side than the recess-projection fitting structure M, the seal structure (foreign-matter intrusion preventing means W1) can be configured by contact of the outer end surface 31a of the caulking section 31 and the back surface 11a of the mouth section 11 of the outer ring 5. It is possible to prevent intrusion of foreign matters from the inboard side with this seal structure.

In this way, as in the above-mentioned embodiment, the foreign-matter intrusion preventing means W1 and W2 are provided further on the inboard side than the recess-projection fitting structure M and further on the outboard side than the recess-projection fitting structure M. Therefore, intrusion of foreign matters from both end sides in the axial direction of the recess-projection fitting structure M is prevented. Therefore, it is possible to more stably prevent deterioration in adhesiveness over a long period of time.

Further, because the foreign-matter intrusion preventing means W3 formed by interposing the seal material is provided between the fitting contact regions 38 of the projections 35 and the recesses 36, it is possible to prevent intrusion of foreign matters between the fitting contact regions 38. As a result, reliability of foreign-matter intrusion prevention is improved.

Figure 24:
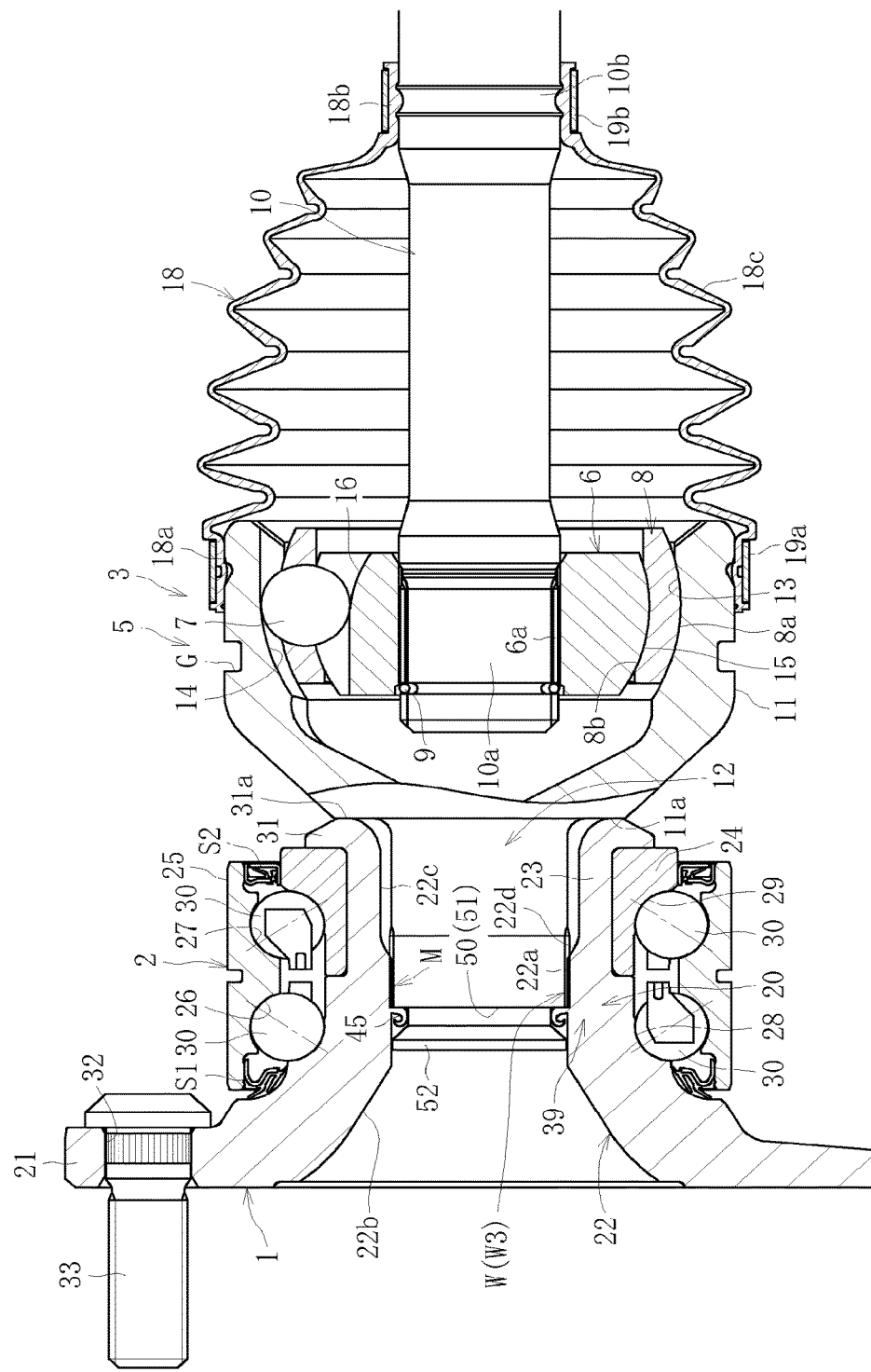
FIG. 24 is a main part sectional view of a bearing device for a wheel illustrating an eighth embodiment of the present invention.
Figure 25:
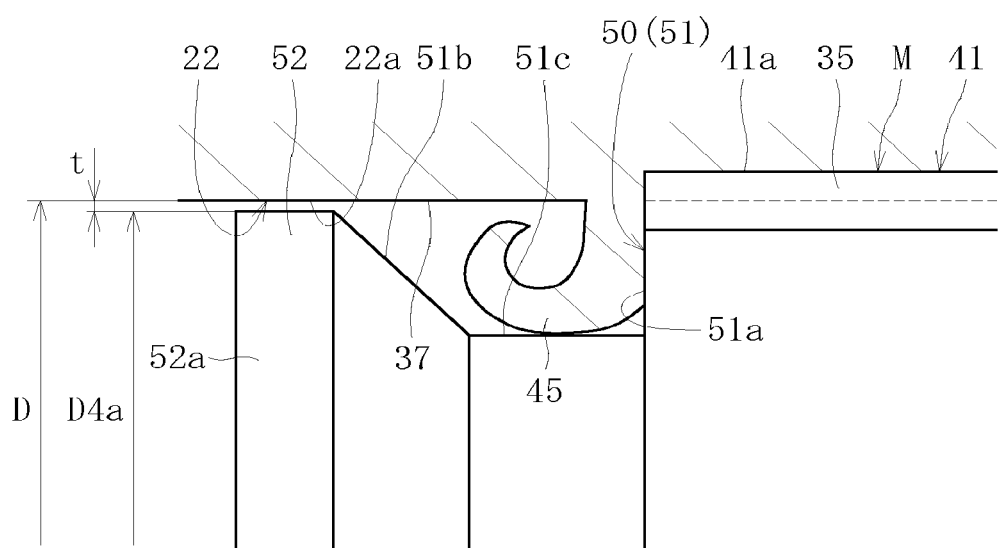
FIG. 25 is a main part enlarged sectional view of the bearing device for a wheel illustrated in FIG. 24.

In the bearing device for a wheel according to the present invention, as illustrated in FIG. 24 illustrating a seventh embodiment, the shaft slip-off preventing structure M1 does not have to be provided. In this case, as illustrated in FIG. 25, in the circumferential direction groove 51, a side 51a on the spline 41 side is a plane orthogonal to the axial direction and a side 51b on an opposite spline side is a taper surface that increases in diameter from a groove bottom 51c to the opposite spline side. A disc-like collar section 52 for centering is provided further on the opposite spline side than the side 51b of the circumferential direction groove 51. An outer diameter dimension D4a of the collar section 52 is set the same as or slightly smaller than the hole diameter of the fitting hole 22a of the hole 22. In this case, a very small gap t is provided between an outer diameter surface 52a of the collar section 52 and the inner diameter surface of the fitting hole 22a of the hole 22.

By providing, in the axial direction of the pocket section 50, the collar section 52 for centering with the hole 22 of the hub wheel 1 on the opposite projection side, ejection of the extruded portion 45 in the pocket section 50 to the collar section 52 side is eliminated. Therefore, the extruded portion 45 is more stably stored. Moreover, because the collar section 52 is used for centering, it is possible to press-fit the stem shaft 12 into the hub wheel 1 while preventing decentering. Therefore, it is possible to highly accurately connect the outer ring 5 and the hub wheel 1 and to perform stable torque transmission.

Because the collar section 52 is used for centering during press fitting, it is preferable to set an outer diameter dimension thereof to a degree slightly smaller than a hole diameter of the fitting hole 22a of the hole 22 of the hub wheel 1. If the outer diameter dimension of the collar section 52 is the same as or larger than the hole diameter of the fitting hole 22a, the collar section 52 itself is press-fit into the fitting hole 22a. When the collar section 52 is press-fit into the fitting hole 22a, if the collar section 52 and the fitting hole 22a are decentered, the projections 35 of the recess-projection fitting structure M are press-fit in this state and the stem shaft 12 and the hub wheel 1 are connected in a state in which the axis of the stem shaft 12 and the axis of the hub wheel 1 are not aligned. If the outer diameter dimension of the collar section 52 is smaller than the hole diameter of the fitting hole 22a, the collar section 52 does not function as a section for centering. Therefore, it is preferable to set the very small gap t between the outer diameter surface 52a of the collar section 52 and the inner diameter surface of the fitting hole 22a of the hole 22 to about 0.01 mm to 0.2 mm.

Note that, as illustrated in FIGS. 24 and 25, when the shaft slip-off preventing structure M1 is not provided, the collar section 52 as the section for centering of the stem shaft 12 may be omitted.

Next, FIG. 26 is a diagram of a bearing device for a wheel in which the hub wheel 1 and the stem shaft 12 of the outer joint member of the constant-velocity universal joint 3 fit and inserted in the hole 22 of the hub wheel 1 are separably coupled through an intermediation of the recess-projection fitting structure M.

Figure 30:
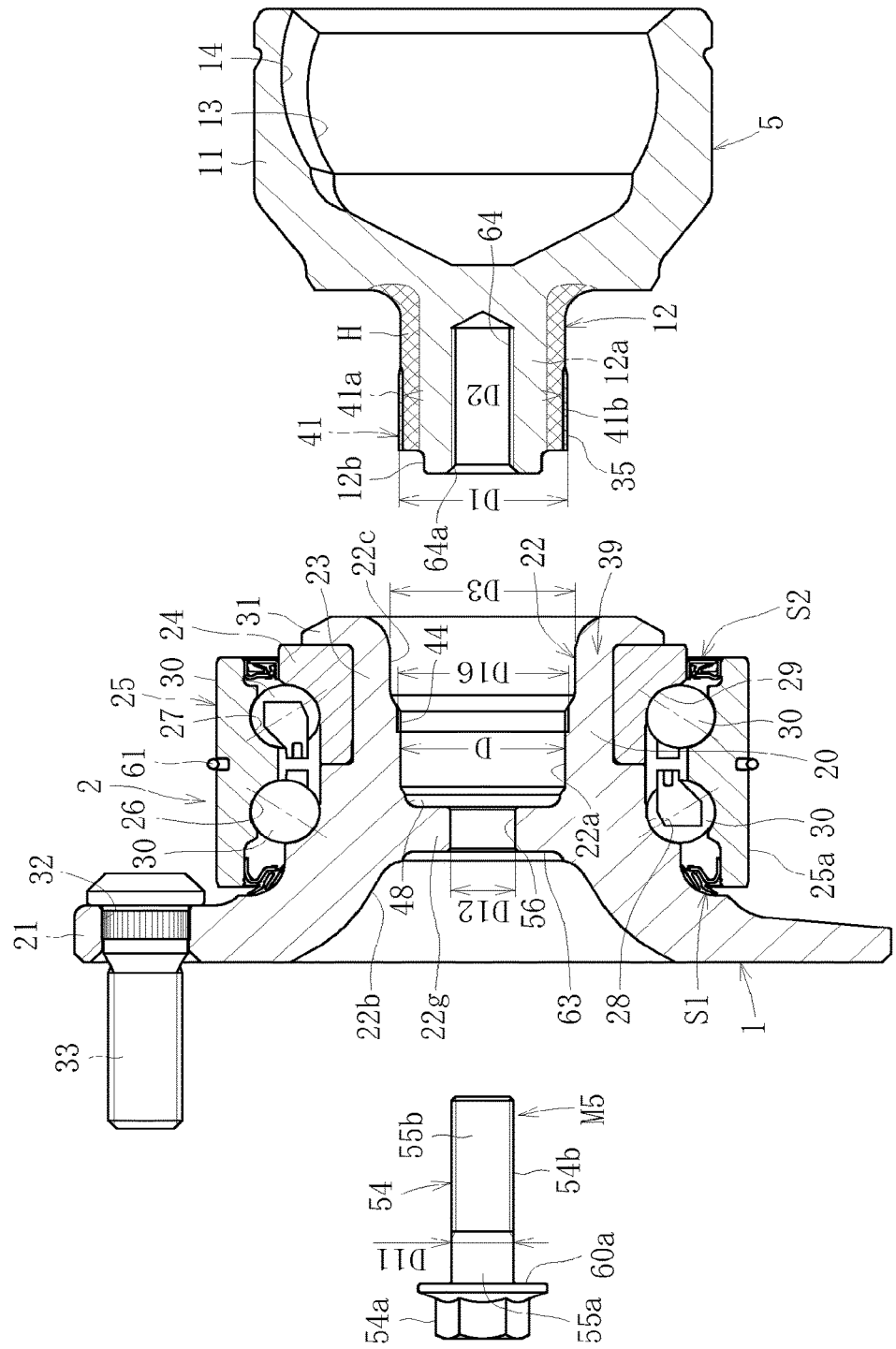
FIG. 30 is a sectional view before assembly of the bearing device for a wheel illustrated in FIG. 26.

The hub wheel 1 in this case has, as illustrated in FIGS. 26 and 30, the cylinder section 20 and the flange 21 provided at the end on the outboard side of the cylinder section 20. The hole 22 of the cylinder section 20 has the shaft fitting hole 22a and the tapered hole 22b on the outboard side. An inner wall 22g projecting in an inner diameter direction is provided between the shaft fitting hole 22a and the tapered hole 22b. A recessed dent section 63 is provided on an end surface on an opposite shaft fitting hole side of this inner wall 22g.

The hole 22 has the large diameter section 22c on an opening side further on an opposite inner wall side than the shaft fitting hole 22a and a small diameter section 48 further on an inner wall side than the shaft fitting hole 22a. The taper section 22d is provided between the large diameter section 22c and the shaft fitting hole 22a. This taper section 22d decreases in diameter along a press-fitting direction in coupling the hub wheel 1 and the stem shaft 12 of the outer ring 5.

A screw hole 64 opening to the end surface on the outboard side is provided in an axis section of the stem shaft 12 of the outer ring 5. An opening of the screw hole 64 is formed as a taper section 64a expanded toward an opening side. A small diameter section 12b is provided at the end on the outboard side of the stem shaft 12. In other words, the stem shaft 12 includes a main body section 12a having a large diameter and the small diameter section 12b.

Figure 32:
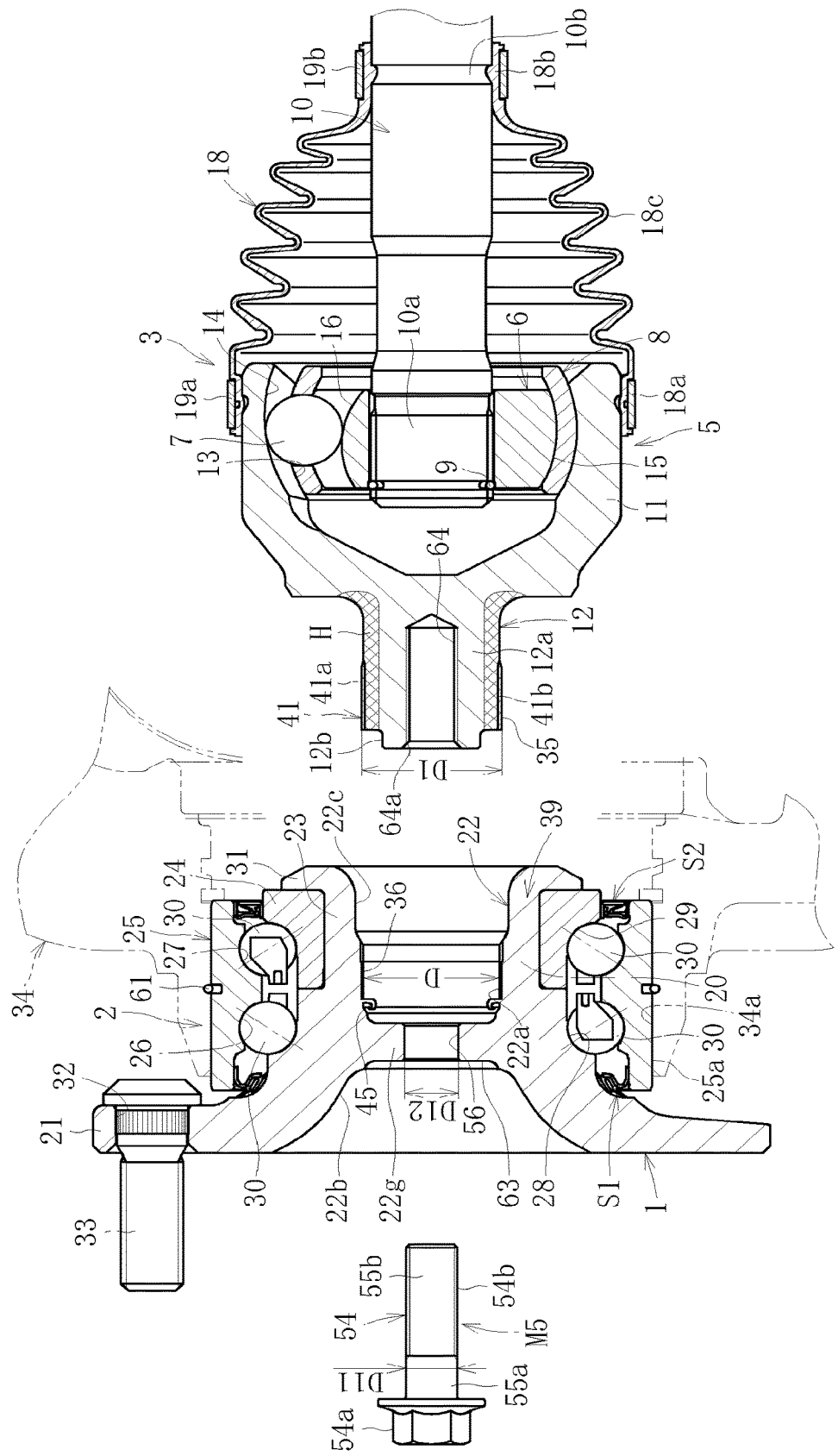
FIG. 32 is a sectional view before reassembly of the bearing device for a wheel illustrated in FIG. 26.

A bolt member 54 is screwed in the screw hole 64 of the stem shaft 12 from the outboard side. The bolt member 54 includes, as illustrated in FIGS. 26 and 30, a flanged head 54a and a screw shaft 54b. The screw shaft 54b has a non-screw section 55a on a proximal end side and a screw section 55b on a distal end side. In this case, a through hole 56 is provided in the inner wall 22g, the shaft 54b of the bolt member 54 is inserted through this through hole 56, and the screw section 55b is screwed in the screw hole 64 of the stem shaft 12. As illustrated in FIG. 32, a hole diameter D12 of the through hole 56 is set slightly larger than a shaft diameter (outer diameter) D11 of the non-screw section 55a of the shaft 54b. Specifically, the hole diameter D12 is set such that a difference between the hole diameter D12 and the shaft diameter D11 is about 0.05 mm<D12−D11<0.5 mm. Note that, a maximum outer diameter of the screw section 55b is set the same as or slightly smaller than the outer diameter of the non-screw section 55a.

Figure 27:
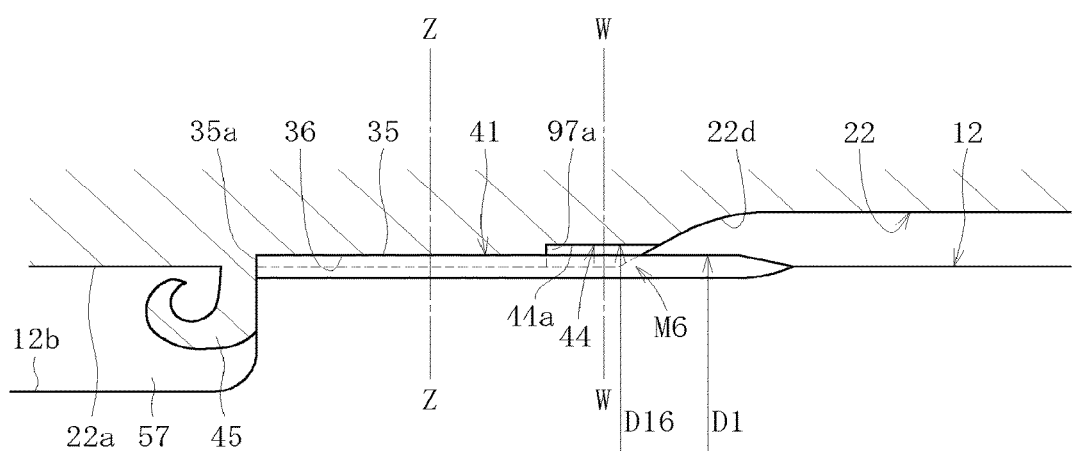
FIG. 27 is a main part enlarged longitudinal sectional view of the bearing device for a wheel illustrated in FIG. 26.
Figure 28A:
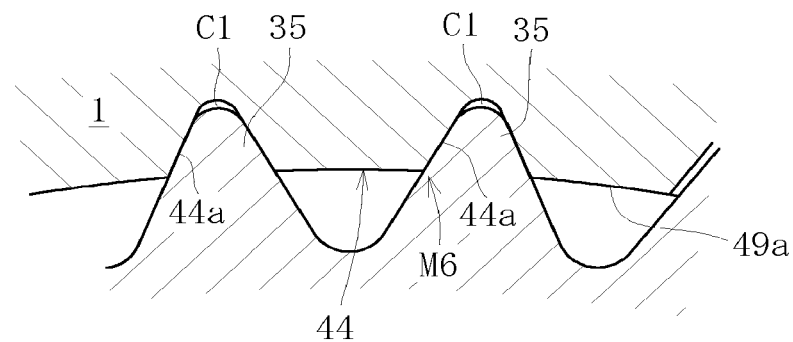
FIG. 28A is a sectional view taken along the W-W line in FIG. 26, illustrating a shaft press-fitting structure of the bearing device for a wheel illustrated in FIG. 26.

In this bearing device for a wheel, as illustrated in FIG. 27, a shaft press-fitting guide section M6 for performing guide for press fitting of the stem shaft 12 during press fitting is provided on a projection press-fitting start side. In this case, the shaft press-fitting guide section M6 includes a female spline 44 provided in the taper section 22d of the hole 22. That is, as illustrated in FIG. 28A, guiding recesses 44a are provided at a predetermined pitch (in this case, a pitch same as the arrangement pitch for the projections 35) along the circumferential direction on the shaft fitting hole 22*a* side of the taper section 22*d*.

In this case, as illustrated in FIG. 27, a bottom diameter dimension D16 of the guiding recesses 44*a* is set larger than the maximum outer diameter of the projections 35, i.e., the maximum diameter dimension (circumscribed circle diameter) (shaft outer diameter) D1 of the circle connecting the vertexes of the projections 35 as the projections 41*a* of the spline 41. As illustrated in FIG. 28A, diameter direction gaps C1 are formed between the vertexes of the projections 35 and the bottoms of the guiding recesses 44*a*.

When this bearing device for a wheel is assembled (when the stem shaft 12 of the outer ring 3 of the constant-velocity universal joint is press-fit in the hub wheel 1), the respective projections 35 of the stem shaft 12 are fit in the respective guiding recesses 44*a* of the shaft press-fitting guide section M6. Consequently, the axis of the hub wheel 1 and the axis of the outer ring 5 coincide with each other. When the projections 35 are fit in the guiding recesses 44*a*, because an end on the recess-projection fitting structure side of the guiding recess 44*a* is a flat surface 97*a* (see FIG. 27) orthogonal to a press-fitting direction, the end can receive press-fitting start end surfaces 35*a* of the projections 35, and the stem shaft 12 can be press-fit from this state. When the stem shaft 12 is press-fit, as described above, the inner diameter dimension D of the inner diameter surface 37 of the shaft fitting hole 22*a*, the maximum diameter dimension D1 of the projections 35, and the outer diameter dimension (diameter dimension) D2 of the recess bottom of the spline 41 are in the relation described above. Moreover, the hardness of the projections 35 is larger than the hardness of the inner diameter surface 37 by 20 points or more. Therefore, if the stem shaft 12 is press-fit into the hole 22 of the hub wheel 1, the projections 35 bite in the inner diameter surface 37. The projections 35 form the recesses 36, in which the projections 35 fit, along the axial direction.

After press fitting, the bolt member 54 is screwed in the screw hole 64 of the stem shaft 12 from the outboard side. By screwing the bolt member 54 in the screw hole 64 of the stem shaft 12 in this way, a flange section 60 of the head 54*a* of the bolt member 54 is fit in the recessed dent section 63 of the inner wall 22*g*. Consequently, the hub wheel 1 is nipped by the head 54*a* of the bolt member 54 and the recess-projection fitting structure M or by the head 54*a* of the bolt member 54 and the bottom surface (back surface) 11*a* of the mouth section 11. The hub wheel 1 and the constant-velocity universal joint 3 are integrated. In this way, bolt coupling means M5 on the device axis in which the hub wheel 1 and the stem shaft 12 of the outer ring 5 are connected is formed by the bolt member 54, the screw hole 64 in which this bolt member 54 is screwed, and the like.

In this case, as in the above case, it is preferable to set contact surface pressure between the caulking section 31 of the hub wheel and the back surface 11*a* of the mouth section 111*a* to be equal to or lower than 100 MPa. In this embodiment, the gap is provided between the end surface on the outboard side of the stem shaft 12 and the inner wall 22*g*. However, the end surface on the outboard side of this stem shaft 12 and the inner wall 22*g* may be brought into contact with each other. By bringing the end surface on the outboard side of this stem shaft 12 and the inner wall 22*g* into contact with each other in this way, it becomes easy to set the contact surface pressure.

In this case, when a diameter difference between the hole diameter D12 of the bolt inserting hole 56 and the shaft diameter D11 of the non-screw section 55*a* of the bolt member 54 is represented as Δd5 and a diameter difference in the recess-projection fitting structure M between the outer diameter dimension D1 of the outer ring 5 and the inner diameter D of the hub wheel 1 is represented as Δd6, a relation between the diameter differences is 0<Δd5<Δd6.

Figure 40:
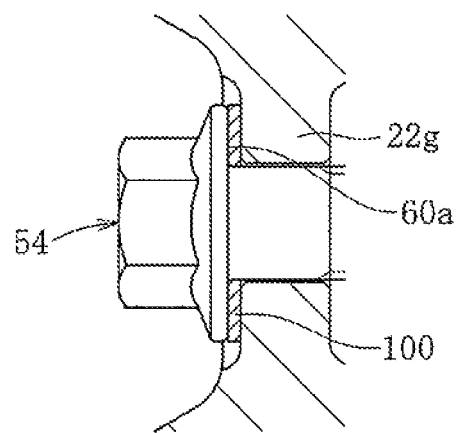
FIG. 40 is a sectional view of a seal material interposed between a bearing surface of a bolt member and an inner wall.

In this case, as illustrated in FIG. 40, a seal material 100 may be interposed between a bearing surface 60*a* of the bolt member 54 and the inner wall 22*g*. For example, the seal material 100 (seal agent) made of various kinds of resin that is hardened after application and can display sealing performance between the bearing surface 60*a* and the bottom of the recessed dent section 63 of the inner wall 22*g* only has to be applied to the bearing surface 60*a* of the bolt member 54. As this seal material 100, a material that is not deteriorated in an atmosphere in which this bearing device for a wheel is used is selected. The seal material 100 may be applied to the inner wall 22*g* side or may be applied to the bearing surface 60*a* side and the inner wall 22*g* side.

Figure 41:
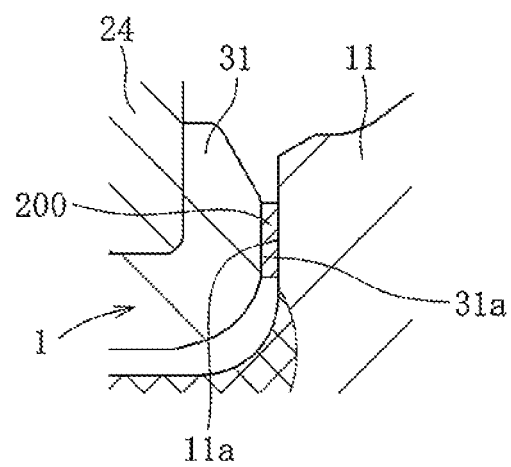
FIG. 41 is a sectional view of a seal material interposed between an end surface of a caulking section and a bottom back surface of a mouth section.

Further, the end surface 31*a* of the caulking section 31 and the bottom back surface 11*a* of the mouth section 11 are set in contact with each other. However, as illustrated in FIG. 41, a seal material 200 (seal agent) may be interposed between the end surface 31*a* of the caulking section 31 and the bottom back surface 11*a* of the mouth section 11. In this case, the seal material 200 may be applied to the end surface 31*a* side, may be applied to the bottom back surface 11*a* side, or may be applied to the end surface 31*a* and the bottom back surface 11*a*.

In this embodiment, slip-off in the axial direction of the stem shaft 12 from the hub wheel 1 is regulated by the bolt coupling means M5. As a result, it is possible to perform stable torque transmission over a long period of time.

By interposing the seal material between the bearing surface 60*a* of the bolt member 54, which fixes the hub wheel 1 and the stem shaft 12 of the outer ring 5, and the inner wall 22*g* or interposing the seal material between the end surface 31*a* of the caulking section 31 and the bottom back surface 11*a* of the mouth section 11, intrusion of rainwater and foreign matters into the recess-projection fitting structure M from this bolt member 54 is prevented and it is possible to realize improvement of quality.

Incidentally, if the bolt member 54 is removed by screwing back the bolt member 54 from the state illustrated in FIG. 26, the hub wheel 1 can be drawn out from the outer ring 5. In other words, fitting force of the recess-projection fitting structure M is such that the outer ring 5 can be drawn out by applying drawing force equal to or larger than predetermined force to the outer ring 5.

Figure 31:
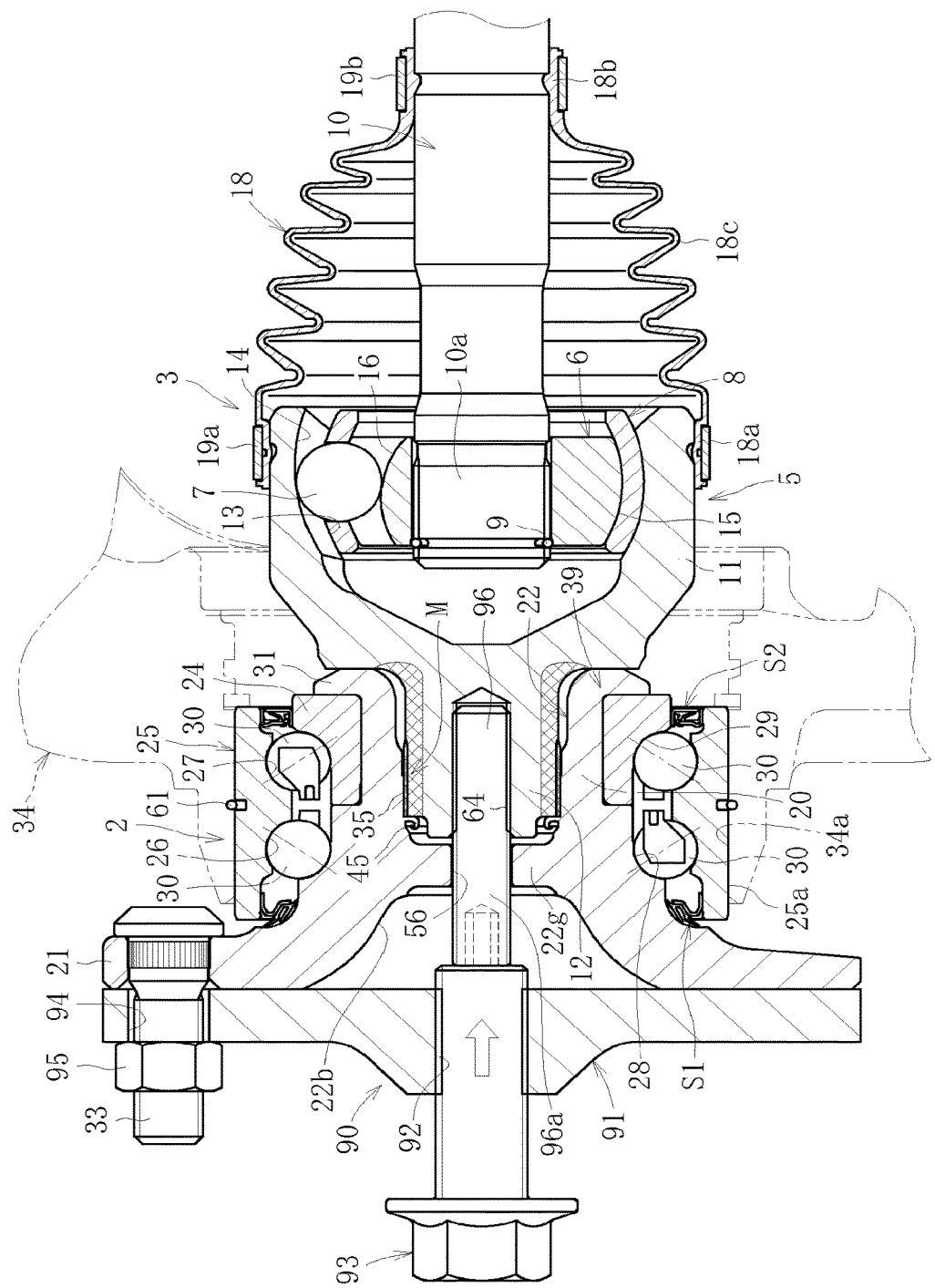
FIG. 31 is a sectional view illustrating a method of separating the bearing device for a wheel illustrated in FIG. 26.

For example, the hub wheel 1 and the constant-velocity universal joint 3 can be separated by a jig 90 illustrated in FIG. 31. The jig 90 includes a base 91, a pressing bolt member 93 screwed in a screw hole 92 of this base 91 to be capable of screed in and back, and a screw shaft 96 screwed in the screw hole 64 of the stem shaft 12. A through hole 94 is provided in the base 91. The bolt 33 of the hub wheel 1 is inserted through this through hole 94 and a nut member 95 is screwed on this bolt 33. When the nut member 95 is screwed on the bolt 33, the base 91 and the flange 21 of the hub wheel 1 are superimposed and the base 91 is attached to the hub wheel 1.

In this way, after the base 91 has been mounted to the hub wheel 1, or before mounting the base 91, the screw shaft 96 is screwed on the screw hole 64 of the stem shaft 12 so that a base section 76*a* may protrude to the out board side from the inner wall 22*g*. The protruding amount of the base section 96*a* is set larger than the axial length of the recess-projection fitting structure M. The screw shaft 96 and the pressing bolt member 93 are arranged in the same axis (on the axis of the bearing device for a wheel).

After that, the pressing bolt member 93 is screwed on the screw hole 92 of the base 91 from the out board side, and in this state, the bolt member 93 is caused to threadedly advance in the direction of the arrow. In this process, the screw shaft 96 and the pressing bolt member 93 are arranged in the same axis (on the axis of the bearing device for a wheel). Therefore, with this threading advancement, the pressing bolt member 93 presses the screw shaft 96 in an arrow direction. This causes the outer ring 5 to move in the arrow direction with respect to the hub wheel 1, and the hub wheel 1 is removed from the outer ring 5.

Figure 34A:
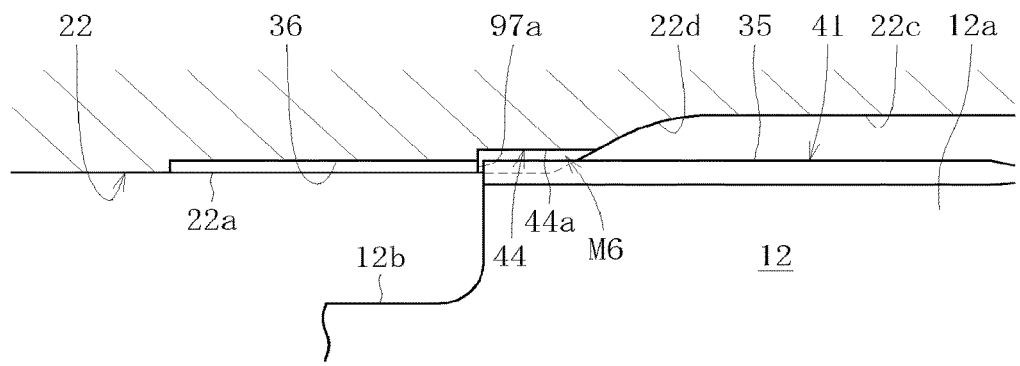
FIG. 34A is a sectional view in a state immediately before press-fitting, illustrating a method of re-press-fitting the bearing device for a wheel illustrated in FIG. 26.

Further, in the state in which the outer ring 5 is removed from the hub wheel 1, it is possible to connect the hub wheel 1 and the outer ring 5 together again by using, for example, the bolt member 54. That is, as a state in which the base 91 is removed from the hub wheel 1, and the screw shaft 76 is removed from the stem shaft 12, projections 35 of the stem shaft 12 is fit in the guiding recesses 44a as illustrated in FIG. 34A. Consequently, phases of the male spline 41 on the stem shaft 12 side and the female spline 42 of the hub wheel 1 formed by the previous press-fitting are aligned. When the phases are aligned, as illustrated in FIG. 28A, the diameter direction gaps C1 are formed between the vertexes of the projections 35 and the bottoms of the guiding recesses 44a.

Figure 33:
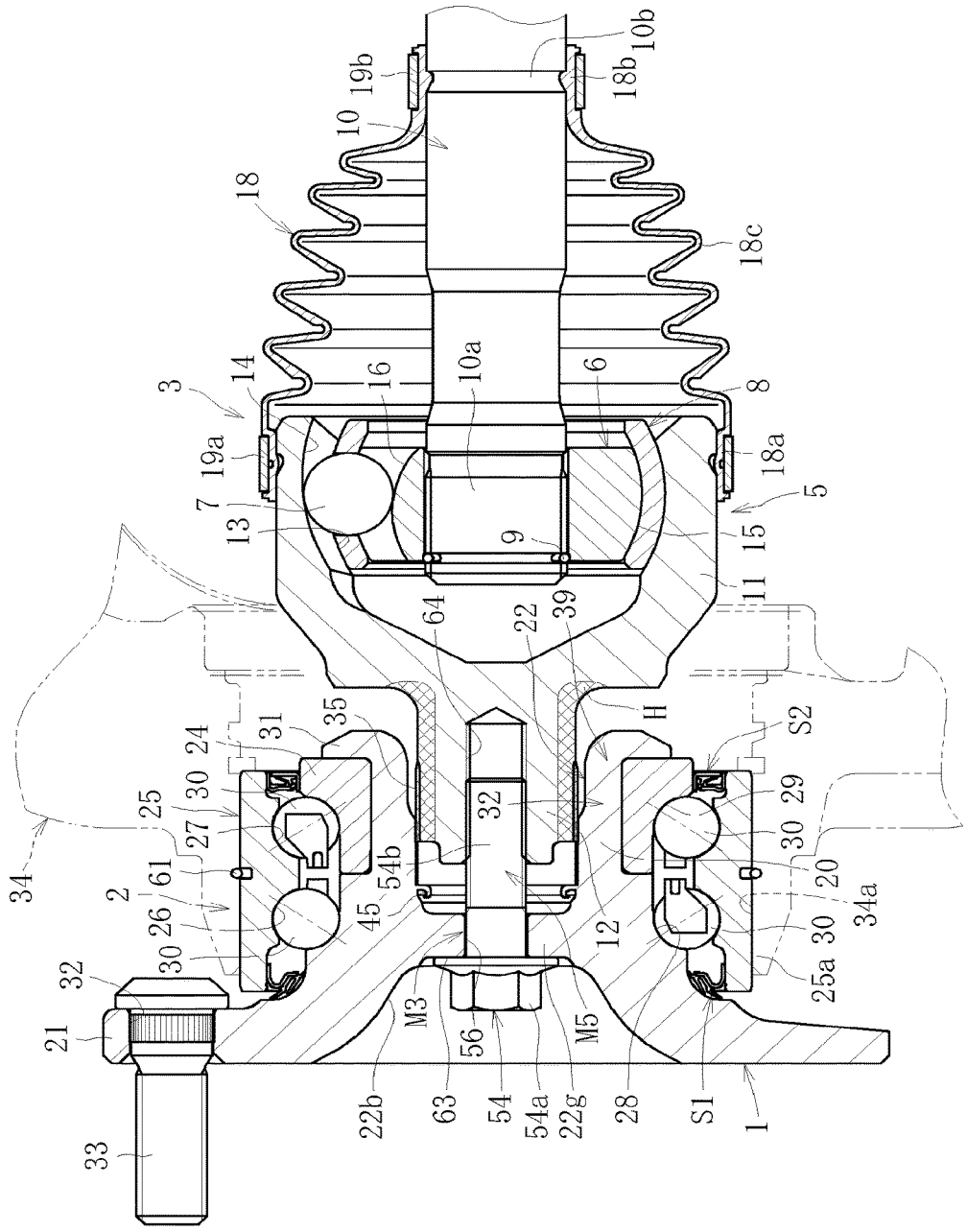
FIG. 33 is a sectional view illustrating a method of reassembling the bearing device for a wheel illustrated in FIG. 26.
Figure 34B:
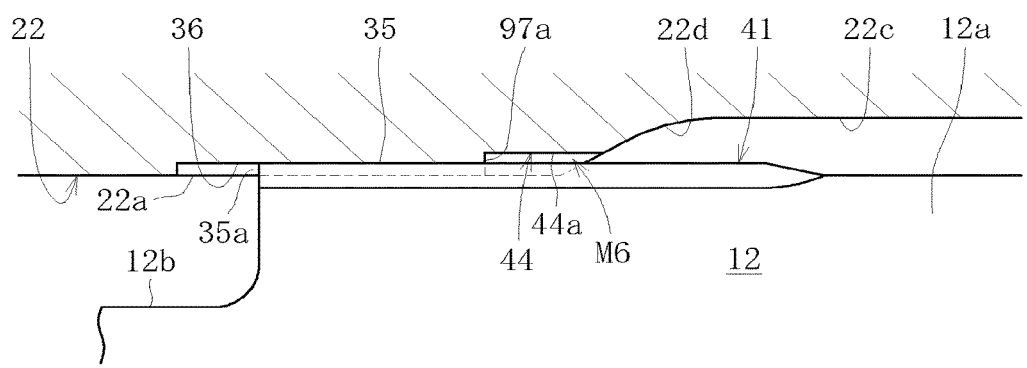
FIG. 34B is a sectional view during press fitting, illustrating the method of re-press-fitting the bearing device for a wheel illustrated in FIG. 26.
Figure 34C:
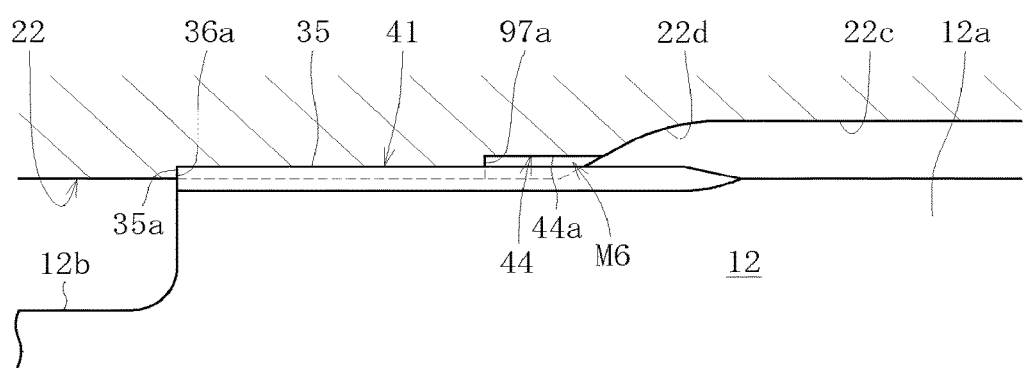
FIG. 34C is a sectional view of a press fitting completion state, illustrating the method of re-press-fitting the bearing device for a wheel illustrated in FIG. 26.

Next, in this state, as illustrated in FIG. 33, the bolt member 54 is screwed on the screw hole 64 of the stem shaft 12 through an intermediation of the through-hole 56, and the bolt member 54 is caused to threadedly advance with respect to the screw hole 64. As a result, as illustrated in FIG. 34B, the stem shaft 12 is gradually fitted into the hub wheel 1. When the stem shaft 12 fits in the hub wheel 1, the hole 22 is slightly expanded in diameter and allows entrance in the axial direction of the stem shaft 12. The stem shaft 12 enters until the bottom back surface 11a of the mouth section 11 comes into contact with the end surface 31a of the caulking section 31. In this case, at the same time, as illustrated in FIG. 34C, the end surfaces 35a of the projections 35 come into contact with end surfaces 36a of the recesses 36. When the movement in the axial direction is stopped, the hole 22 decreases in diameter to return to the original diameter. Consequently, as in the previous press fitting, it is possible to surely configure the recess-projection fitting structure M in which the entire recess fitting regions of the projections 35 adhere to the recesses 36 corresponding thereto.

The opening of the screw hole 64 of the stem shaft 12 is formed as a taper section 50a opening toward the opening side. Therefore, there is an advantage that the screw shaft 54b and the bolt member 54 are easily screwed in the screw hole 64.

Incidentally, in the first time (press fitting for molding the recesses 36 on the inner diameter surface 37 of the hole 22), because press-fitting load is relatively large, for press fitting, it is necessary to use a press machine or the like. On the other hand, in press fitting in the second time, because press-fitting load is smaller than the press-fitting load in the first time. Therefore, it is possible to stably and accurately press-fit the stem shaft 12 into the hole 22 of the hub wheel 1 without using the press machine or the like. Therefore, it is possible to separate and connect the outer ring 5 and the hub wheel 1 on the site.

Moreover, when a diameter difference between the hole diameter D12 of the bolt inserting hole 56 and the shaft diameter D11 of the non-screw section 55a of the bolt member 54 is represented as Δd5 and a diameter difference between the outer diameter D1 of the outer ring 5 in the recess-projection fitting structure M and the inner diameter dimension D of the hub wheel 1 in the recess-projection fitting structure M is represented as Δd6, a relation between the diameter differences is 0<Δd5<Δd6. Therefore, the diameter difference between the hole diameter D12 of the bolt inserting hole 56 and the shaft diameter D11 of the non-screw section 55a of the bolt member 54 is set smaller than the diameter difference between the outer diameter D1 of the outer ring 5 and the inner diameter dimension D of the hub wheel 1. The bolt inserting hole 56 is formed as the shaft press-fitting guide structure section M3 during re-press fitting of the stem shaft 12 of the outer ring 5. In other words, the bolt coupling means M5 includes the shaft press-fitting guide structure section M3. During re-press fitting, press fitting of the stem shaft 12 is guided by the shaft press-fitting guide structure section M3 without being decentered. Therefore, stable re-press fitting is possible. The projections 35 fit in the recesses 36 formed previous time without being decentered, whereby it is possible to realize improvement of re-assemblability.

By applying the drawing force in the axial direction to the stem shaft 12 of the outer ring 5 in this way, the outer ring 5 can be removed from the hole 22 of the hub wheel 1. Therefore, it is possible to realize improvement of workability for repairing and inspection (maintainability) of components. Moreover, by press-fitting the stem shaft 12 of the outer ring 5 into the hole 22 of the hub wheel 1 again after the repairing and inspection of the components, the recess-projection fitting structure M in which the entire fitting contact regions 38 of the projections 35 and the recesses 36 adhere to each other can be configured. Therefore, it is possible to configure again a bearing device for a wheel capable of performing stable torque transmission.

The shaft press-fitting guide section M6 has the guiding recess 44a for aligning a phase of the projections 35 and a phase of the other recesses 36. Therefore, when the stem shaft 12 of the outer joint member is press-fit into the hole 22 of the hub wheel 1 again, the stem shaft 12 fits in the recesses 36 formed by the previous press fitting and does not damage the recesses 36. Therefore, it is possible to highly accurately configure again the recess-projection fitting structure M in which a gap that causes a backlash is not formed in the diameter direction and the circumferential direction.

By forming a gap, for example, between the vertexes of the projections 35 and the bottoms of the guiding recesses 44a, the projections 35 can be easily fit in the guiding recesses 44a in a pre-press fitting process. Moreover, the guiding recesses 44a do not hinder press-fitting of the projections 35. Therefore, it is possible to realize improvement of assemblability.

When the axial direction length of the through hole 56 is too short, the through hole 56 cannot function as a stable guide. Conversely, when the axial direction length of the through hole 56 is too long, the thickness dimension of the inner wall 22g becomes large, whereby the axial direction length of the recess-projection fitting structure M cannot be secured, and the weight of the hub wheel 1 becomes large. Therefore, it is possible to make various changes taking into account those disadvantages.

Figure 28B:
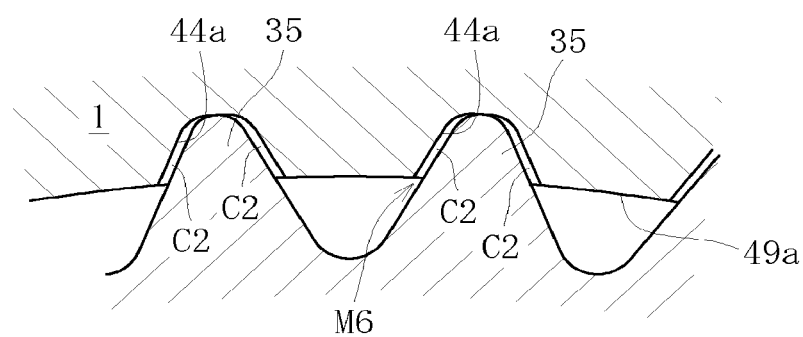
FIG. 28B is an enlarged sectional view illustrating a first modification of the shaft press-fitting structure.
Figure 28C:
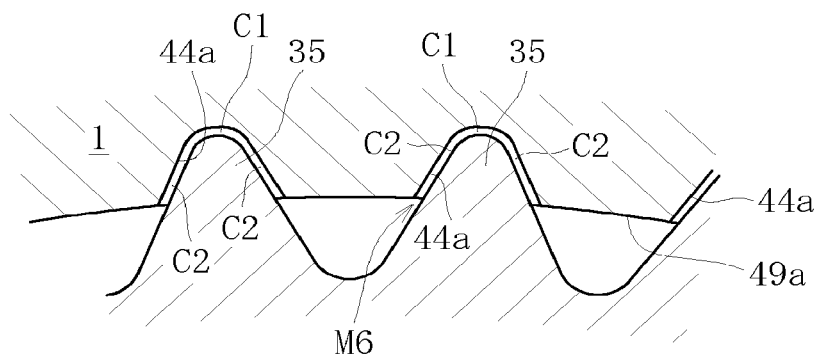
FIG. 28C is an enlarged sectional view illustrating a second modification of the shaft press-fitting structure.
Figure 29:
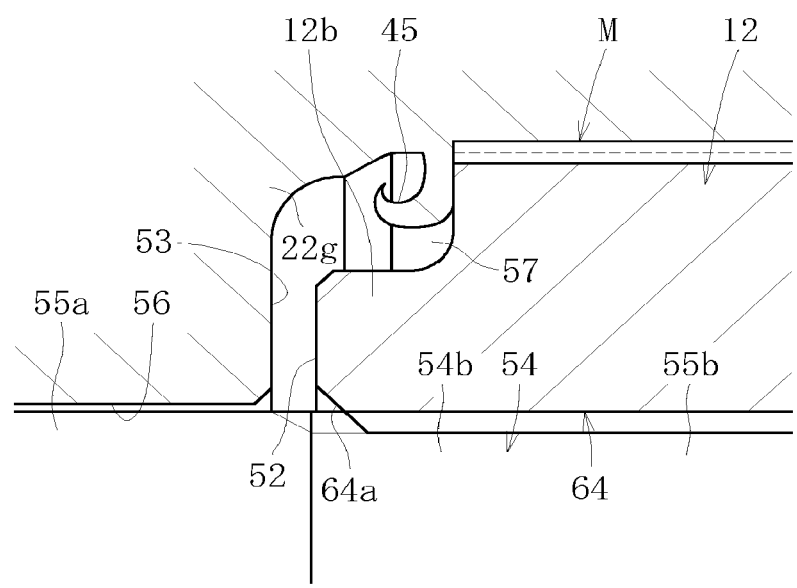
FIG. 29 is a main part enlarged view of the bearing device for a wheel illustrated in FIG. 26.

In the embodiment, as illustrated in FIG. 28A, the diameter direction gaps C1 are formed between the vertexes of the projections 35 and the bottoms of the guiding recesses 44a. However, as illustrated in FIG. 28B, circumferential direction gaps C2 and C2 may be formed between the sides of the projections 35 and the sides of the guiding recesses 44a. As illustrated in FIG. 28C, the diameter direction gaps C1 may be formed between the vertexes of the projections 35 and the bottoms of the guiding recesses 44a and the circumferential direction gaps C2 may be formed between the sides of the projections 35 and the sides of the guiding recesses 44a. By forming such gaps, it is possible to easily fit the projections 35 in the guiding recesses 44a in the pre-press fitting process. Moreover, the guiding recesses 44a do not hinder press fitting of the projections 35.

Figure 2B:
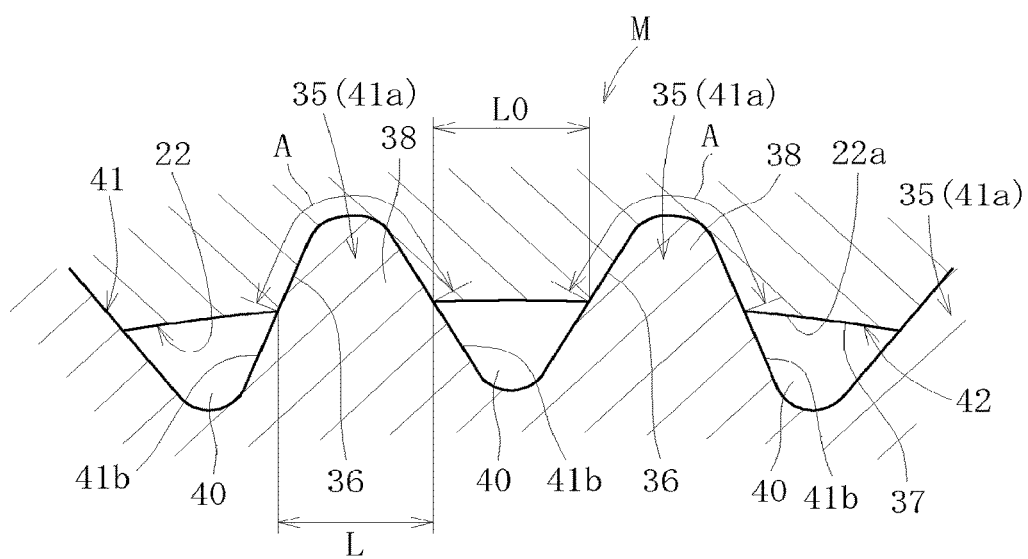
FIG. 2B is an enlarged view of an X section illustrated in FIG. 2A.

In the spline 41 illustrated in FIG. 2, the pitch of the projections 41a and the pitch of the recesses 41b are set to the same value. Thus, in the above-mentioned embodiment, as illustrated in FIG. 2B, a circumferential direction thickness L of projecting direction intermediate regions of the projections 35, and a circumferential direction dimension L0 in a position corresponding to the intermediate region between the projections 35 adjacent to each other in the circumferential direction are substantially the same.

Figure 35A:
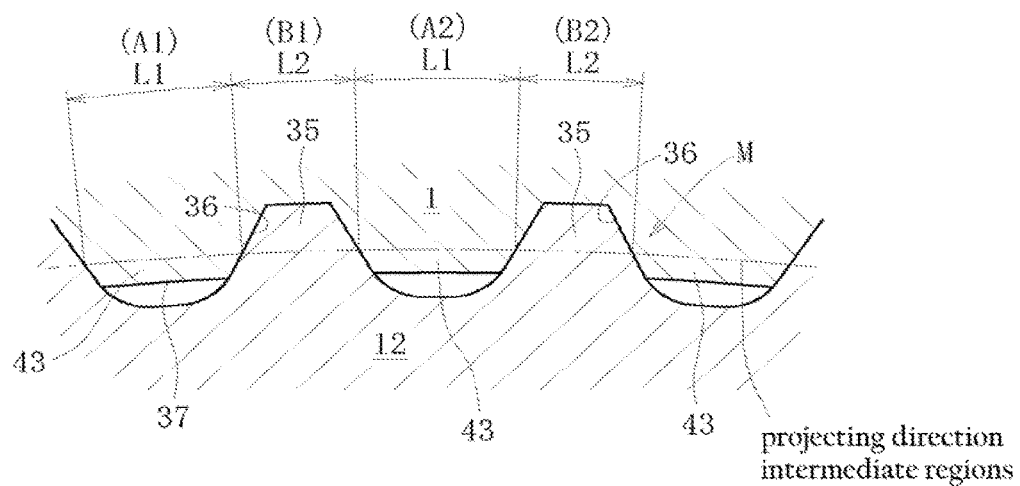
FIG. 35A is a sectional view illustrating a first modification of the recess-projection fitting structure.

On the other hand, as illustrated in FIG. 35A, a circumferential direction thickness L2 of the projecting direction intermediate regions of the projections 35 may be smaller than a circumferential direction dimension L1 in a position corresponding to the intermediate region between the projections 35 adjacent to each other in the circumferential direction. In other words, in the spline 41 formed in the stem shaft 12, the circumferential direction thickness (tooth thickness) L2 of the projecting direction intermediate regions of the projections 35 is set smaller than the circumferential direction thickness (tooth thickness) L1 of projecting direction intermediate regions of projections 43 on the hub wheel 1 side that fit in among the projections 35.

Therefore, a sum $\Sigma(B1+B2+B3+\ldots)$ of tooth thicknesses of the projections 35 in the entire circumference on the stem shaft 12 side is set smaller than a sum $\Sigma(A1+A2+A3+\ldots)$ of tooth thicknesses of the projections 43 (projecting teeth) on the hub wheel 1 side. Consequently, it is possible to increase a shearing area of the projections 43 on the hub wheel 1 side and secure torsion strength. Moreover, because the tooth thickness of the projections 35 is small, it is possible to reduce press-fitting load and realize improvement of press-fitting performance. When a sum of circumferential direction thicknesses of the projections 35 is set smaller than a sum of circumferential direction thicknesses of the projections 43 on the opposite side, it is unnecessary to set the circumferential direction thickness L2 of all the projections 35 smaller than the dimension L1 in the circumferential direction between the projections 35 adjacent to each other in the circumferential direction. In other words, even if the circumferential direction thickness of arbitrary projections 35 among the plural projections 35 is the same as or larger than a dimension in the circumferential direction between the projections adjacent to each other in the circumferential direction, a sum of circumferential direction thicknesses only has to be smaller than a sum of dimensions in the circumferential direction.

Figure 35B:
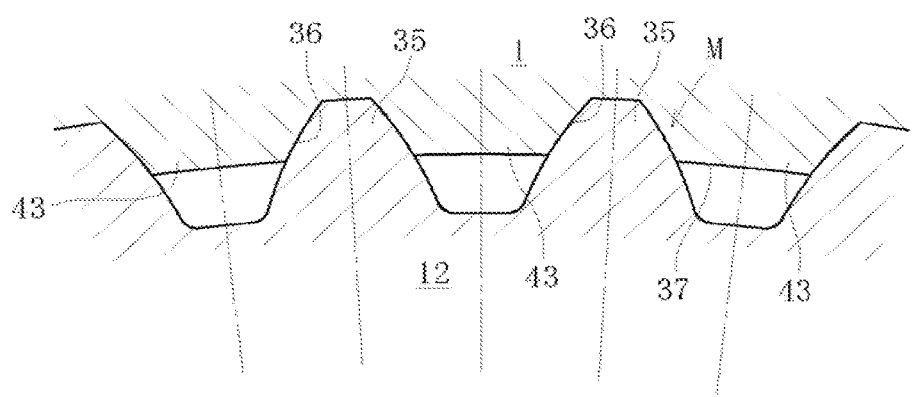
FIG. 35B is a sectional view illustrating a second modification of the recess-projection fitting structure.

The projections 35 in FIG. 35A are trapezoidal in section. However, a shape of the projections 35 may be an involute tooth shape as illustrated in FIG. 35B.

Figure 36A:
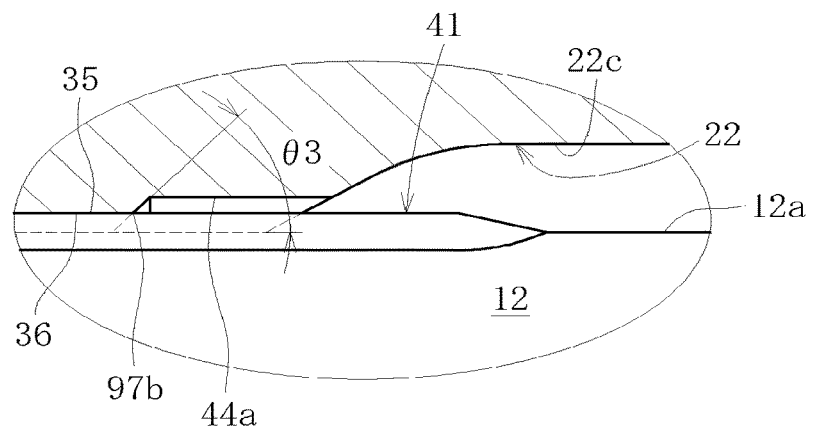
FIG. 36A is a sectional view of a third modification of the shaft press-fitting structure.

The shaft press-fitting guide section M6 may be that illustrated in FIG. 36. In FIG. 36A, the end on the recess-projection fitting structure M side of the guiding recess 44a is a tilting surface 97b that decreases in diameter along a press-fitting direction (press-fitting progress direction). In other words, a tilt angle θ3 of the tilting surface 97b is, for example, about 45°.

Figure 36B:
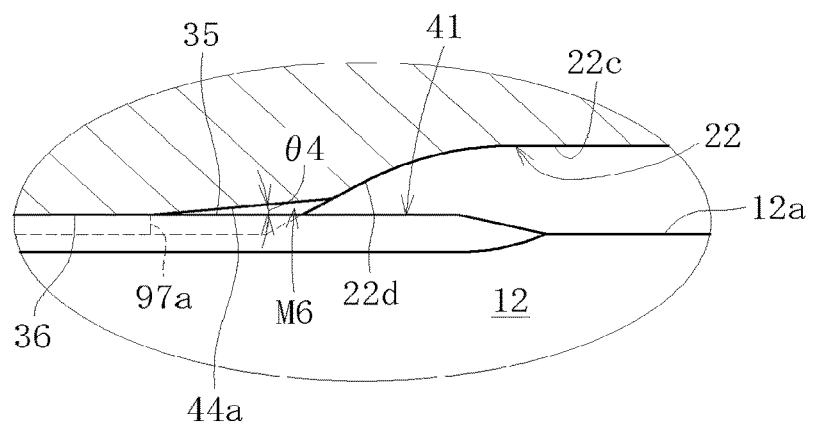
FIG. 36B is a sectional view of a fourth modification of the shaft press-fitting structure.
Figure 36C:
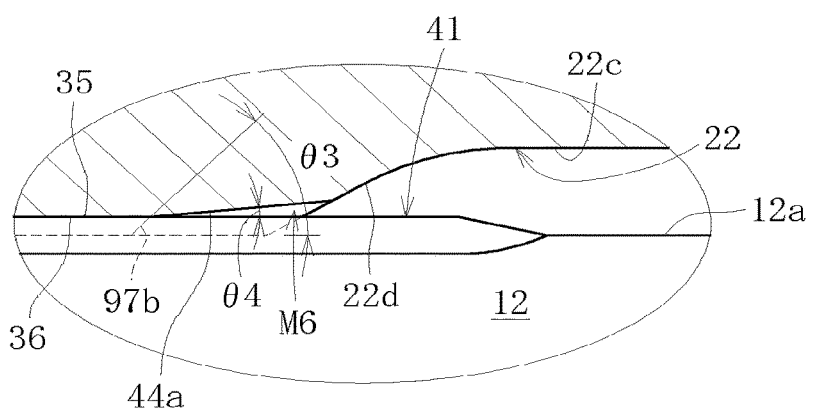
FIG. 36C is a sectional view of a fifth modification of the shaft press-fitting structure.

In FIGS. 36B and 36C, a diameter direction depth dimension of the guiding recess 44a decreases along the press-fitting direction. In FIG. 36B, the end on the recess-projection fitting structure M side is the flat surface 97a orthogonal to the press-fitting direction. In FIG. 36C, the end on the recess-projection fitting structure M side is the tilting surface 97b that decreases in diameter along the press-fitting direction (press-fitting progress direction).

If the end on the recess-projection fitting structure side of the guiding recess 44a is the flat surface 97a orthogonal to the press-fitting direction, when the stem shaft 12 is press-fit into the hole 22, this flat surface 97a can receive the stem shaft 12. If the end is the tilting surface 97b, the projections 35 can be stably fit in the recesses 36 on the opposite side from the guiding recess 44a. Even if the diameter direction depth of the guiding recesses 44a decreases along the press-fitting direction, the projections 35 can be stably fit in the recesses 36 on the opposite side from the guiding recesses 44a.

Figure 37:
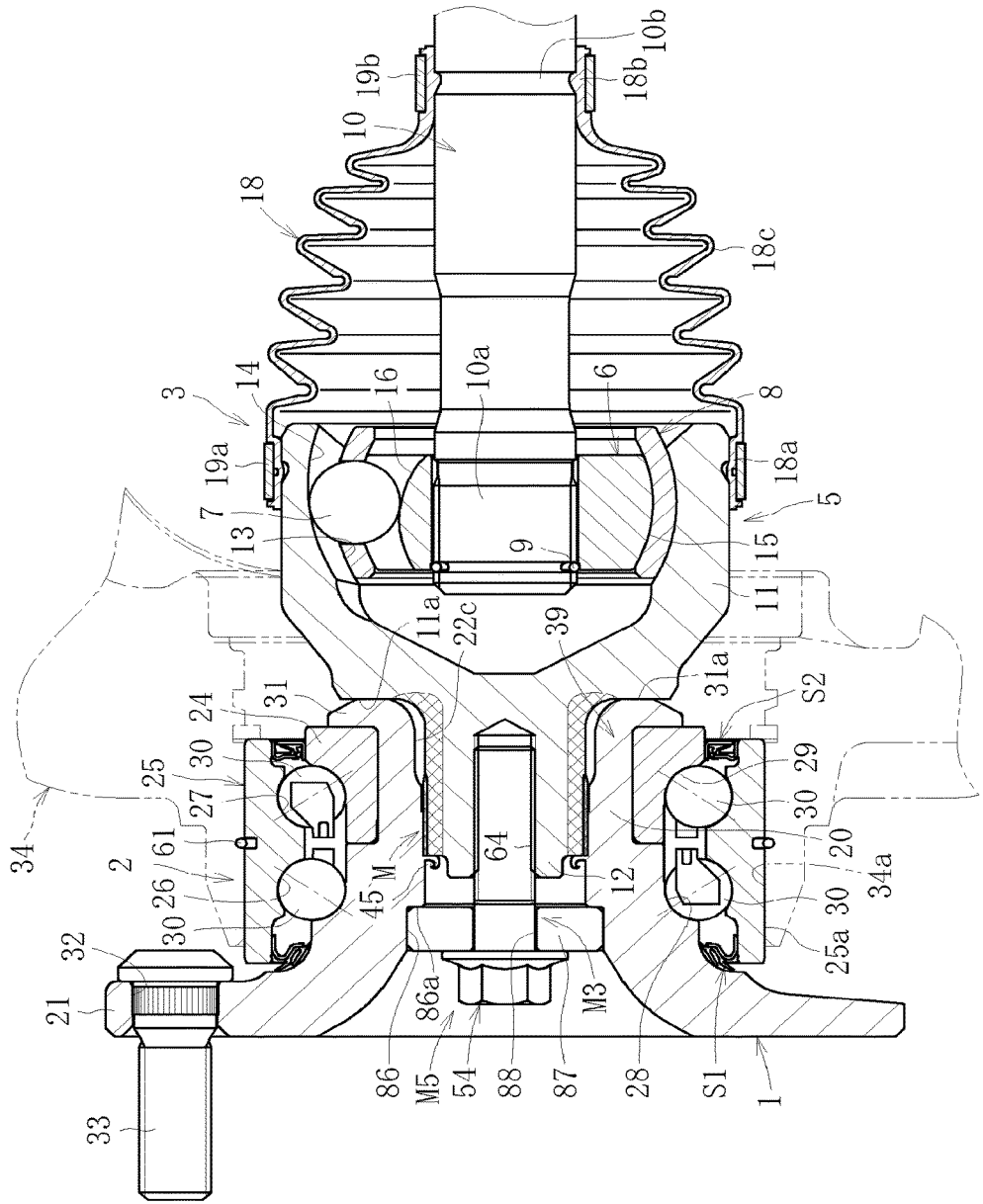
FIG. 37 is a sectional view illustrating a tenth embodiment of the present invention.

Next, FIG. 37 illustrates another embodiment. In this case, the inner wall 22g is not provided in the hub wheel 1. Instead of this inner wall 22g, a ring member 86 is inserted in the hole 22 of the hub wheel 1. In other words, a ring fitting notch section 86 is provided in the hole 22 of the hub wheel 1 and a ring member 87 is fit in this ring fitting notch section 86. When the ring member 87 is fit in the ring fitting notch section 86, the ring member 87 engages with a notch end surface 86a of the ring fitting notch section 81. It is preferable that clearance between an outer diameter of the ring member 87 and an inner diameter of the ring fitting notch section 81 be reduced as much as possible or the ring member 87 is press-fit into the ring fitting notch section 86.

A bolt inserting hole 88 through which the bolt member 54 is inserted is formed in the ring member 87. In this bolt inserting hole 88, as in the bolt inserting hole 56 according to the first embodiment, when a diameter difference between the hole diameter D12 and the shaft diameter D11 of the non-screw section 55a of the bolt member 54 is represented as Δd5 and a diameter difference between the outer diameter D1 of the outer ring 5 and the inner diameter dimension D of the hub wheel 1 in the recess-projection fitting structure M is represented as Δd6, a relation between the diameter differences is 0<Δd5<Δd6.

Figure 38A:
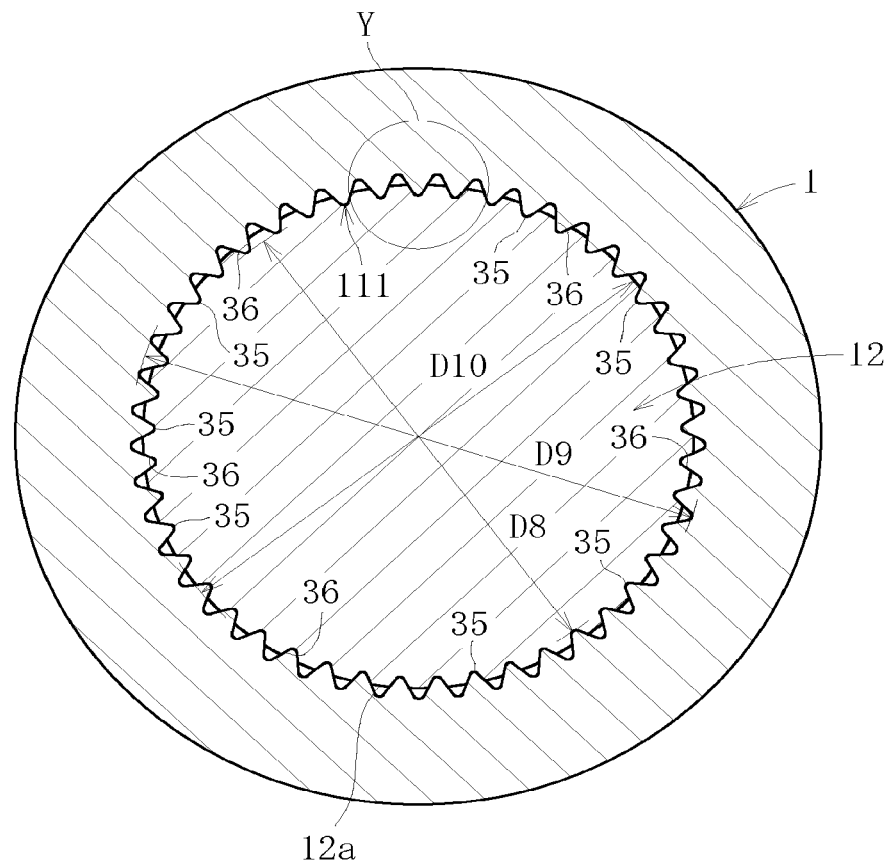
FIG. 38A is a cross sectional view of a third modification of the recess-projection fitting structure.

Other components of a bearing device for a wheel illustrated in FIG. 38 are the same as those of the bearing device for a wheel illustrated in FIG. 26. Therefore, components same as those in FIG. 26 are denoted by the same reference symbols and description of the components is omitted.

Therefore, the bearing device for a wheel illustrated in FIG. 38 realizes operations and effects same as those of the bearing device for a wheel illustrated in FIG. 26. Moreover, because the bolt inserting hole 88 is formed in the ring member 80 separate from the hub wheel 1, the bolt inserting hole 88 can be highly accurately and stably formed. Even when, for example, the ring member 87 is damaged, the ring member 87 can be replaced. It is unnecessary to replace the entire hub wheel 1. Therefore, it is possible to realize a reduction in cost.

In this embodiment, the spline 41 forming the projections 35 is formed on the stem shaft 12 side. Hardening treatment is applied to this spline 41 of the stem shaft 12 and the inner diameter surface of the hub wheel 1 is not hardened (a row material). On the other hand, as illustrated in FIG. 38, a spline 111 (including projected streaks 111a and recessed streaks 111b) subjected to hardening treatment may be formed on the inner diameter surface of the hole 22 of the hub wheel 1. Hardening treatment may not be applied to the stem shaft 12. This spline 111 can also be formed by various machining methods such as broaching, cutting, pressing, and drawing, which are publicly known and used means. As thermosetting treatment, various kinds of heat treatment such as induction hardening, and carburizing and quenching can be adopted.

In this case, the projecting direction intermediate regions of the projections 35 correspond to positions of the recess forming surface before recess formation (outer diameter surface of the stem shaft 12). In other words, a diameter dimension (minimum diameter dimension of the projections 35) D8 of a circle connecting the vertexes of the projections 35 as the projections 111a of the spline 111 is set smaller than an outer diameter dimension D10 of the stem shaft 12. A diameter dimension (inner diameter dimension of fitting hole inner diameter surfaces among the projections) D9 of a circle connecting bottoms of the recesses 111b of the spline 111 is set larger than the outer diameter dimension D10 of the stem shaft 12. In other words, a relation among the diameter dimensions and the outer diameter dimension is D8<D10<D9.

If the stem shaft 12 is press-fit into the hole 22 of the hub wheel 1, the recesses 36 in which the projections 35 on the hub wheel 1 side are fit can be formed on the outer circumferential surface of the stem shaft 12 by the projections 35. Consequently, the entire fitting contact regions 38 of the projections 35 and the recesses that fit on the projections 35 adhere to each other.

Figure 38B:
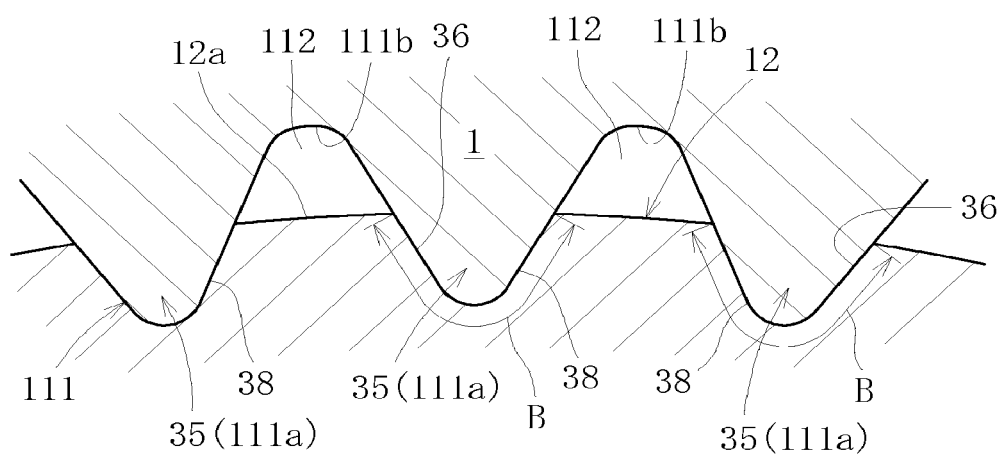
FIG. 38B is an enlarged view of a Y section illustrated in FIG. 38A.
Figure 39:
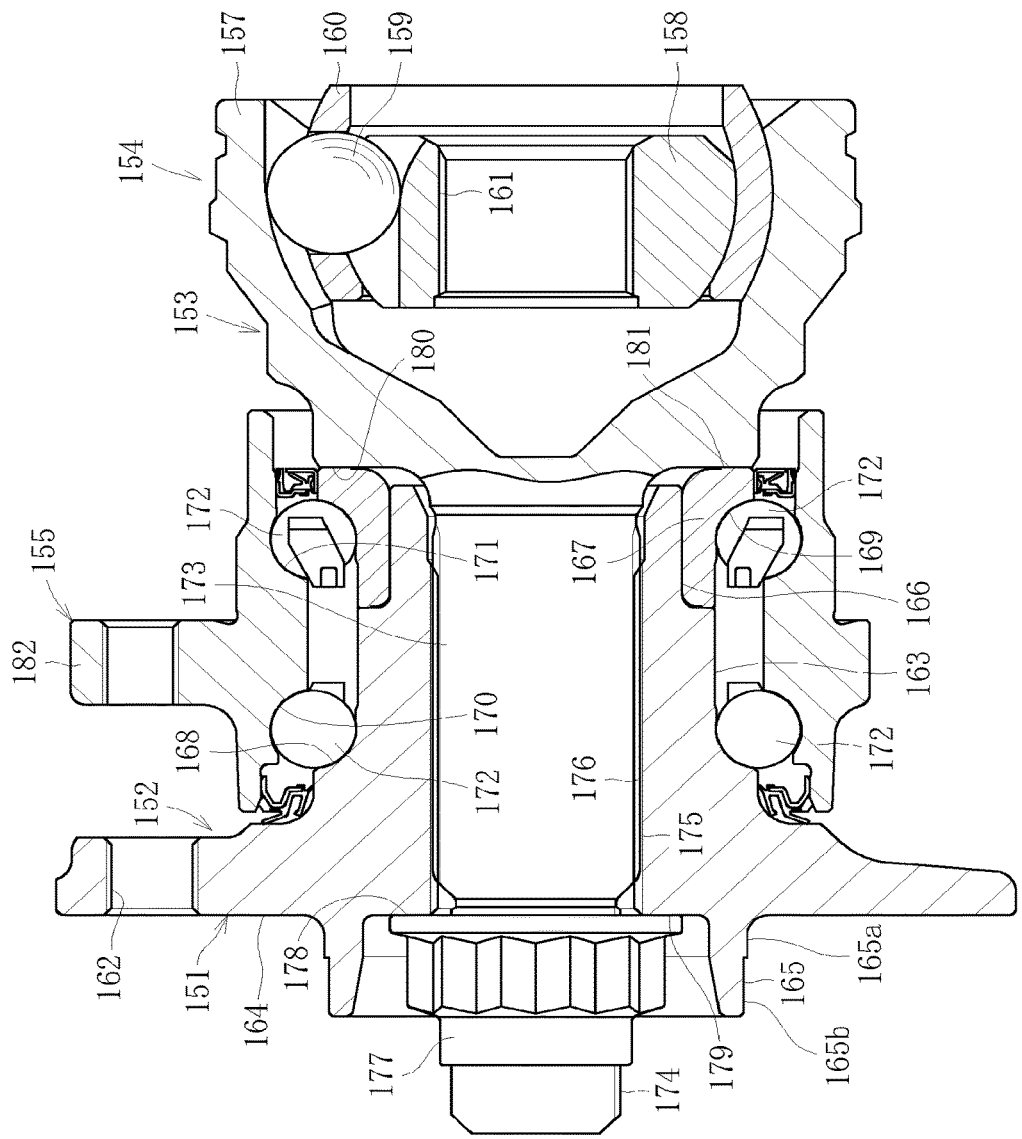
FIG. 39 is a sectional view of a conventional bearing device for a wheel.

The fitting contact regions 38 are ranges B illustrated in FIG. 38B and ranges from halfway sections to the tops of the ridges in section of the projections 35. A gap 112 is formed further on an outer diameter side than the outer circumferential surface of the stem shaft 12 between the projections 35 adjacent to each other in the circumferential direction.

In the bearing device for a wheel illustrated in FIG. 38, as in the bearing device described above, it is preferable to provide the shaft press-fitting guide section M6. In this case, the guiding recesses 44b only have to be provided on the stem shaft 12 side. The diameter direction gaps C1 can be formed between the vertexes of the projections 35 and the bottoms of the guiding recesses 44a, the circumferential direction gaps C2 and C2 can be formed between the sides of the projections 35 and the sides of the guiding recesses 44a, or the diameter direction gaps C1 and the circumferential direction gaps C2 and C2 can be formed.

In the case illustrated in FIG. 38, as in the case described above, the extruded portion 45 is formed by press fitting. Therefore, it is preferable to provide the pocket section 50 that stores this extruded portion 45. Because the extruded portion 45 is formed on the mouth side of the stem shaft 12, the pocket section 50 is provided on the hub wheel 1 side.

In the bearing device for a wheel in which the projections 35 of the recess-projection fitting structure M are provided on the inner diameter surface 37 of the hole 22 of the hub wheel 1, the hardness of the axial direction ends of the projections 35 is set higher than that of the outer diameter section of the stem shaft 12 of the outer ring 5, and the stem shaft 12 is press-fit as described above, it is unnecessary to perform hardness treatment (heat treatment) on the stem shaft 12 side. Therefore, the bearing device of vehicle is excellent in productivity of the outer joint member (outer ring 5) of the constant-velocity universal joint.

The embodiments of the present invention have been described. However, the present invention is not limited to the embodiments and various modifications of the embodiments are possible. For example, the shape of the projections 35 of the recess-projection fitting structure M is triangular in section in the embodiment illustrated in FIG. 2 and is trapezoidal in section in the embodiment illustrated in FIG. 35A. Besides, projections of various shapes such as a semicircular shape, a semi-elliptical shape, and a rectangular shape can be adopted. An area, the number, and a circumferential direction disposing pitch, and the like of the projections 35 can also be arbitrarily changed. In other words, it is unnecessary to form the spline 41 or 111 and form the projections 41a or 111a of this spline 41 or 111 as the projections 35 of the recess-projection fitting structure M. The projections 35 may be something like keys or may form wavy mating surfaces of a curved line shape. In short, it is sufficient that the projections 35 disposed along the axial direction are press-fit into the opposite side, the recesses 36 adhering to and fitting in the projections 35 can be formed on the opposite side by the projections 35, the entire fitting contact regions 38 of the projections 35 and the recesses that fit in the projections 35 adhere to each other, and rotation torque can be transmitted between the hub wheel 1 and the constant-velocity universal joint 3.

The hole 22 of the hub wheel 1 may be a deformed-shape hole such as a polygonal hole other than a circular hole. A sectional shape of the end of the stem shaft 12 fit and inserted into this hole 22 may be a deformed-shape section such as a polygon other than a circular section. Further, when the stem shaft 12 is press-fit into the hub wheel 1, only press-fitting start ends of the projections 35 have hardness higher than that of the regions where the recesses 36 are formed. Therefore, it is unnecessary to set the hardness of the entire projections 35 high. In FIG. 2 and the like, the gap 40 is formed. However, the projections 35 may bite in the inner diameter surface 37 of the hub wheel 1 up to the recesses among the projections 35. As a hardness difference between the projections 35 side and the side of the recess formation surface formed by the projections 35, as described above, it is preferable to set the hardness difference to be equal to or larger than 20 points in HRC. As long as the projections 35 can be press-fit, the hardness difference may be smaller than 20 points.

The end surfaces (press-fitting start ends) of the projections 35 are the surfaces orthogonal to the axial direction in the embodiments. However, the end surfaces may be surfaces tilting at a predetermined angle with respect to the axial direction. In this case, the end surfaces may tilt to the opposite projection side from the inner diameter side to the outer diameter side or may tilt to the projection side.

A shape of the pocket section 50 only has to be a shape that can store (house) the extruded portion 45 to be caused. Therefore, a capacity of the pocket section 50 only has to be capable of storing the extruded portion 45 to be caused.

Further, it is also possible to provide small recesses arranged at a predetermined circumferential pitch in the inner diameter surface 37 of the hole 22 of the hub wheel 1. It is necessary for the small recesses to have a volume smaller than that of the recesses 36. By thus providing the small recesses, it is possible to improve the press-fitting property of the projections 35. That is, by thus providing the small recesses, it is possible to reduce the capacity of the extruded portion 45 formed during press fitting of the projections 35, and hence it is possible to reduce the press-fitting resistance. Further, because the extruded portion 45 can be made smaller, it is possible to reduce the volume of the pocket section 50, making it possible to improve the processability of the pocket section 50 and the strength of the stem shaft 12. The small recesses may be of various shapes such as a triangular, a semi-elliptical, or a rectangular shape, and the number of small recess can also be set arbitrarily.

While welding is adopted as the coupling means illustrated in FIG. 23, it is also possible to adopt adhesive instead of welding. Further, it is also possible to use rollers as the rolling elements 30 of the bearing 2. Further, while in the above-mentioned embodiment the third generation bearing device for a wheel is described, it is also possible to adopt the first or second generation bearing device for a wheel. Note that, when press fitting the projections 35, it is possible to move the member on which the projections 35 are formed, with the member in which the recesses 36 are formed being stationary. Conversely, it is also possible to move the member in which the recesses 36 are formed, with the member on which the projections 35 are formed being stationary. Further, it is also possible to move both of them. Note that, in the constant-velocity universal joint 3, the inner ring 6 and the shaft 10 may be integrated with each other through the intermediation of the recess-projection fitting structure M as described with reference to the above-mentioned embodiments.

The seal material interposed between the bearing surface 60a of the bolt member 54, which fixes by a bolt the hub wheel 1 and the stem shaft 12, and the inner wall 22g is formed by applying the resin to the bearing surface 60a side of the bolt member 54 in the embodiments. However, conversely, the resin may be applied to the inner wall 22g side. The resin may be applied to the bearing surface 60a side and the inner wall 22g side. When the bolt member 54 is screwed in, if the bearing surface 60a of the bolt member 54 and the bottom surface of the recessed dent section 63 of the inner wall 22g are excellent in adhesiveness, such a seal material can also be omitted. In other words, it is possible to improve adhesiveness of the bolt member 54 with the bearing surface 60a by grinding the bottom surface of the recessed dent section 63. It goes without saying that, even if the bottom surface of the recessed dent section 63 is not ground and is in a so-called turning finish state, the seal material can be omitted as long as adhesiveness can be exerted.

As the guiding recesses 44a, as illustrated in FIGS. 28A, 28B, and 28C, the gaps C1 and C2 are formed among the projections 35. A dimension of those gaps only has to be a dimension that does not cause decentering and shaft misalignment during press fitting and prevents the projections 35 from coming into press-contact with the inner surfaces of the guiding recesses 44a to cause an increase in press-fitting load. The axial direction length of the guiding recesses 44a can be arbitrarily set. If the guiding recesses 44a are long in the axial direction, this is preferable in alignment. However, an upper limit of the axial direction length is limited because of the axial direction length of the hole 22 of the hub wheel 1. Conversely, if the axial direction length of the hole 22 of the hub wheel 1 is small, the guiding recesses 44a do not function as a guide and decentering and shaft misalignment are likely to occur. Therefore, it is necessary to determine the axial direction length of the guiding recesses 44a taking into account those points.

A sectional shape of the guiding recesses 44a is not limited to that illustrated in FIG. 4 as long as the projections 35 can fit in the guiding recesses 44a. The sectional shape can be variously changed according to a sectional shape and the like of the projections 35. The number of guiding recesses 44a does not have to be the same as the number of projections 35 and may be smaller or larger than the number of projections 35. In short, several projections 35 only have to fit in several guiding recesses 44a and a phase of the projections 35 and a phase of the recesses 36 formed in the previous press fitting only have to coincide with each other.

The tilt angle θ3 of the tilting surfaces 97b of the ends of the guiding recesses 44a and the tilt angle θ4 of the bottoms of the guiding recesses 44a can also be arbitrarily changed. If the tilt angle θ3 of the tilting surfaces 97b is close to 90°, the tilting surfaces 97b are functionally the same as the flat surfaces 97a orthogonal to the press-fitting direction. If the tilt angle θ3 is small, the guiding recesses 44a are long and the axial direction length of the recess-projection fitting structure M is small. If the tilt angle θ1 of the bottoms is large, it is difficult to form the guiding recesses 44a. Conversely, if the tilt angle θ1 is small, the function of the tilted guiding recesses 44a cannot be exerted. Therefore, it is necessary to set the tilt angles θ3 and θ4 taking into account those points.

The outer member 25 of the roller bearing 2 in the embodiments does not include a vehicle body attachment flange. However, the outer member 25 may include the vehicle body attachment flange.

INDUSTRIAL APPLICABILITY

The present invention can be applied to bearing devices for a wheel of the first generation having the structure in which roller bearings in double rows are independently used, the second generation in which a vehicle body attachment flange is integrally provided in an outer member, the third generation in which an inner raceway surface on one side of the roller bearings in double rows is integrally formed with an outer circumference of a hub wheel integrally having a wheel attachment flange, and the fourth generation in which a constant-velocity universal joint is integrated with the hub wheel and an inner raceway surface of the other side of the roller bearings in double rows is integrally formed with an outer circumference of an outer joint member configuring the constant-velocity universal joint.

The invention claimed is:
1. A bearing device for a wheel, the bearing device comprising:
 a rolling bearing; and
 a constant velocity universal joint having an outer joint member with a shaft section and a mouth section,
 wherein the rolling bearing comprises:
 an outer member having an inner circumference in which outer raceway surfaces in double rows are formed;
 an inner member that has, on an outer circumference thereof, inner raceway surfaces in double-rows opposed to the outer raceway surfaces, the inner member comprising an inner ring and a hub wheel having a hole and a flange for attachment to the wheel; and
 rolling elements in double rows interposed between the outer raceway surfaces of the outer member and the inner raceway surfaces of the inner member, wherein
 the shaft section of the outer joint member of the constant-velocity universal joint is fit and coupled to an inner diameter of the hole of the hub wheel,
 an axially extending projection is provided on an outer diameter surface of the shaft section of the outer joint member, the projection being press-fitted along an axial direction into an initial recess provided on an inner diameter surface of hole of the hub wheel, and a recess is formed in the hole of the hub wheel, to thereby form a recess-projection fitting structure in which an entire fitting contact region of both the projection and the recess adhere to each other,
 the initial recess has a volume that is smaller than a volume of the recess, a surface of the recess is formed as a cut surface by removing material including the initial recess during the press fitting of the projection, the hub wheel has an end on an inboard side of the hub wheel that is caulked to an outer diameter side to form a caulking section, the inner ring of the rolling bearing is externally fit to the hub wheel and fixed by the caulking section, preload being applied to the rolling bearing, and the caulking section and a back surface of the mouth section of the outer joint member of the constant-velocity universal joint opposed to the caulking section are in contact with each other.

2. A bearing device for a wheel according to claim 1, wherein a guiding recess for performing guidance for press fitting of the shaft section during press fitting of the projection is provided on an end of a projection press-fitting start side of the hole of the hub wheel.

3. A bearing device for a wheel according to claim 2, wherein a diameter direction gap and a circumferential direction gap are formed between the projection and the guiding recess in which the projection is fitted.

4. A manufacturing method for a bearing device for a wheel, the bearing device comprising:
a rolling bearing; and
a constant velocity universal joint having an outer joint member with a shaft section and mouth section,
wherein the rolling bearing comprises:
an outer member having an inner circumference in which outer raceway surfaces in double rows are formed;
an inner member that has, on an outer circumference thereof, inner raceway surfaces in double-rows opposed to the outer raceway surfaces, the inner member comprising an inner ring and a hub wheel having a hole and a flange for attachment to the wheel; and
rolling elements in double rows interposed between the outer raceway surfaces of the outer member and the inner raceway surfaces of the inner member, wherein
the shaft section of the outer joint member of the constant-velocity universal joint is fit and coupled to an inner diameter of the hole of the hub wheel,
the hub wheel has an end on an inboard side of the hub wheel that is caulked to an outer diameter side to form a caulking section,
the inner ring of the rolling bearing is externally fit to the hub wheel and fixed by the caulking section, preload being applied to the rolling bearing, and
the caulking section and a back surface of the mouth section of the outer joint member of the constant-velocity universal joint opposed to the caulking section are in contact with each other,
the method comprises steps of:
providing a projection with an outer diameter surface of the shaft section of the outer joint member, the projection extending axially;
providing an initial recess with the hole of the hub wheel; and
forming a recess on an inner diameter surface of the hole of the hub wheel by removing material including the initial recess by the projection being press-fitted into the initial recess along an axial direction, to thereby form a recess-projection fitting structure in which an entire fitting contact region of both the projection and the recess adhere to each other, a surface of the recess being formed as a cut surface, and the initial recess having a volume that is smaller than a volume of the recess.

5. A manufacturing method for a bearing device for a wheel according to claim 4, wherein
the hub wheel and the shaft section of the outer joint member are fixed through a bolt coupling means comprising a screw hole and a bolt member screwed into the screw hole of the shaft section, and wherein
the method further comprises steps of:
separating, under a state in which the bolt member is removed from the screw hole, the recess-projection fitting structure by applying a drawing force in the axial direction; and
press-fitting the projection into the recess by screwing the bolt member into the screw hole of the shaft section to thereby form the recess-projection fitting structure.

* * * * *